(12) United States Patent
Thakkar et al.

(10) Patent No.: US 8,949,913 B1
(45) Date of Patent: Feb. 3, 2015

(54) METHOD OF MAKING A VIDEO STREAM FROM A PLURALITY OF VIEWPORTS WITHIN LARGE FORMAT IMAGERY

(75) Inventors: Rahul C. Thakkar, Sterling, VA (US); Scott Pakula, Chantilly, VA (US); Rudolf O. Ernst, Leesburg, VA (US)

(73) Assignee: Pixia Corp., Reston, VA (US)

(*) Notice: Subject to any disclaimer, the term of this patent is extended or adjusted under 35 U.S.C. 154(b) by 57 days.

(21) Appl. No.: 13/233,706

(22) Filed: Sep. 15, 2011

Related U.S. Application Data

(60) Provisional application No. 61/383,566, filed on Sep. 16, 2010.

(51) Int. Cl.
*H04N 7/173* (2011.01)

(52) U.S. Cl.
USPC .................................. 725/93; 725/116

(58) Field of Classification Search
USPC ............... 725/91–94, 114–117, 144–147; 709/217–232
See application file for complete search history.

(56) References Cited

U.S. PATENT DOCUMENTS

| | | | |
|---|---|---|---|
| 4,823,108 A | 4/1989 | Pope | |
| 4,873,513 A | 10/1989 | Soults et al. | |
| 4,878,117 A | 10/1989 | Ikehira et al. | |
| 5,263,136 A | 11/1993 | DeAguiar et al. | |
| 5,341,466 A | 8/1994 | Perlin et al. | |
| 5,414,809 A | 5/1995 | Hogan et al. | |
| 5,513,282 A | 4/1996 | Williams | |
| 5,611,041 A | 3/1997 | Bril et al. | |
| 5,706,451 A | 1/1998 | Lightbody et al. | |
| 5,710,835 A | 1/1998 | Bradley | |
| 5,819,278 A | 10/1998 | Hamburg | |
| 5,831,612 A | 11/1998 | Stoval, III et al. | |
| 5,847,705 A | 12/1998 | Pope | |
| RE36,145 E | 3/1999 | DeAguiar et al. | |
| 5,889,669 A | 3/1999 | Kagami et al. | |

(Continued)

FOREIGN PATENT DOCUMENTS

| | | |
|---|---|---|
| DE | 102006043166 A1 | 3/2008 |
| JP | 2000-148066 A | 5/2000 |
| WO | 00/68887 A1 | 11/2000 |

OTHER PUBLICATIONS

Canadian Office Action issued regarding Canadian Patent Application No. 2,406,675, mailed Jul. 30, 2010.

(Continued)

*Primary Examiner* — Annan Shang
(74) *Attorney, Agent, or Firm* — Pillsbury Winthrop Shaw Pittman, LLP

(57) ABSTRACT

A method of making a video stream from a plurality of viewports within large format imagery is described. In one embodiment, the method includes retrieving a plurality of viewports within a plurality of images, each image being arranged as a matrix of tiles, from a file container. The method includes inputting parameters including an identification of a plurality of records where the plurality of images containing the plurality of viewports are stored, an origin of each of the plurality of viewports and a pixel width and a pixel height of each of the plurality viewports. The method further includes requesting the plurality of viewports from the file container using the parameters; and reading data of each of the plurality of viewports starting from the origin of each or the plurality of viewports. The method may further include arranging the plurality of viewports as a video codestream of a group of pictures.

26 Claims, 38 Drawing Sheets

(56) References Cited

U.S. PATENT DOCUMENTS

| | | | |
|---|---|---|---|
| 5,905,506 | A | 5/1999 | Hamburg |
| 5,933,537 | A | 8/1999 | Hajjahmad et al. |
| 6,012,109 | A | 1/2000 | Schultz |
| 6,075,905 | A | 6/2000 | Herman et al. |
| 6,091,430 | A | 7/2000 | Bodin et al. |
| 6,130,661 | A | 10/2000 | Ilbery |
| 6,141,023 | A | 10/2000 | Meinerth et al. |
| 6,182,127 | B1 | 1/2001 | Cronin, III et al. |
| 6,192,393 | B1 | 2/2001 | Tarantino et al. |
| 6,222,562 | B1 | 4/2001 | Leidich |
| 6,262,741 | B1 | 7/2001 | Davies |
| 6,278,432 | B1 | 8/2001 | Ratnakar |
| 6,323,854 | B1 | 11/2001 | Knox et al. |
| 6,377,306 | B1 | 4/2002 | Johnson et al. |
| 6,400,763 | B1 | 6/2002 | Wee |
| 6,493,858 | B2 | 12/2002 | Solomon |
| 6,549,681 | B1 | 4/2003 | Takiguchi et al. |
| 6,674,881 | B2 | 1/2004 | Bacus et al. |
| 6,711,283 | B1 | 3/2004 | Soenksen |
| 6,714,205 | B1 | 3/2004 | Miyashita et al. |
| 6,721,952 | B1 | 4/2004 | Guedalia et al. |
| 6,904,176 | B1 | 6/2005 | Chui et al. |
| 6,912,253 | B1 | 6/2005 | Li et al. |
| 6,912,695 | B2 | 6/2005 | Ernst et al. |
| 7,080,131 | B2 | 7/2006 | Palevich et al. |
| 7,085,435 | B2 | 8/2006 | Takiguchi et al. |
| 7,119,811 | B2 | 10/2006 | Ernst et al. |
| 7,330,192 | B2 * | 2/2008 | Brunner et al. ............... 345/592 |
| 7,366,360 | B2 | 4/2008 | Takiguchi et al. |
| 7,535,474 | B1 * | 5/2009 | Scholander et al. .......... 345/531 |
| 7,540,012 | B1 * | 5/2009 | Herzberg et al. ............... 725/87 |
| 7,607,106 | B2 | 10/2009 | Ernst et al. |
| 7,619,778 | B2 * | 11/2009 | Inoue ............................ 358/3.1 |
| 7,876,977 | B2 | 1/2011 | Walton et al. |
| 7,995,867 | B2 | 8/2011 | Walton et al. |
| 8,023,160 | B2 * | 9/2011 | Monga et al. ................ 358/3.28 |
| 8,189,902 | B1 | 5/2012 | Carson |
| 8,217,941 | B2 | 7/2012 | Park et al. |
| 8,233,402 | B2 * | 7/2012 | Duffield et al. ............... 370/252 |
| 8,265,370 | B2 | 9/2012 | Ducksbury et al. |
| 8,340,396 | B2 * | 12/2012 | Yao .............................. 382/149 |
| 2002/0004860 | A1 | 1/2002 | Roman |
| 2002/0093516 | A1 | 7/2002 | Brunner et al. |
| 2002/0159632 | A1 | 10/2002 | Chui et al. |
| 2002/0194302 | A1 | 12/2002 | Blumberg |
| 2002/0196467 | A1 | 12/2002 | Delhoune et al. |
| 2003/0031258 | A1 | 2/2003 | Wang et al. |
| 2003/0034936 | A1 | 2/2003 | Ernst et al. |
| 2003/0063127 | A1 | 4/2003 | Ernst et al. |
| 2003/0067420 | A1 | 4/2003 | Ernst et al. |
| 2006/0210196 | A1 | 9/2006 | Wensley et al. |
| 2007/0124793 | A1 | 5/2007 | Wang et al. |
| 2012/0233228 | A1 | 9/2012 | Barton et al. |
| 2012/0233293 | A1 | 9/2012 | Barton et al. |
| 2012/0233522 | A1 | 9/2012 | Barton et al. |

OTHER PUBLICATIONS

Canadian Office Action issued regarding Canadian Patent Application No. 2,463,671, mailed Jul. 8, 2010.
Chinese Office Action for Chinese Patent Application No. 038244276, mailed on Oct. 26, 2007.
Chinese Office Action for Chinese Patent Application No. 038244276, mailed on Aug. 8, 2008.
Chinese Office Action for Chinese Patent Application No. 038244276, mailed on Feb. 6, 2009.
European Office Action for European Patent Application No, 02759681.6, mailed on Sep. 22, 2008.
Supplemental European Search Report for European Patent Application No. 02759681.6, mailed on Jun. 27, 2008.
European Office Action for European Patent Application No. 03799307.8, mailed on Jan. 23, 2009.
Supplemental European Search Report for European Patent Application No. 03799307.8, mailed on Jun. 27, 2008.
Barclay et al., Microsoft TerraServer: A Spatial Data Warehouse, The Institution of Electrical Engineers Stevenage, Jun. 2000, Great Britain; and 2000 ACM Sigmod. International Conference on Management of Data, May 16-18, 2000, Dallas, Texas, vol. 29, No. 2, Jun. 1, 2000, pp. 307-318, retrieved from url: <frp://ftp.research.microsoft.com/pub/tr/tr-99-29.pdf>.
Bhatia et al., Design and Performance Analysis of A Distributed Image Space Navigator, Internet citation Aug. 1, 1997, Washington University Server Institute of Technology, Department of Computer Science.
Information Technology—Generic Coding of Moving Pictures and Associated Audio Information: Systems, International Standard, ISO/IEC 13818-1, Second Edition, Dec. 1, 2000.
Canadian Office Action for Canadian Patent Application no. 2,463,671, mailed Aug. 15, 2011.
U.S. Non-Final Office Action for U.S. Appl. 13/233,647, notification date Feb. 19, 2013, 16 pages.
U.S. Office Action for U.S. Appl. No. 13/233,682, dated Jan. 18, 2013.

* cited by examiner

ASYNCHRONOUS (PARALLEL)
READ OPERATIONS, ONE FOR
EACH COLUMN STRIP

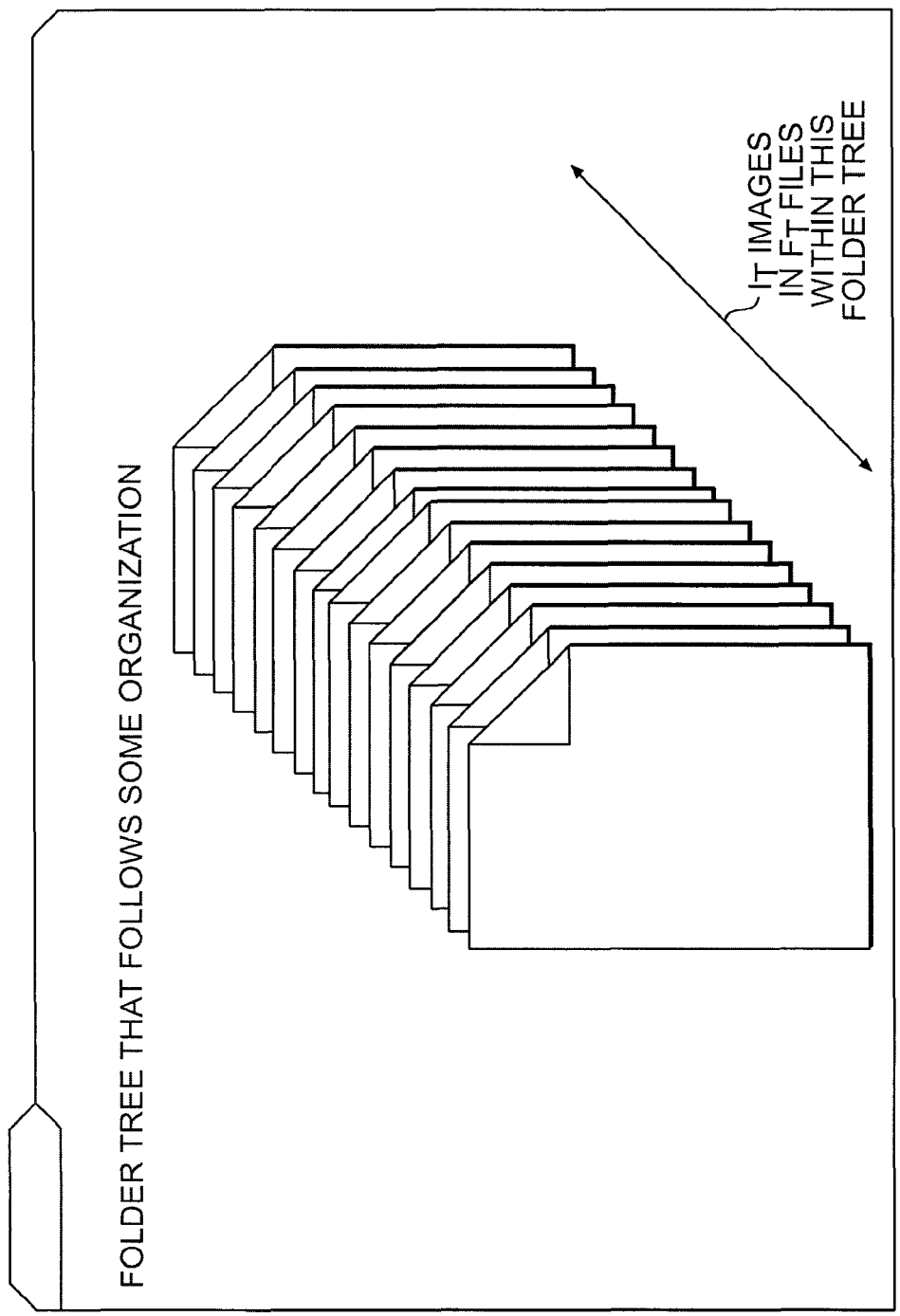

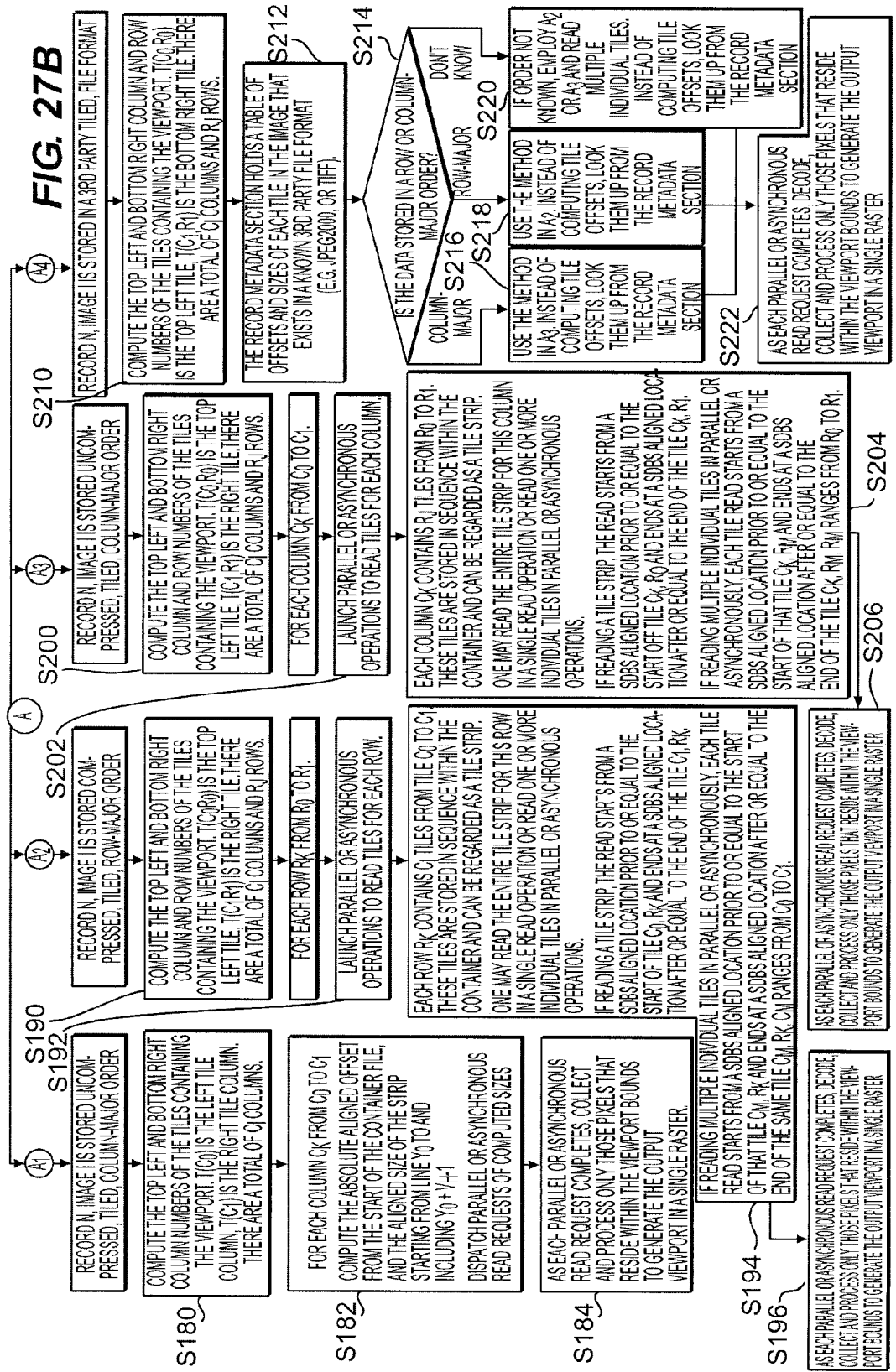

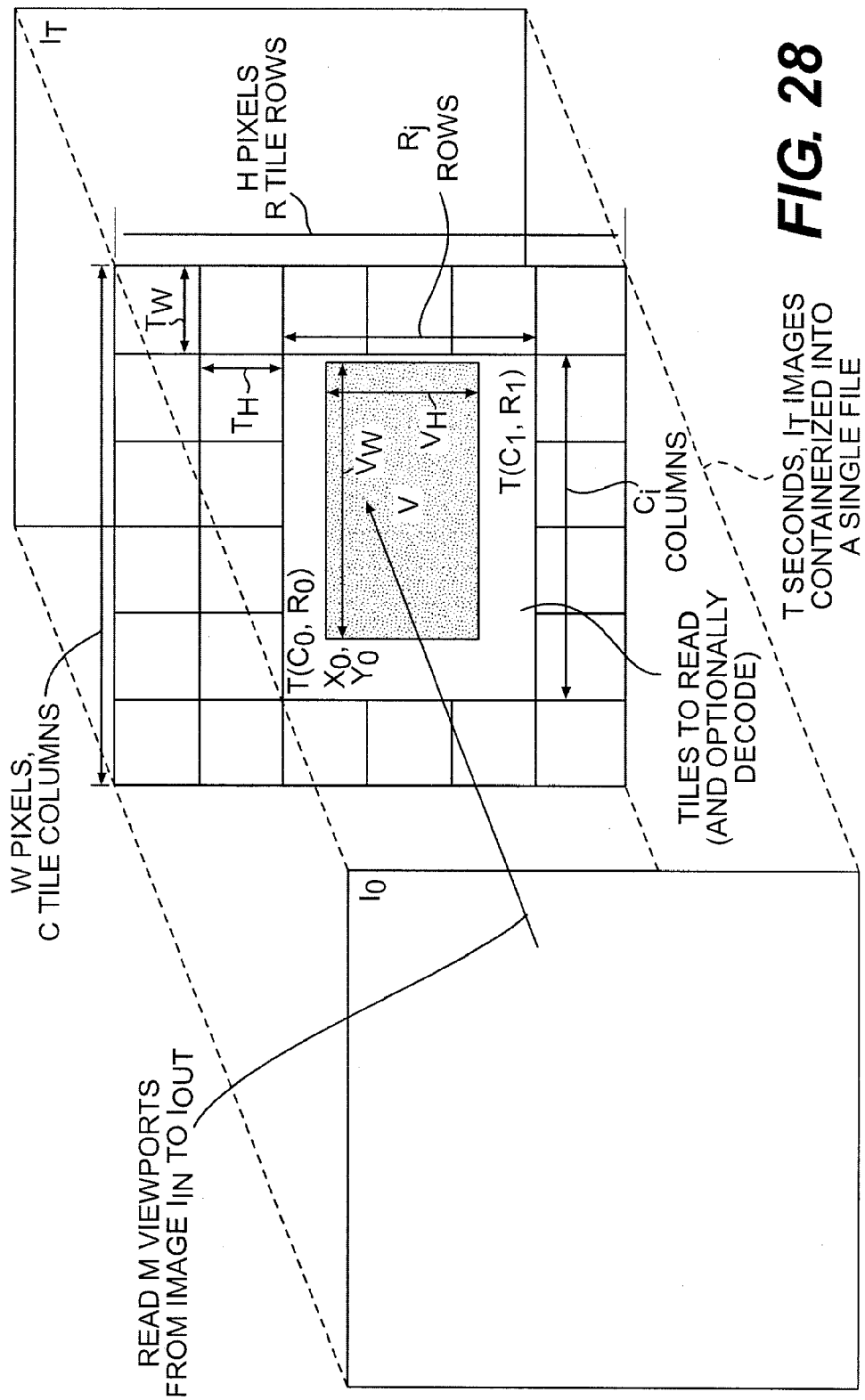

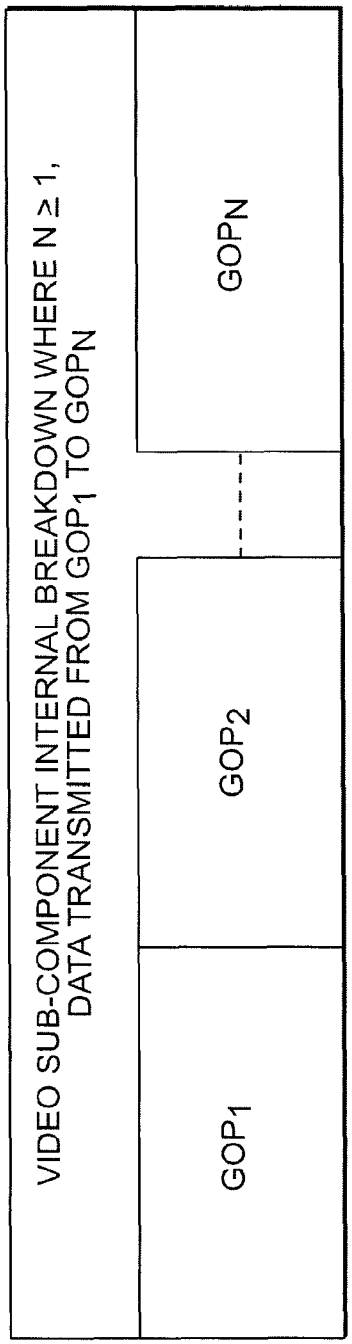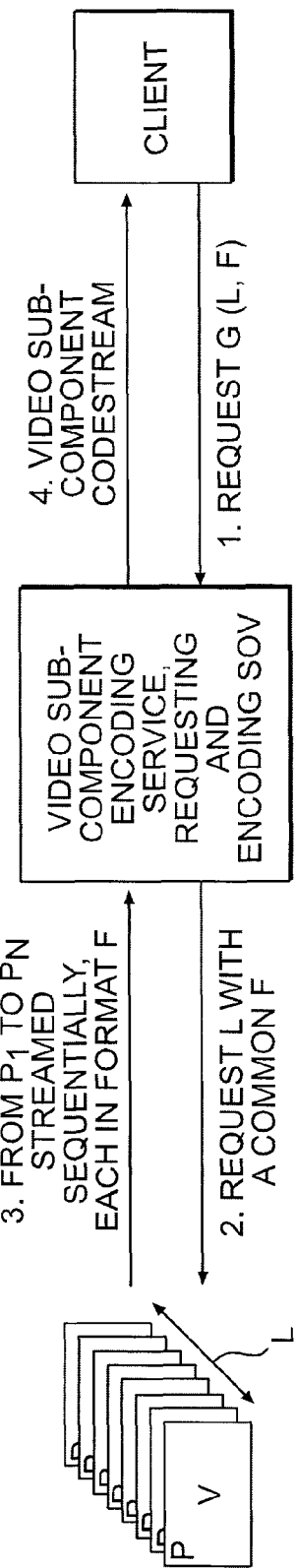

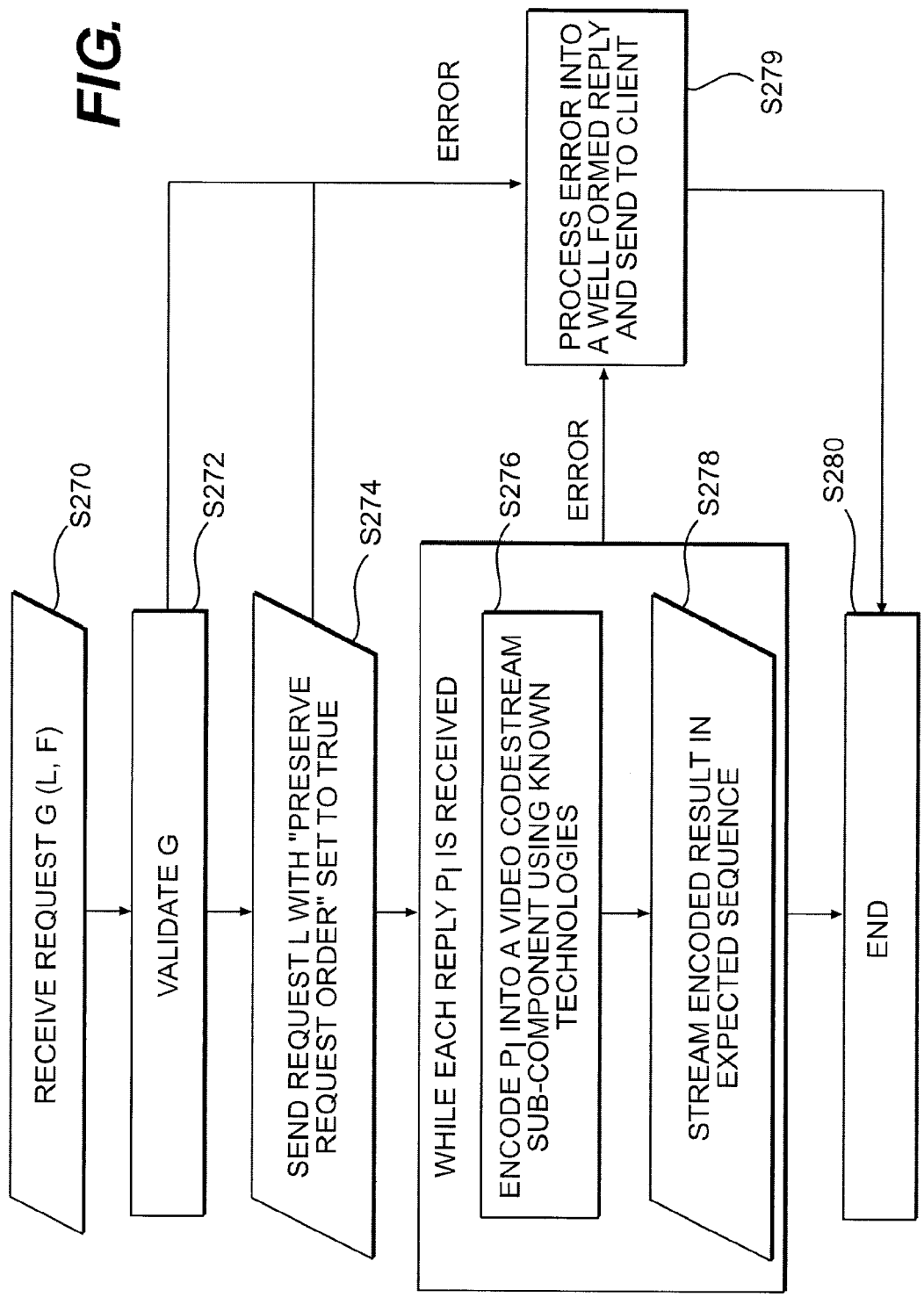

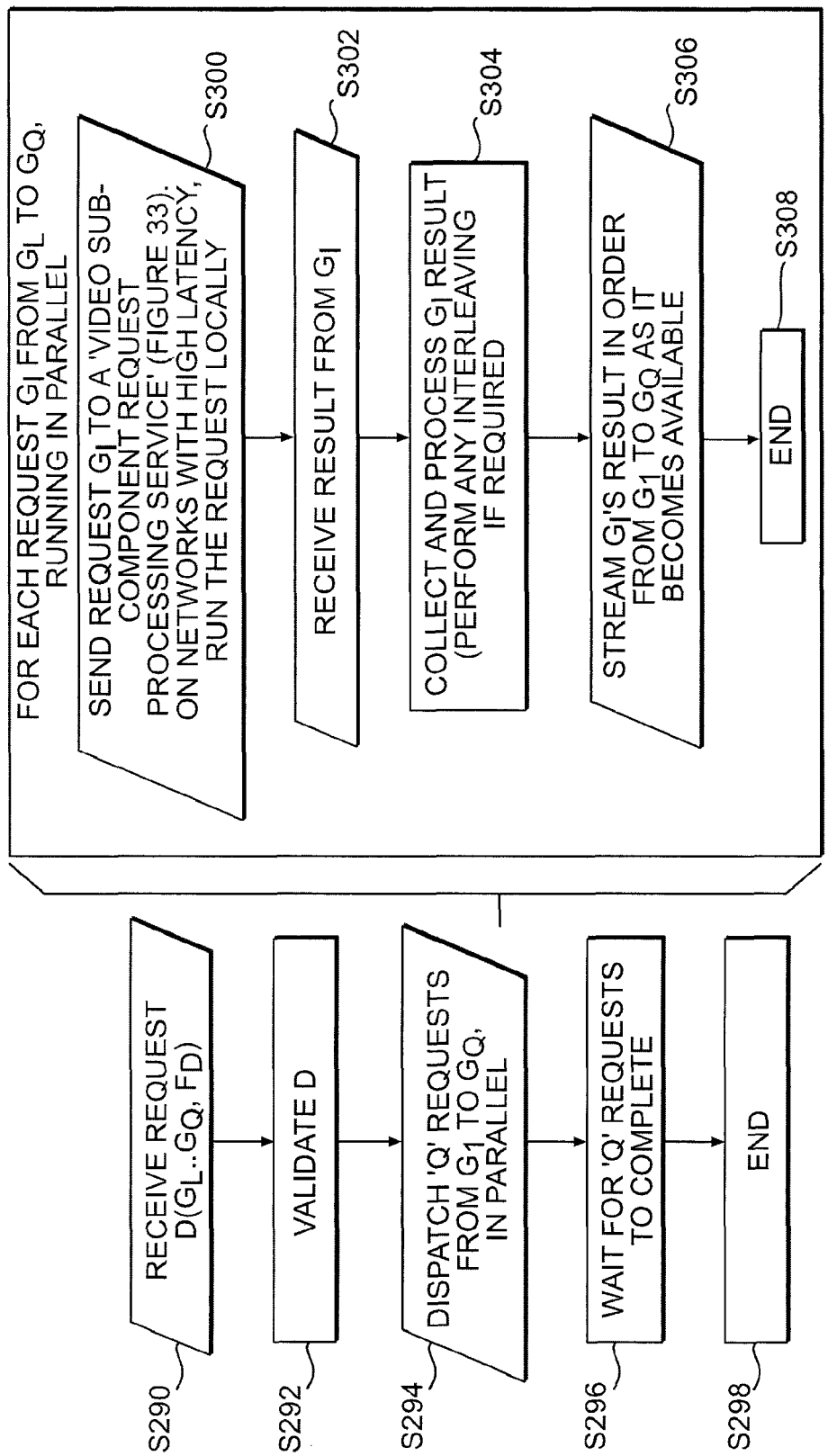

METHOD OF MAKING A VIDEO STREAM FROM A PLURALITY OF VIEWPORTS WITHIN LARGE FORMAT IMAGERY

CROSS REFERENCE TO RELATED APPLICATION

This application claims the benefit of U.S. patent application Ser. No. 61/383,566, filed on Sep. 16, 2010, the entire contents of which is incorporated herein by reference.

BACKGROUND OF THE INVENTION

1. Field of the Invention

The present invention pertains to image data management and in particular to a method of making a video stream from a plurality of viewports within large format imagery.

2. Discussion of Related Art

An image generally contains a plurality of pixels (e.g., several hundred megapixels) and each pixel has one, two or more bands. Each band has a certain color depth or bit depth. For example, an RGB color-based image has 3 bands, the red band (R), the green band (G) and the blue band (B). Each of the R, G and B bands can have a depth of 8 bits or more.

An image sensor can be used to capture a series of images, each image having several hundred megapixels. The images may be captured in sequence, for example at a reasonably constant frequency. Each image (i.e., each still image) in the sequence or series of images may have one or more distinct bands and may cover any part of the electromagnetic spectrum that can be captured by the image sensor. The image sensor may be a single sensor or a combination of a matrix of multiple sensors arranged to generate a single image. Therefore, the series of relatively large images captured by an image sensor over a certain period of time at a near constant capture rate are considered to be large format motion imagery.

BRIEF SUMMARY OF THE INVENTION

An aspect of the present invention is to provide a method of retrieving a plurality of viewports within a plurality of images, each image being arranged as a matrix of tiles, from a file container. The method includes inputting parameters including an identification of a plurality of records where the plurality of images containing the plurality of viewports are stored, an origin of each of the plurality of viewports and a pixel width and a pixel height of each of the plurality of viewports. The method further includes requesting the plurality of viewports from the file container using the parameters; and reading data of each of the plurality of viewports starting from the origin of each or the plurality of viewports.

Another aspect of the present invention is to provide a method for providing a video streaming service of a group of pictures from a container. The method includes receiving a request for streaming video of a sequence of viewports, each viewport being associated with one image in a plurality of images or records stored in the container; and validating the request by checking whether the viewports requested exist within specified records within the container. The method further includes encoding each received viewport request into a video codestream; and streaming the encoded video codestream in a desired sequence.

Although the various steps of the method are described in the above paragraphs as occurring in a certain order, the present application is not bound by the order in which the various steps occur. In fact, in alternative embodiments, the various steps can be executed in an order different from the order described above or otherwise herein.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

In the accompanying drawings:

FIG. 14B is a schematic representation of the series of images stored in a storage device as a plurality or sequence of image files in a folder tree, according to an embodiment of the present invention;

FIG. 27B is a flow chart of part of a method for retrieval of an image viewport from a container, according to an embodiment of the present invention;

FIG. 28 is a schematic representation of a viewport within an image stored within a container file, according to an embodiment of the present invention;

FIG. 31A is a diagram depicting the internal breakdown of a video sub-component comprising of a video codestream of one or more group of pictures (GOP), according to an embodiment of the present invention;

FIG. 31B is a diagram depicting a data path of a method for providing a streaming video sub-component as a web service derived from multiple image viewports from a container, according to an embodiment of the present invention;

FIG. 32 is flow chart depicting a method of translating a video sub-component request to multi-record request, according to an embodiment of the present invention;

FIG. 34A is a flow chart depicting a method of generating a complete video codestream using multiple parallel video sub-component requests, according to an embodiment of the present invention; and FIG. 34B is a flow chart depicting a sub-procedure within the method shown in FIG. 34A.

DETAILED DESCRIPTION OF EMBODIMENTS OF THE INVENTION

Figure 1:
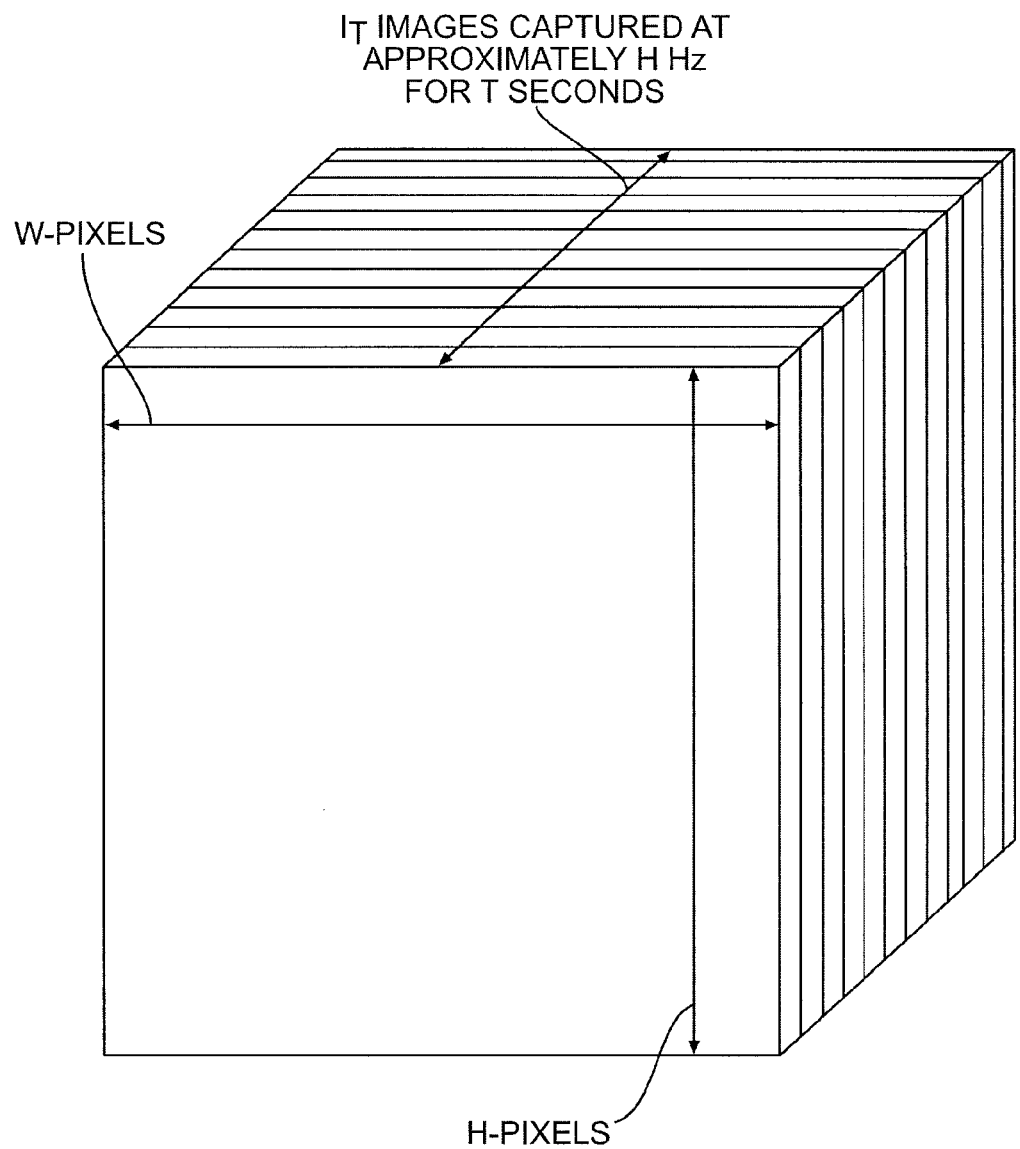
FIG. 1 is a schematic representation of a large format motion imagery including a series of still images.
Figure 2:
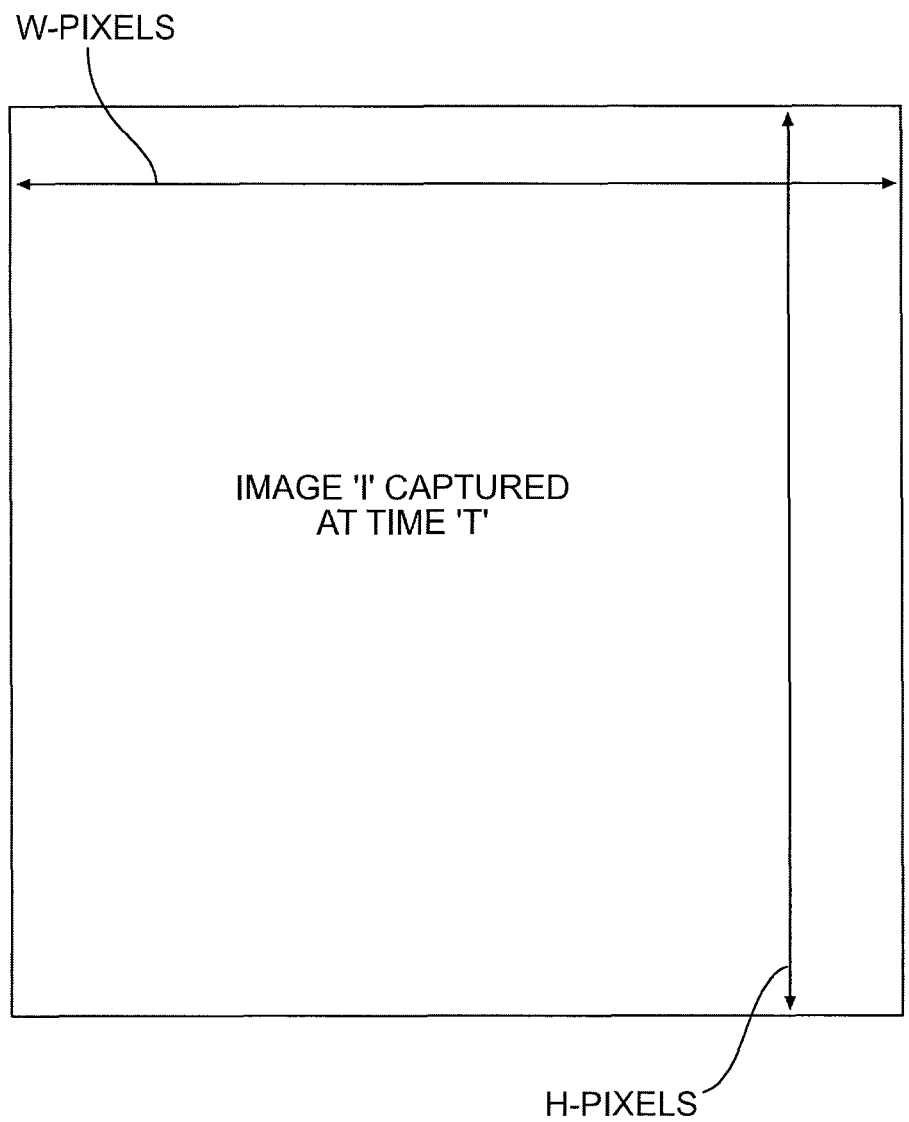
FIG. 2 is a schematic representation of a still image in the series of images shown in FIG. 1.
Figures 3A, 3B:
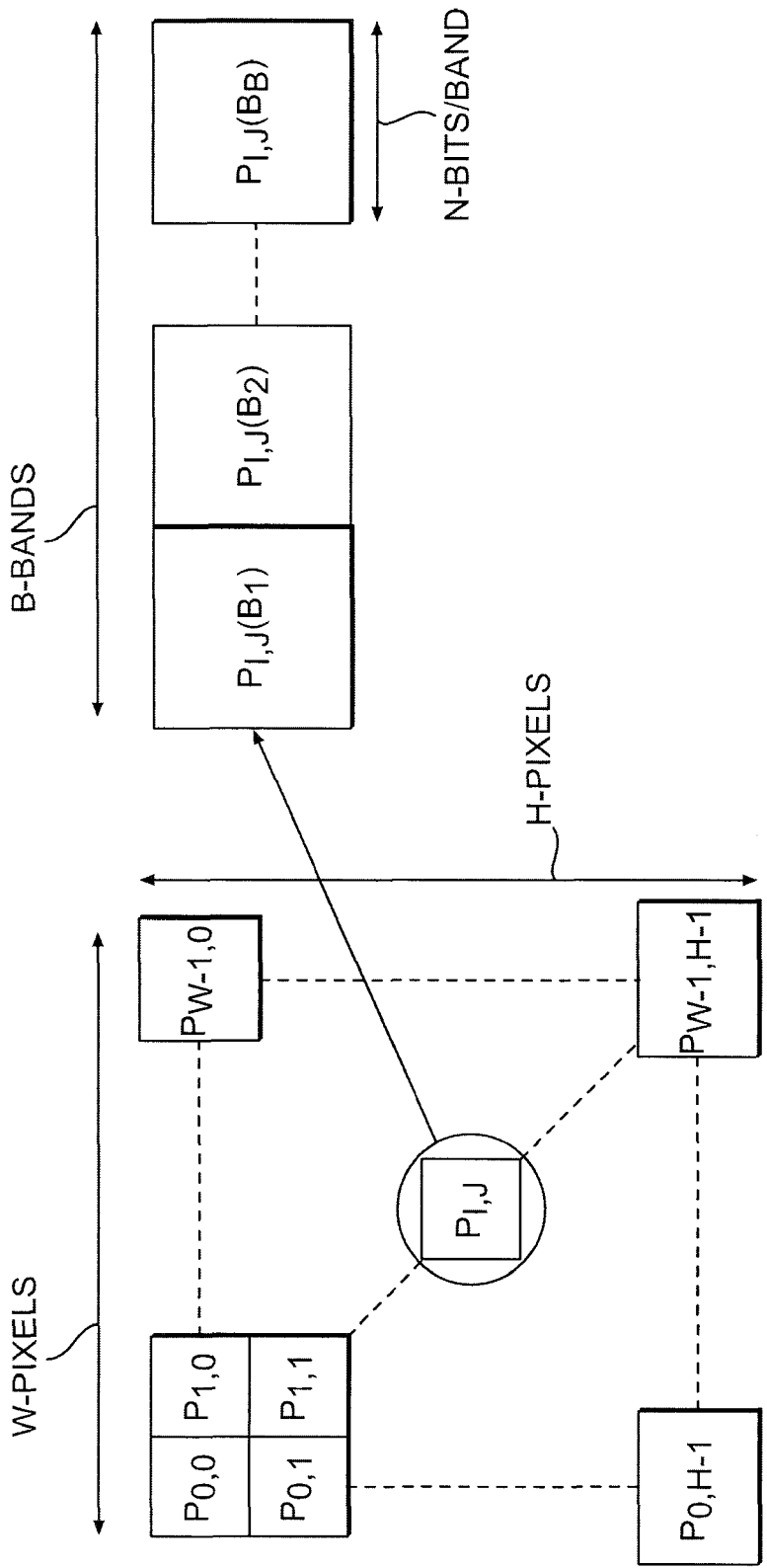
FIG. 3A depicts schematically the arrangement of pixels within an image.
FIG. 3B depicts schematically the configuration of a plurality of bands within each pixel shown in FIG. 3A.

FIG. 1 is a schematic representation of a large format motion imagery including a series of still images, according to an embodiment of the present invention. FIG. 2 is a schematic representation of a still image in the series of images shown in FIG. 1. As shown in FIG. 1 and FIG. 2, an image "I" captured at time "t" may be "W" pixels wide by "H" pixels tall. FIG. 3A depicts the arrangement of pixels within an image and the configuration of the plurality of bands within each pixel, according to an embodiment of the present invention. The pixels are arranged in a matrix layout with a first pixel element $P_{0,0}$ at the upper left corner of the matrix and a last pixel element $P_{w-1,h-1}$ at the lower right corner of the matrix. As shown in FIG. 3B, each pixel $P_{i,j}$ contains b-bands $(B_1, B_2, \ldots, B_b)$. Each band within each pixel contains N-bits per band, where N is an integer. In one embodiment, N is greater than 8 (N≥8) and N is an integer multiple of 8.

The capture rate is approximately "H" Hz. Hence, for a given time interval T (e.g., approximately every ½ second), the system or sensor may capture $I_T$ images, each image having the aforementioned layout depicted in FIG. 2. For example, the image may be 20,000 pixels-wide by 20,000 pixels-tall. For example, each pixel may have 3-bands (e.g., RGB) with each band carrying 8-bits.

Figure 4:
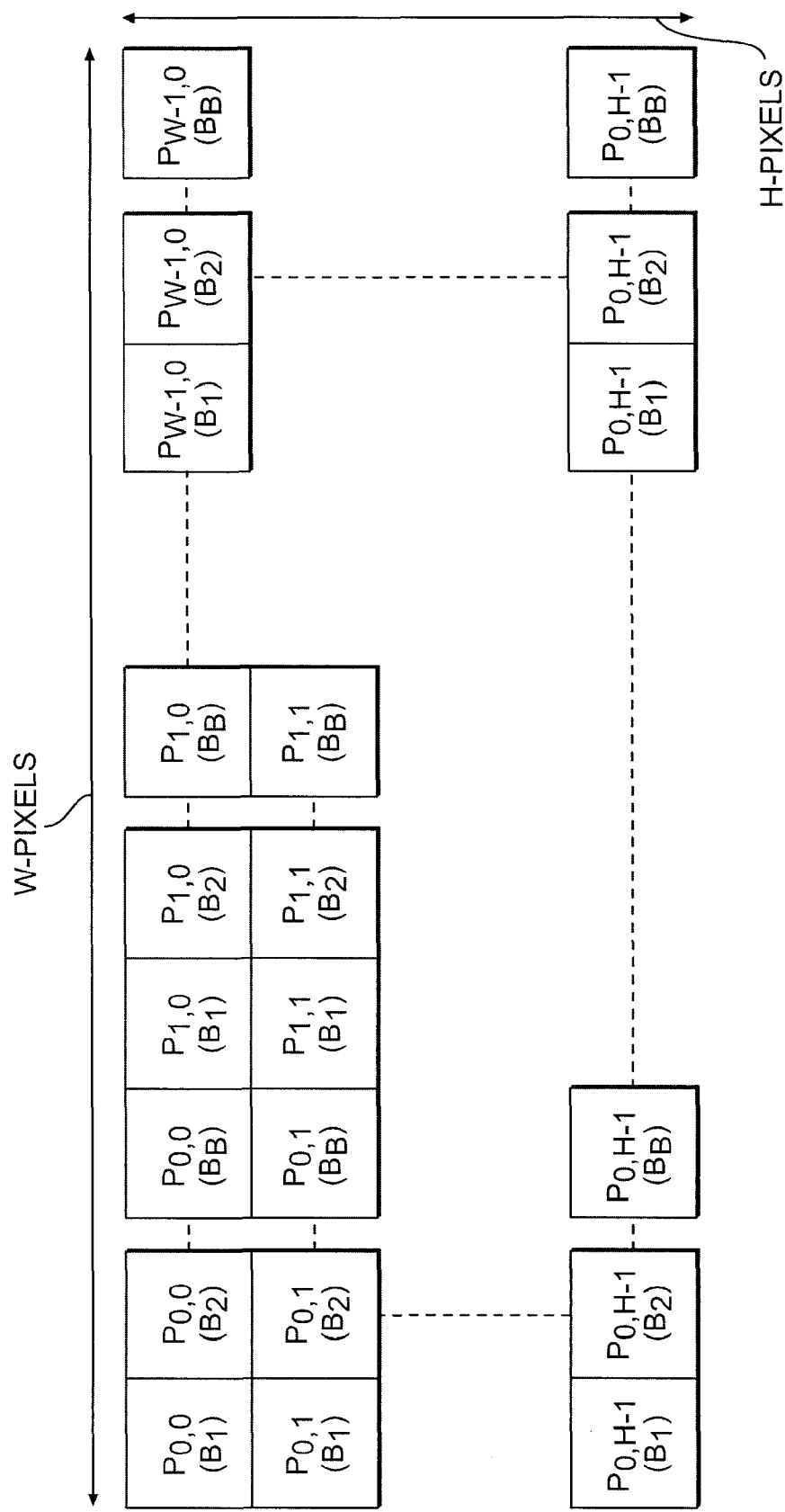
FIG. 4 depicts schematically an image in which the bytes of all bands for a given pixel are arranged for storage together in a row within the image, according to an embodiment of the present invention.
Figure 5:
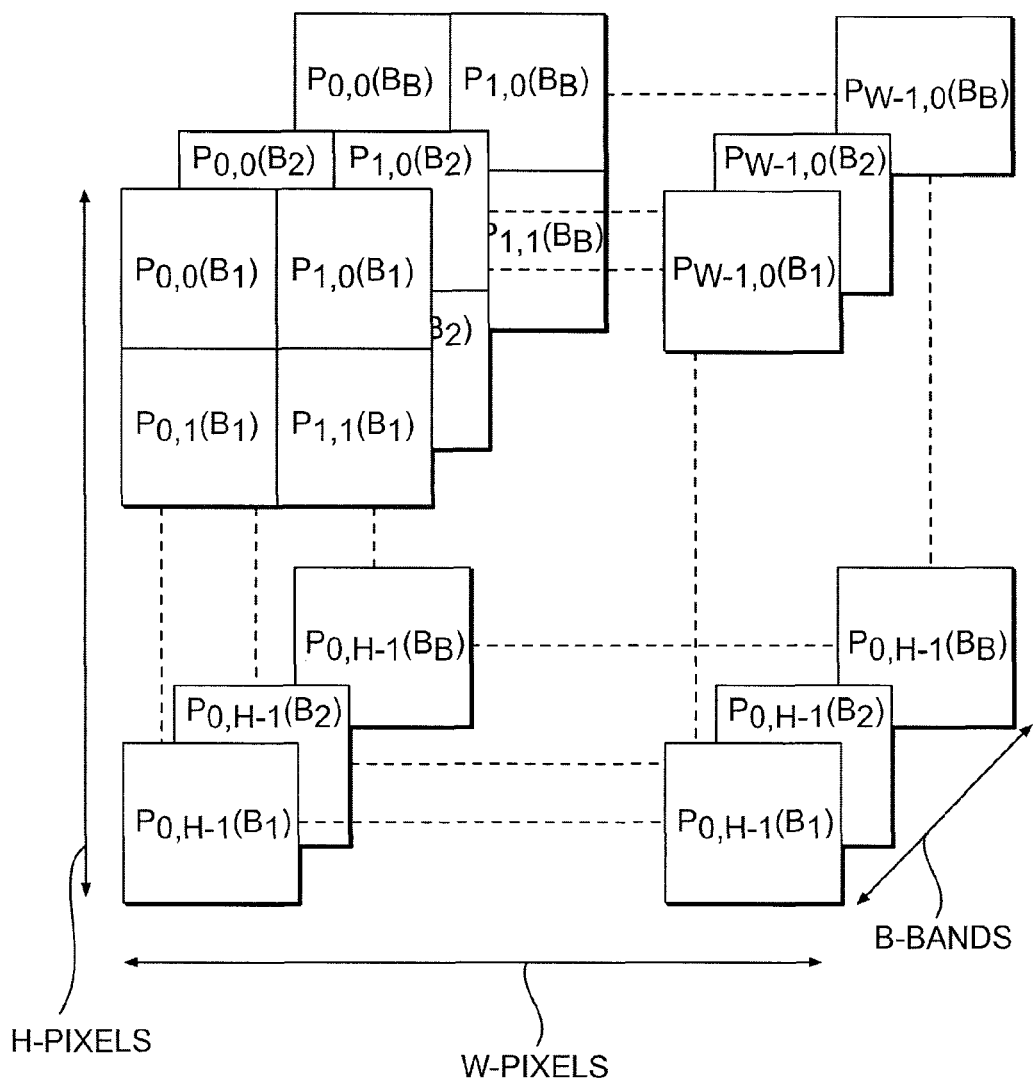
FIG. 5 depicts schematically an image where all pixels for one band are stored together, followed by all pixels for the next band, according to another embodiment of the present invention.

Generally, pixels in an image are organized as being band-interleaved by pixel (BIP) or band-sequential (BSQ). However, other methods of organizing pixels also exist. An image is considered to be stored as BIP when the bytes for all bands for a given pixel are stored together for any given row within an image. FIG. 4 depicts schematically an image in which the bytes of all bands for a given pixel are arranged for storage together in a row within the image. For example, as shown in FIG. 4, bytes of bands $B_1, B_2, \ldots, B_b$ of pixel $P_{0,0}$ are stored in a row followed by bytes of bands $B_1, B_2, \ldots, B_b$ of pixel $P_{1,0}$, etc. An image is considered to be stored as BSQ, when all pixels for one band are stored together, followed by all pixels for the next band, and so on. FIG. 5 depicts schematically an image where all pixels for one band are stored together, followed by all pixels for the next band, and so on. For example, as shown in FIG. 5, pixels having band $B_1$ are stored together followed by pixels having band $B_2$, etc.

In order to facilitate efficient retrieval of an image, each image in the image sequence is tiled. An image is broken down into individual image tiles, each image tile having a specific pixel width and pixel height. Each image tile is smaller than a single large format motion image. For example, a tile may be 128, 256, 512 or 1024 pixels wide and 128, 256, 512 or 1024 pixels tall for the above mentioned image having 20,000×20,000 pixels.

Figure 6:
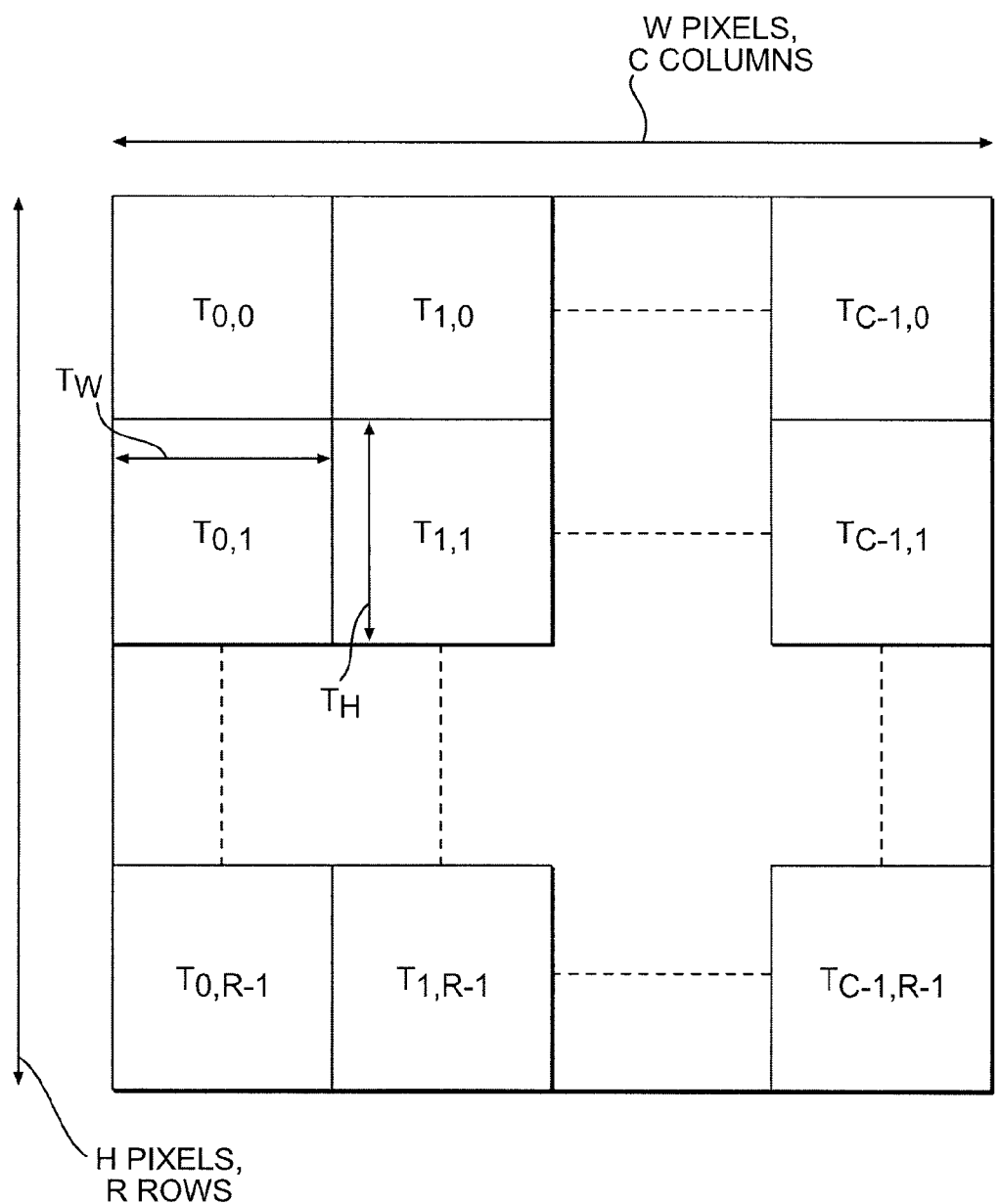
FIG. 6 depicts a configuration of tiles within an image, according to an embodiment of the present invention.

Each image tile may be organized as BIP or as BSQ or using any desired pixel layout. For example, for BSQ organized images, the raster data for each band may be tiled separately. FIG. 6 depicts a configuration of tiles within an image. As shown in FIG. 6, the image is broken down into tiles and there are R-rows and C-columns of tiles within the image. As shown in FIG. 6, each tile is $T_w$ pixels wide by $T_h$ pixels tall, such that $C \times T_w \geq W$ and $R \times T_h \geq H$, where W is the width of the image and H is the height of the image.

Figure 7:
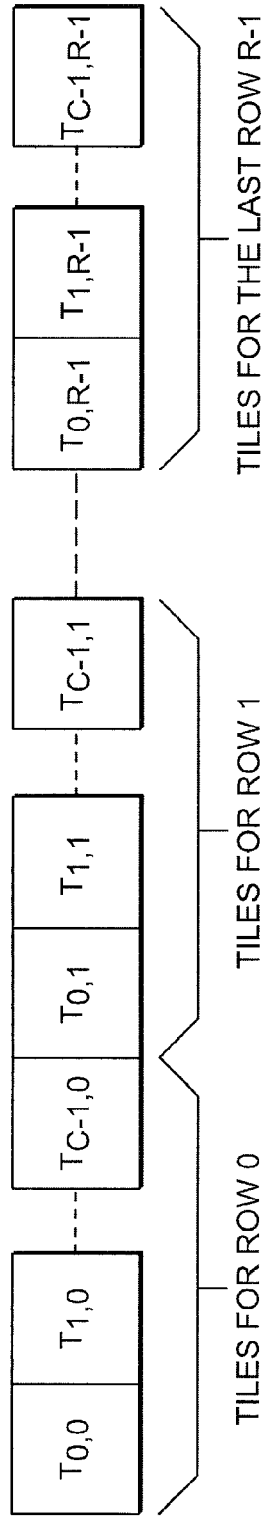
FIG. 7 depicts an organization of tiles in a row-major order, according to an embodiment of the present invention.

Generally, tiles for most file formats are organized in row-major order as an image is often scanned from left-to-right, top-to-bottom. FIG. 7 depicts the organization of tiles in a row-major order. In row-major order, tiles are stored on a storage device such that for each row $R_j$, bytes for tiles for columns 0 to C-1 are stored adjacent to each other.

Figure 8:
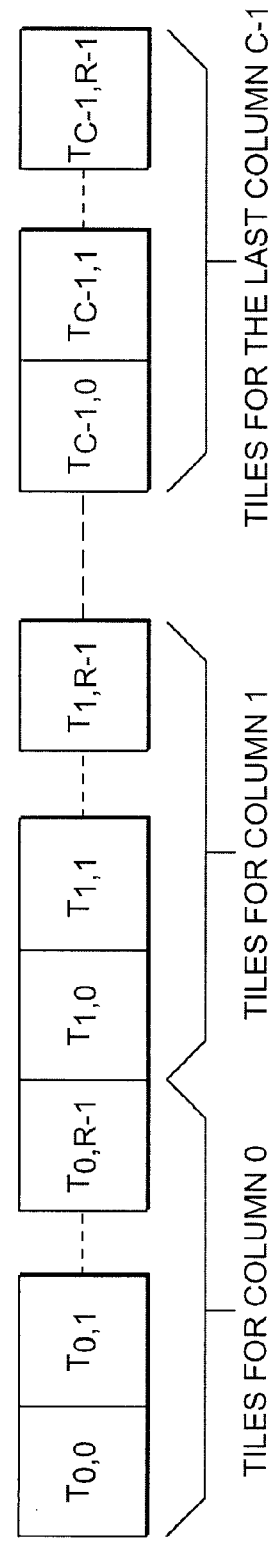
FIG. 8 depicts an organization of tiles in a column-major order, according to another embodiment of the present invention.

However, storing tiles in column-major order may be more efficient for reading and/or updating tiles that are stored without any compression, i.e. uncompressed. FIG. 8 depicts the organization of tiles in a column-major order. In column major order, tiles are stored on a storage device such that for each column $C_i$, bytes for tiles for successive rows 0 to R-1 are stored adjacent to each other, as will be discussed further in detail in the following paragraphs. If the image is stored uncompressed, the location of the tiles can be calculated algebraically provided the tile layout order (row or column-major) is known. For tiles that are stored in compressed format, compression technology, compression format standards, and the implementation of compression technology and standards dictate the efficiency with which image data is stored or retrieved. Hence, in a compressed format, tile storage order may become irrelevant. As will be explained further in detail in the following paragraphs, in one embodiment, at least a portion of a tile in the plurality of stored tiles overlaps another tile in the plurality of tiles (e.g. an adjacent tile).

Figure 9:
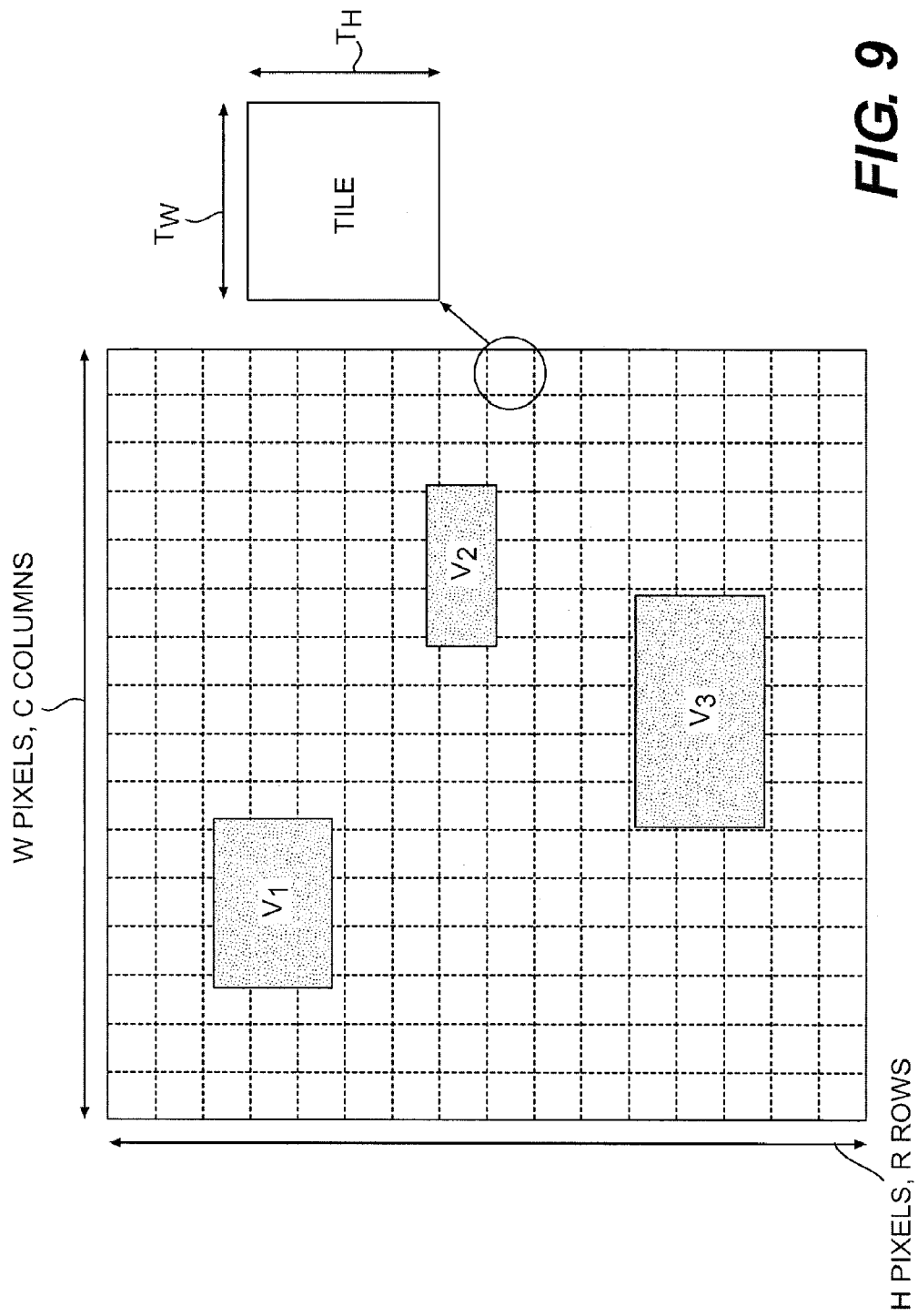
FIG. 9 depicts a tiled image with examples of viewports or windows including or covering one or more tiles, according to an embodiment of the present invention.

FIG. 9 depicts a tiled image with examples of viewports or windows including or covering one or more tiles. If each tile is stored as an independent entity on a storage device, in order to extract, access or read a given viewport such as viewport $V_1, V_2$ or $V_3$ within the image shown in FIG. 9, it may become necessary to read one or more tiles. In one embodiment, a storage device may be a part of primary storage (such as main memory) or secondary storage (such as SSD or hard-disk storage) on any general purpose computing platform. A large number of standardized file formats support this tile layout within their storage schema. Examples of image file formats include JPEG, JPEG2000, TIFF, and NITF. Some of these file formats, such as JPEG2000, also store the size of each tile as part of the file-header of each tile.

Figure 10A:
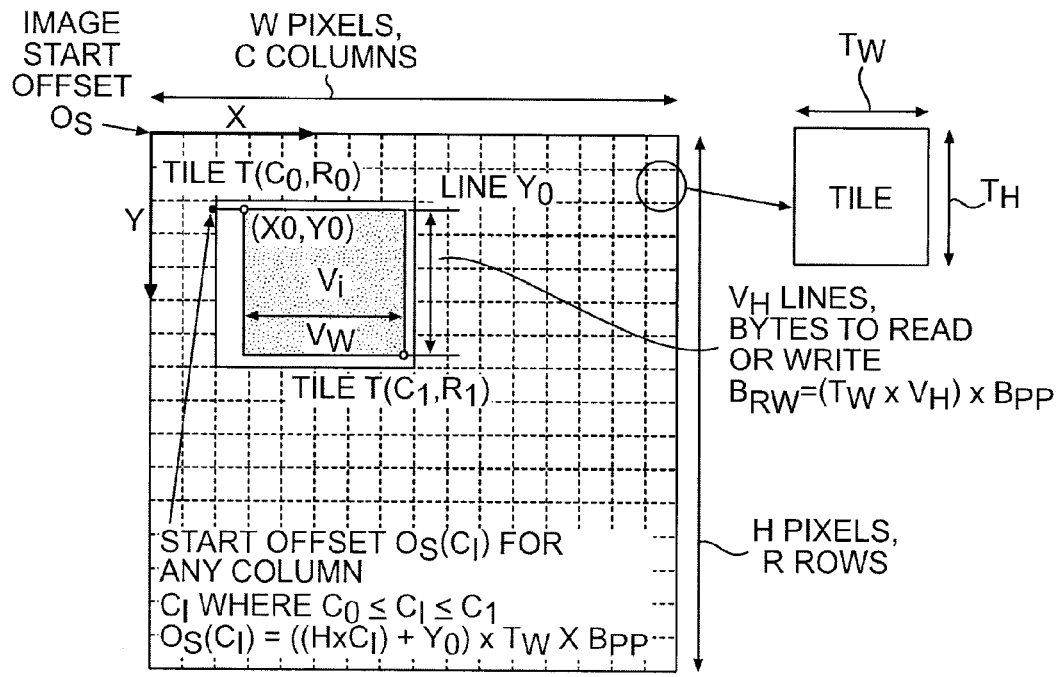
FIG. 10A depicts a tiled image with tiles stored in column-major order and an example of a viewport within the tiled image, according to an embodiment of the present invention.

As stated above, one method of storing a single image is by storing the image as uncompressed tiles in column-major order (as shown in FIG. 8). Another method of storing an image, according to another embodiment of the present invention, is illustrated in FIG. 10A. FIG. 10A depicts a tiled image with tiles stored in column-major order and an example of a viewport within the tiled image. The viewport has top left corner $X_0, Y_0$, and $V_w$ pixels wide and $V_h$ pixels tall. It is assumed that the viewport is wholly contained within the image. In this method, the relative offset for reading or writing a viewport (the viewport having top left corner $X_0, Y_0, V_w$ pixels wide and $V_h$ pixels tall) from an image stored with an uncompressed, tiled scheme in column major order can be computed. A write operation, in this case, is an optional read of the viewport, an optional modification of existing data in the viewport and a write of the viewport. Offset and size computations for both read and write operations are similar.

Figure 10B:
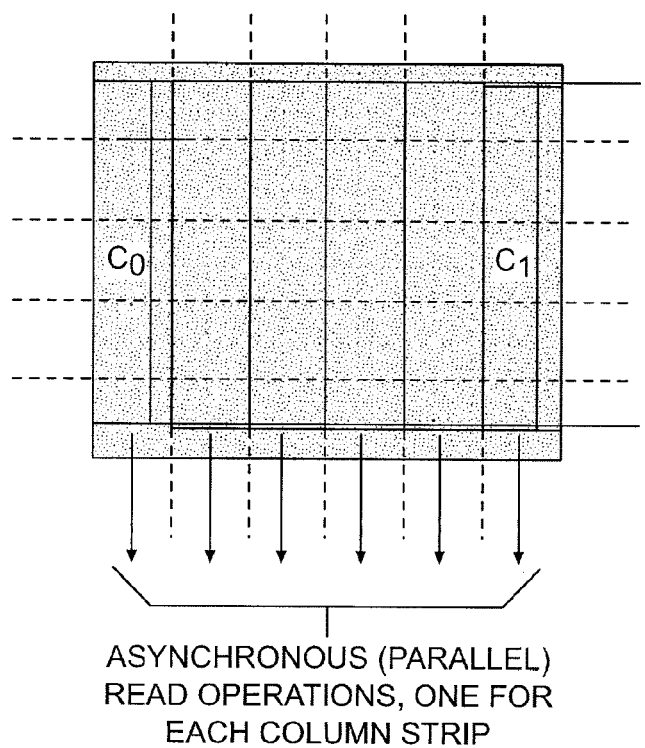
FIG. 10B depicts a computational operation for accessing or reading tiles within the viewport from a storage device, according an embodiment of the present invention.

As depicted in FIG. 10B, when the order of tile layout is column major, for each column, all H lines are laid out sequentially on the storage device. For a given viewport $V((X_0, Y_0), V_w \times V_h)$, instead of having to read a sequence of tiles that wholly contain the viewport (from the top left tile $T(R_0, C_0)$ to the bottom right tile $T(R_1, C_1)$), for each column ($C_0$ to $C_1$), a strip of data is read starting from the first line ($Y_0$) of that viewport, going down to the height of the viewport ($V_h$ lines), as illustrated in FIG. 10B.

As it can be appreciated, a user-defined viewport's dimensions ($V_w$ and $V_h$) may not be an exact multiple of $T_w$ (tile width) and $T_h$ (tile height). Following a column-major order storage schema for uncompressed tiles, in aggregate, the amount of data read from the storage device can be reduced. For example, in the case shown in FIG. 10A, for each column from $C_0$ to $C_1$, instead of reading from line number $R_0 \times T_h$ up to and including line number $(R_1 \times T_h) - 1$, the data is read from line $Y_0$ up to and including line number $Y_0 + V_h - 1$. In one embodiment, for the top left of the viewport, the position of column $C_0$ is computed as $C_0 = \text{floor}(X_0/T_w)$ and the position of row $R_0$ is computed as $R_0 = \text{floor}(Y_0/T_h)$ where $T_w$ and $T_h$ are respectively, the width and the height of a tile T. For the bottom right of the viewport, the position of column $C_1$ is computed as $C_1 = \text{floor}((V_w + X_0 - 1)/T_w)$ and the position of row $R_1$ is computed as $R_1 = \text{floor}((V_h + Y_0 - 1)/T_h)$.

In order to read the viewport (e.g., the viewport shown in FIG. 10A), for each column $C_i$ that ranges from $C_0$ to $C_1$ (including $C_1$), $B_{rw}$ bytes are read starting from relative offset $O_s(C_i)$ where $B_{rw} = T_w \times V_h \times B_{pp}$ and $O_s(C_i) = ((H \times C_i) + Y_0) \times T_w \times B_{pp}$. The term relative offset is used deliberately. It is assumed that the image data starts at an absolute file offset of $O_s$, which may include an optional header and any preceding data. Thus, the absolute offset for this location within the image file on a storage device would be $O_s + O_s(C_i)$. Furthermore, in one embodiment, for reading or writing these tile column strips from $C_0$ to $C_1$, each read or write operation is dispatched as a parallel asynchronous task. As a result, read operations are parallelized for each column. The part of code that actually merges data from all columns into a single contiguous viewport may be also implicitly parallelized.

If each tile T is compressed, the size in bytes $S_T$ to be reserved for each compressed tile T would be $S_T = S_{TU}/C_R$, where $S_{TU}$ is the size of each tile in bytes in its uncompressed form and $C_R$ is the compression ratio, where $C_R > 1$. The offset $O_s(T_k)$ is defined as the number of bytes relative to the start of the image where the data for tile $T_k$ begins in the image. The offset $O_s$ is defined as the number of bytes from the start of the container file where the data for the image begins. Tile $T_k$ is at column number $C_i$ and row number $R_j$ and is represented as $T_k(C_i, R_j)$. All tiles are assumed to have substantially a same size $S_T$.

Depending on the compression method employed, the actual amount of compressed data for a tile may be less than or equal to the size in bytes $S_T$ reserved for each compressed tile T. The actual amount of compressed data will never be greater than $S_T$. Therefore, reserving $S_T$ bytes for each tile will wholly contain the compressed data for each compressed tile of the image. By making the compressed tile size a constant, the need to store offsets and/or sizes for each tile can be eliminated. As a result, searching through such a list of offsets and/or sizes in order to find the location of a compressed tile can also be eliminated.

Storage devices are generally optimized to read and write data in multiples of the storage device block size (SDBS). A storage device block size (SDBS) is an integer multiple of the minimum number of bytes that a storage device is setup to read or write in a single input-output (I/O) operation. This number is generally $512 \times 2^n$ where n is an integer greater than or equal to 0. Aligning a value to SDBS means increasing or decreasing the value by an amount such that the resulting value is an integer multiple of SDBS. For example, if $B_{sz}$ denotes the storage device block size SDBS, "A % B" implies the "A modulo B" operation which is the remainder of division of A by B, and O' aligns an absolute file offset O to SDBS, then O' can be less than or equal to or greater than or equal to O. If $O' \leq O$ then $O' = O - (O \% B_{sz})$. If $O' \geq O$ then $O' = O + (B_{sz} - (O \% B_{sz})) \% B_{sz}$.

A storage device can be further optimized to read and write data starting from a location in the file that is an integer multiple of SDBS. If $S_T$ is not an integer multiple of SDBS, in order to optimize reads and writes, the value of $S_T$ can be adjusted to increase to become an integer multiple of SDBS. The extra filler bytes can be provided at the end of the actual data bytes and must be set to null values.

For example, as shown in FIG. 10A, a viewport within a large format image can be accessed. The top left tile $T_0$ containing the top left pixel $(X_0, Y_0)$ is represented as $T_0(C_0, R_0)$. The bottom right tile $T_1$ containing the bottom right pixel $(X_1, Y_1)$ is represented as $T_1(C_1, R_1)$, where $X_1 = X_0 + V_w - 1$, and $Y_1 = Y_0 + V_h - 1$ ($V_w$ and $V_h$ being respectively the width and height of the viewport).

If the compressed image tiles are stored in column-major order, any tile $T_k(C_i, R_j)$ is located at offset $O_s(T_k)$ such that $O_s(T_k) = S_T \times (R \times C_i + R_j)$. If on the other hand the compressed image tiles are stored in row-major order, any tile $T_k(C_i, R_j)$ is located at offset $O_s(T_k)$ such that $O_s(T_k) = S_T \times (C \times R_j + C_i)$. Hence, the location of each compressed tile containing the requested viewport within the image can be computed rather than looked up.

If a display device that is configured to display a viewport from the image has an upper limit to its viewport width and height, a method can be used to minimize read time by creating tiles containing pixels that overlap pixels from adjacent tiles. For example, the display device has a pixel width $D_w$ and pixel height $D_h$. The display device can be configured to display at least a portion of an image having pixel width W and pixel height H. The image can be stored in the tiled format specified above such that $0 < D_w < T_w$ and $0 < D_h < T_h$.

Figures 11A, 11B:
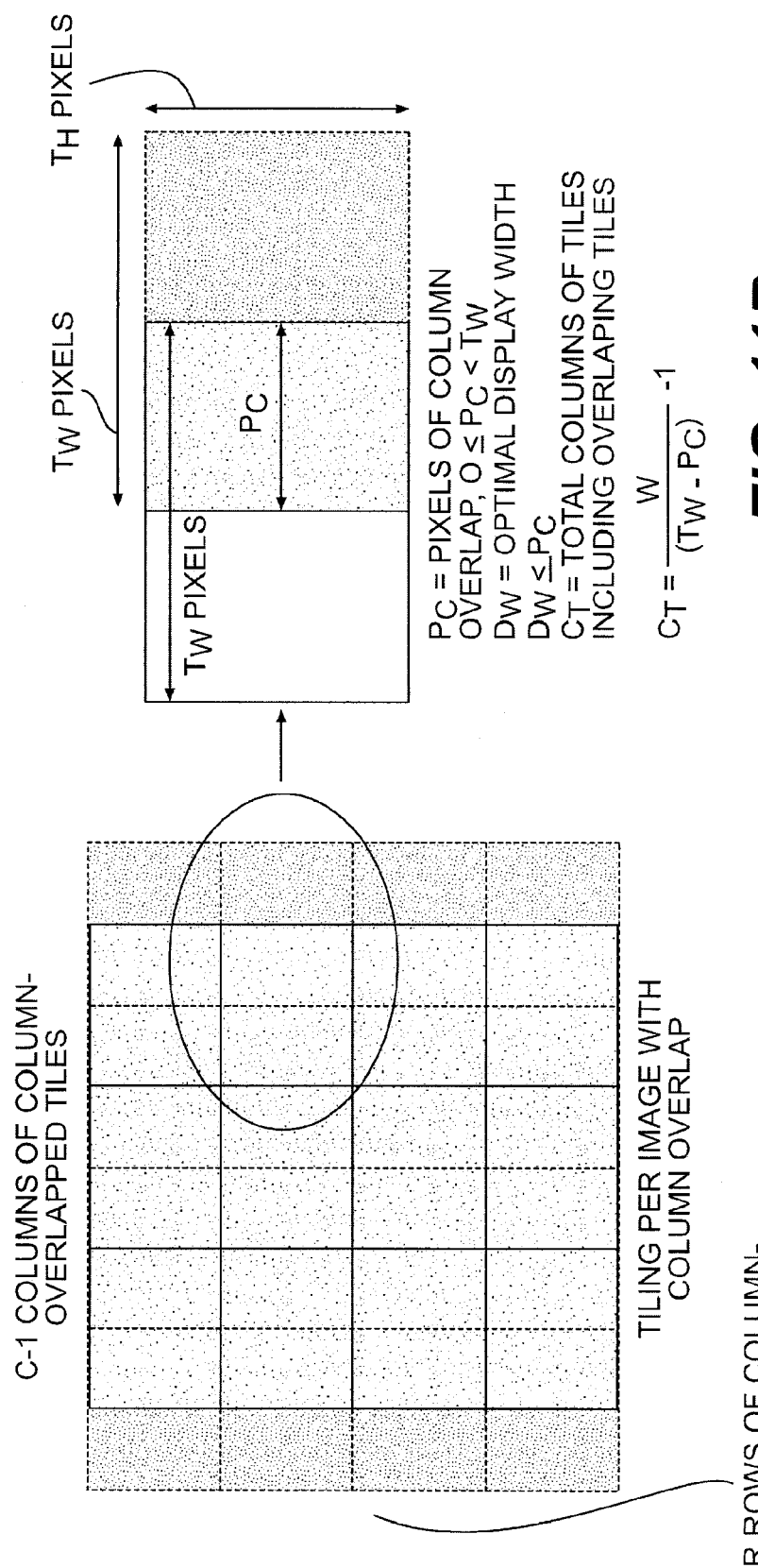
FIG. 11A shows a tiled image having column-overlapped tiles, according to an embodiment of the present invention.
FIG. 11B shows an example of overlapped columns in one row of the tiled image depicted in FIG. 11A.
Figures 12A, 12B:
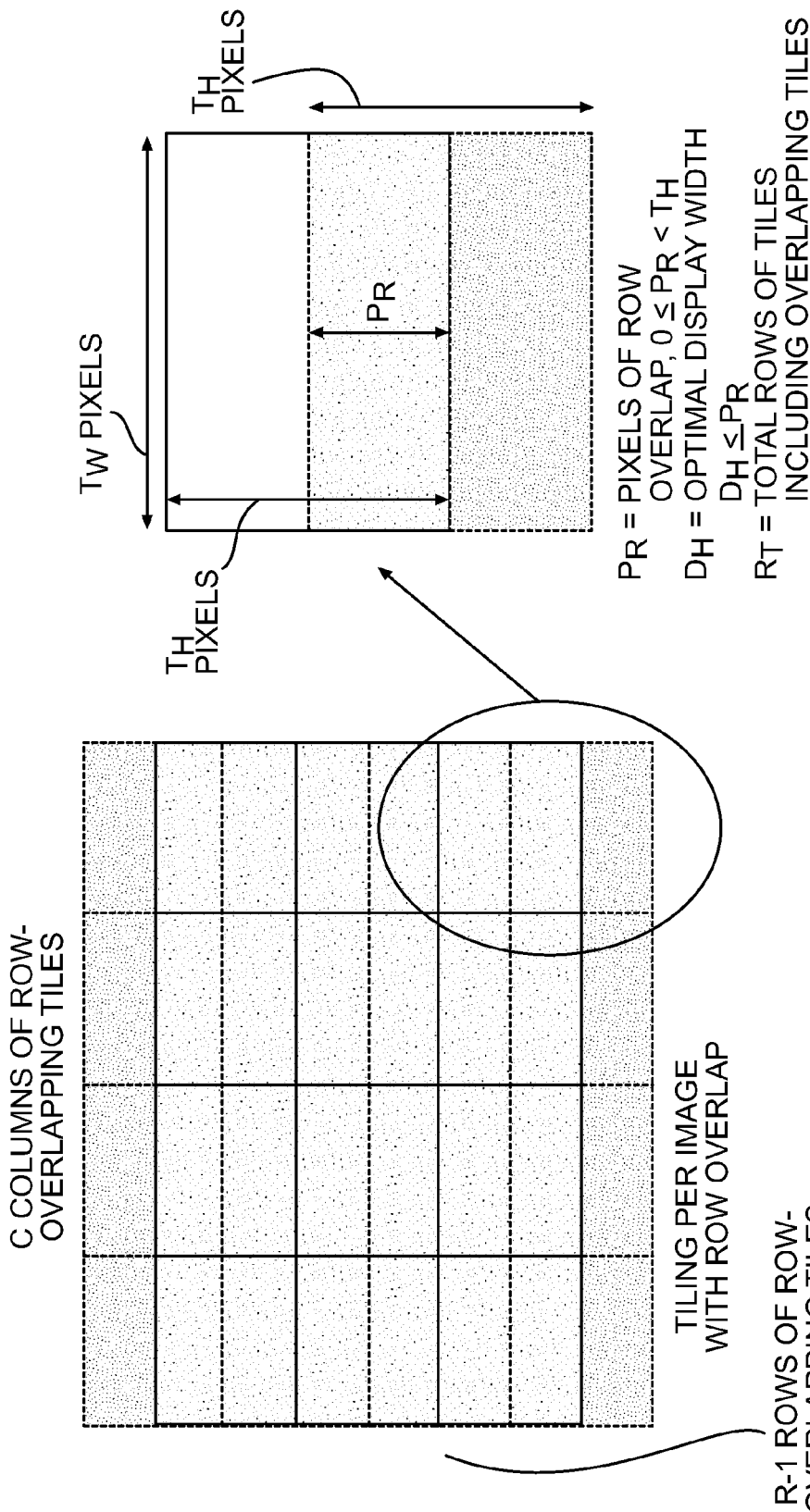
FIG. 12A shows a tiled image having row-overlapped tiles, according to an embodiment of the present invention.
FIG. 12B shows an example of overlapped rows in one column of the tiled image depicted in FIG. 12A.

FIG. 11A shows a tiled image having column-overlapped tiles. FIG. 11B shows an example of overlapped columns in one row of the tiled image depicted in FIG. 11A. FIG. 12A shows a tiled image having row-overlapped tiles. FIG. 12B shows an example of overlapped rows in one column of the tiled image depicted in FIG. 12A.

In one embodiment, a display device or processing device having a specified upper limit to its viewport pixel width $D_w$ and pixel height $D_h$ can be provided to display or process a viewport from the image of width W and height H pixels. For example, the image can be stored in the tiled format specified above such that $0 < D_w < T_w$ and $0 < D_h < T_h$. A method can be used to minimize read time to one seek and one read operation by creating tiles containing pixels that overlap pixels from adjacent tiles.

An overlap of $P_c$ pixels provides that two adjacent columns have $P_c \times T_h$ area that has the same pixels in both tiles. Similarly, an overlap of $P_r$ pixels provides that two adjacent rows have $P_r \times T_w$ area that has the same pixels in both tiles. The displayed image portion can be overlapping either along a column or along a row, or both. The image data can be stored in this overlapping manner on a storage device so that redundant data can be generated to facilitate efficient read for displaying on a display device.

If a number of pixels of overlap $P_c$ is equal to 0, no overlap is present between adjacent tiles. If $D_w \leq P_c$ (where $P_c$ is the amount of column overlap in pixels), then one and only one column will contain the entire width of the requested viewport. When the displayed width $D_w \leq P_c$ (where $P_c$ is the amount of column overlap in pixels) and the displayed height $D_h \leq P_r$ (where $P_r$ is the amount of row overlap in pixels) any desired viewport within the image may be displayed using a single seek and read operation from the storage device. As it can be appreciated, the image can be overlapped either along a column, along a row, or both.

For example, in the case where each tile is stored uncompressed (assuming that ample storage is available), if the image is stored uncompressed on a storage device following a column-major order as described in the above paragraphs, the image does not require row overlapping to fulfill the above single seek and read requirement. Row overlap is implicit. This is because within a column, one can access data from any line to any line. It would therefore only need column overlapping.

On the other hand when each tile is stored compressed (assuming that ample storage is available) and a single seek and read operation off the storage device is desired, line-by-line access is no longer possible because compressed tiles are whole tiles, encoded as a single entity. Therefore, in order to access the displayed viewport, both row and column overlapping that has $D_w \leq P_c$ and $D_h \leq P_r$ would be needed. This would involve the application of both the methods depicted schematically in FIGS. 11A, 11B, 12A and 12B.

If the above constraints for overlapping are implemented, a viewport of pixel width $D_w$, and pixel height $D_h$ is always contained within one and only one tile $T_v(C_v, R_v)$. In other words, an area or viewport $D_w \times D_h$ displayed on a displayed device is contained within a single tile T.

Figure 13A:
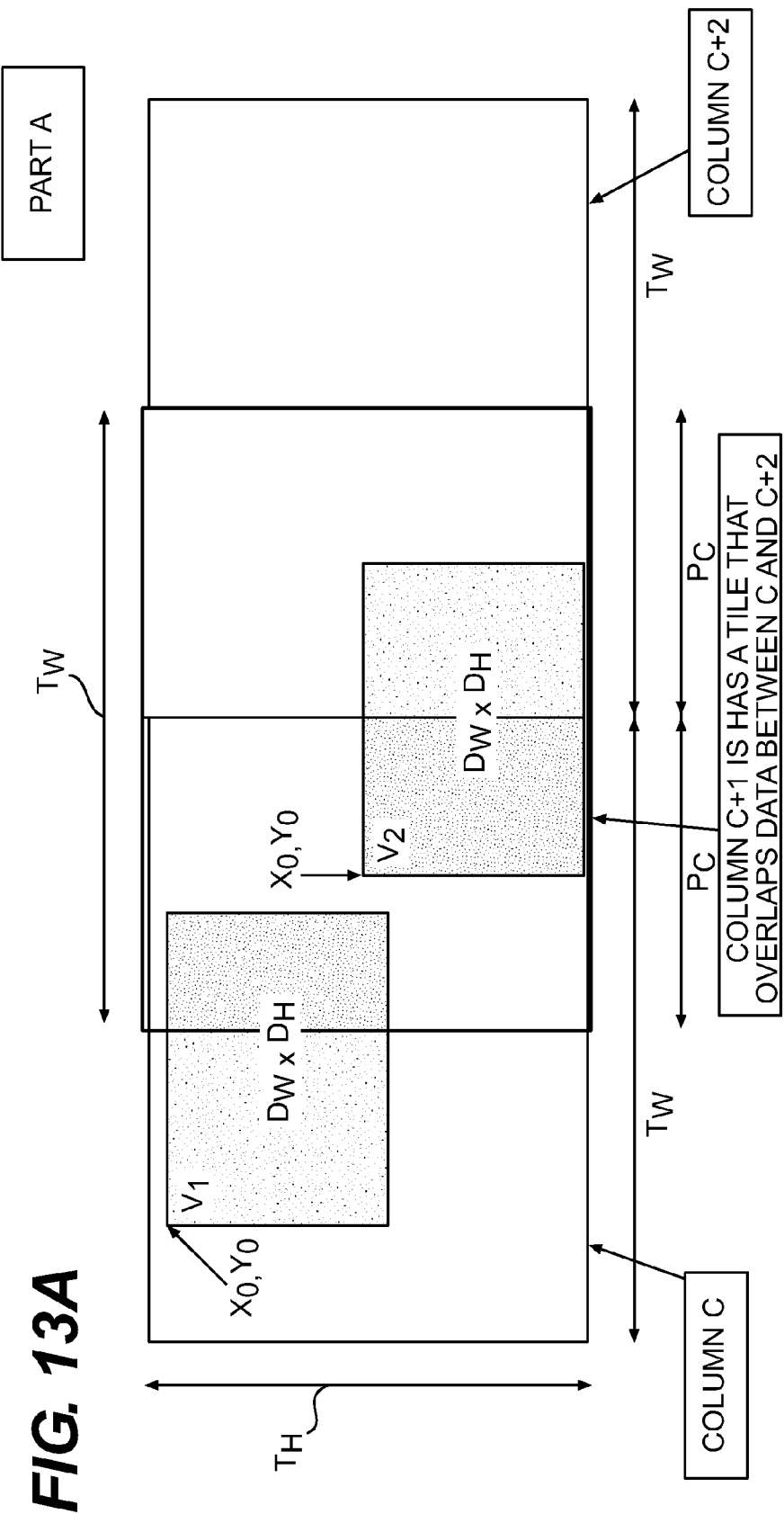
FIG. 13A shows viewports that can be accessed in a tiled image having column-overlapped tiles using one-seek and one-read operation along the X-axis, according to an embodiment of the present invention.

FIG. 13A shows viewports that can be accessed in a tiled image having column overlapped tiles using one-seek and one-read operation along the X-axis, according to an embodiment of the present invention. For example, tile $T_0(C_0, R_0)$ contains the viewport's top left corner such that $C_0 = 2 \times (X_0/T_w)$ and $R_0 = 2 \times (Y_0/T_h)$, and tile $T_1(C_1, R_1)$ contains the viewport's bottom right corner such that $C_1 = 2 \times (X_1/T_w)$ and $R_1 = 2 \times (Y_1/T_h)$, where $X_1 = X_0 + D_w - 1$, and $Y_1 = Y_0 + D_h - 1$ and $D_w$ and $D_h$ are, respectively, viewport pixel width and viewport pixel height $D_h$.

Based on these formulae, $|C_1 - C_0|$ may be equal to 0 if $X_0$ is in the left half of the tile (as shown in FIG. 13A, viewport $V_1$ in both parts) or may be equal to 2 if $X_0$ is in the right half of the tile (as shown in FIG. 13A, viewport $V_2$ in both parts). If $C_1 = C_0$ then $C_v = C_0$ otherwise $C_v = C_0 + 1$. By applying the formula in FIG. 10B to the overlapped layout in FIG. 13A, $X_1$ would be $X_0+D_w-1$. There are 5 possible combinations of where $X_0$ and $X_1$ could be, as depicted in FIG. 13A. (1) Both $X_0$ and $X_1$ fall only in column C. (2) $X_0$ falls only in column C, $X_1$ falls in column C and C+1. (3) $X_0$ falls in column C and C+1, $X_1$ falls in column C and C+1. (4) $X_0$ falls in column C and C+1, $X_1$ falls only in column C+1. (5) Both $X_0$ and $X_1$ fall only in column C+1. In FIG. 13A, Viewport $V_1$ covers cases (1) and (2). In FIG. 13A, Viewport $V_2$ covers cases (4) and (5). When applying the formula in FIG. 10B, $|C_1-C_0|$ results in a value of 0 for cases (1) and (2), because $C_1$ evaluates to C, and $C_0$, evaluates to C, thus implying that $X_0$ and $X_1$ are both in column C. Thus $C_v=C_0$. For cases (4) and (5), $|C_1-C_0|$ results in a non-zero value, implying that $X_0$ and $X_1$ are both in column C+1. Thus, $C_v=C_0+1$. In case (3), since both are in C and C+1, $|C_1-C_0|$ results in a zero value implying that $X_0$ and $X_1$ are both in column C. Thus $C_v=C_0$.

Figure 13B:
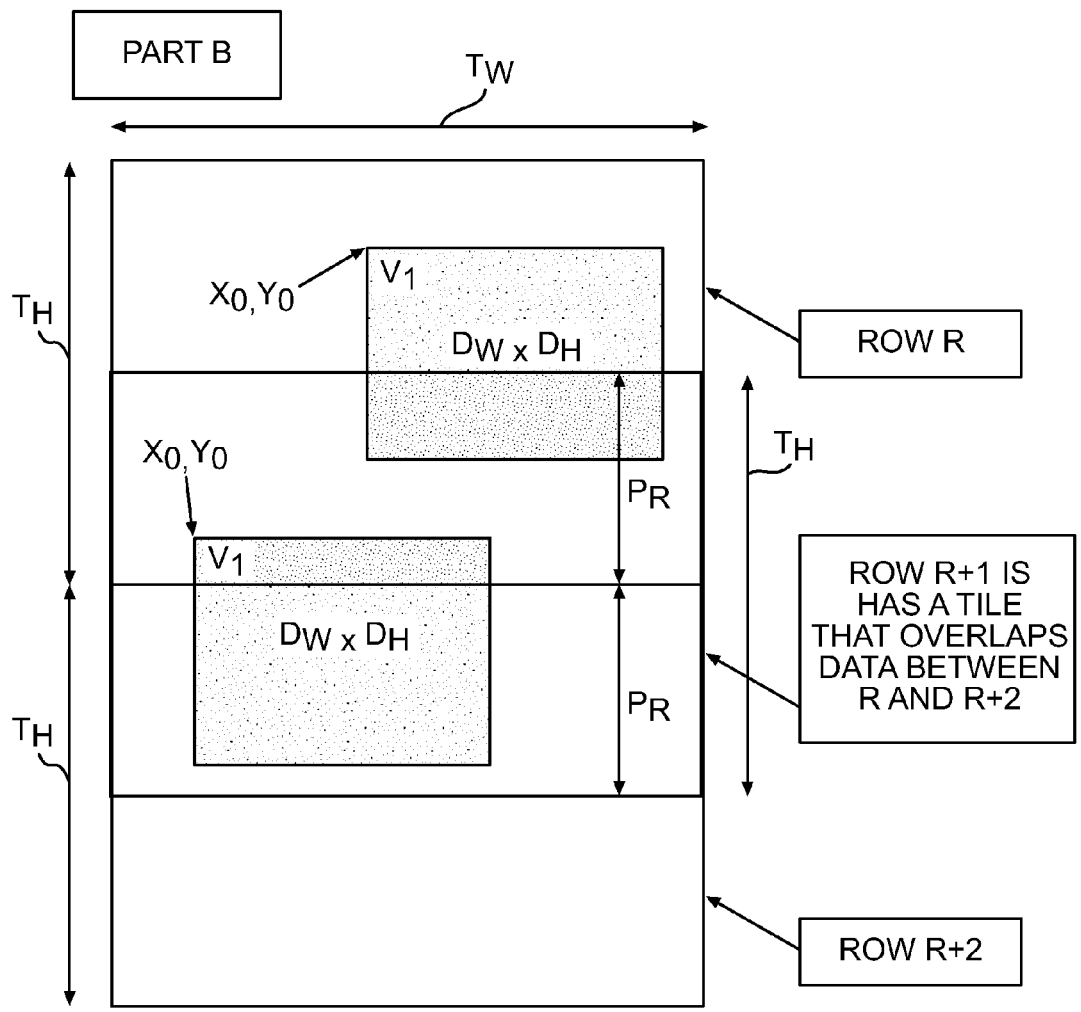
FIG. 13B shows viewports that can be accessed in a tiled image having row-overlapped tiles using one-seek and one-read operation along the Y-axis, according to another embodiment of the present invention.

FIG. 13B shows viewports that can be accessed in a tiled image having row-overlapped tiles using one seek and one read operation along the Y-axis, according to another embodiment of the present invention. Similarly, based on the above formulae, $|R_1-R_0|$ may be 0 if $Y_0$ is in the upper half of the tile or may be 2 if $Y_0$ is in the lower half of the tile. If $R_1=R_0$ then $R_v=R_0$ otherwise $R_v=R_0+1$.

Very large format motion imagery generally requires a significant amount of storage per frame. When using multiple sensors, the amount of storage per frame can increase linearly. Also, with an increase in bit-depth to more than 8 bits per pixel, the amount of storage per frame can also increase linearly. In addition, with an increase in number of bands (from luminance to RGB or RGB+Near IR), the storage amount per frame can also increase linearly. Furthermore, as sensor size (width W and height H) increases, the amount of storage per frame can increase exponentially.

For instance, an existing sensor generates very large format motion imagery at 150 megapixels (MPixels) per image. The sensor may capture this data at about 2 Hz, i.e., two images per second. The image data is captured as 1-band (luminance) at 8-bits/band. Uncompressed, each image is about 150 megabytes (MB). When the image is compressed, using for example the JPEG2000 codec at about 8:1, the size of the image data can be reduced to about 19 MB per image. For each hour, this amounts to about 7200 images occupying 1 terabyte (TB) of uncompressed data or 135 gigabytes (GB) of compressed data. If this data were to be collected for 10 hours each day, this amounts to capturing about 26 million images per year, totaling about 3.6 petabytes (PB) uncompressed or about 500 TB compressed at the above compression ratio.

As another example, if a 1000 MPixel (one gigapixel) image sensor captures 16-bits per band, 3-bands at 2 frames per second, the amount of data captured for 10 hours per day, for one year would be about 140 PB of uncompressed images or 17.5 PB compressed images at the above compression ratio. At night, an IR sensor at 1000 MPixels at 16-bits per band, 1-band at collecting at 2 frames per second, compressed at the above ratio, would be an additional 26 million files and an additional 6 PB.

As yet another example, if there are 200 sensors, each at 1000 MPixels, collecting data daily, then over 5 billion individual compressed files can be collected, massing to about 3500 PB of compressed images at the above compression ratio for the day time and an additional 5 billion files, at 1100 PB for the night time collections.

Dealing with such a large number of files can be a performance and scalability challenge for existing file systems. Using standard existing functions and tools to read or write such files is an extremely inefficient process with conventional technologies.

In the following paragraphs, a method of storage of large format images within a single large file on a storage device is described. The method allows for efficient update and retrieval of any viewport from any image. The single large file is considered to be a container for a large number of substantially homogenous very large format image files. The image files are stored into a single file. The term "homogenous files" is used herein to mean the image files are all logically similar, i.e., the image files are obtained from a sensor that delivers images of substantially the same pixel width and height (i.e., substantially same size) at substantially the same band count and bit depth. Furthermore, in homogenous image files, the compression ratio of each of the image files is also similar.

Figure 14A:
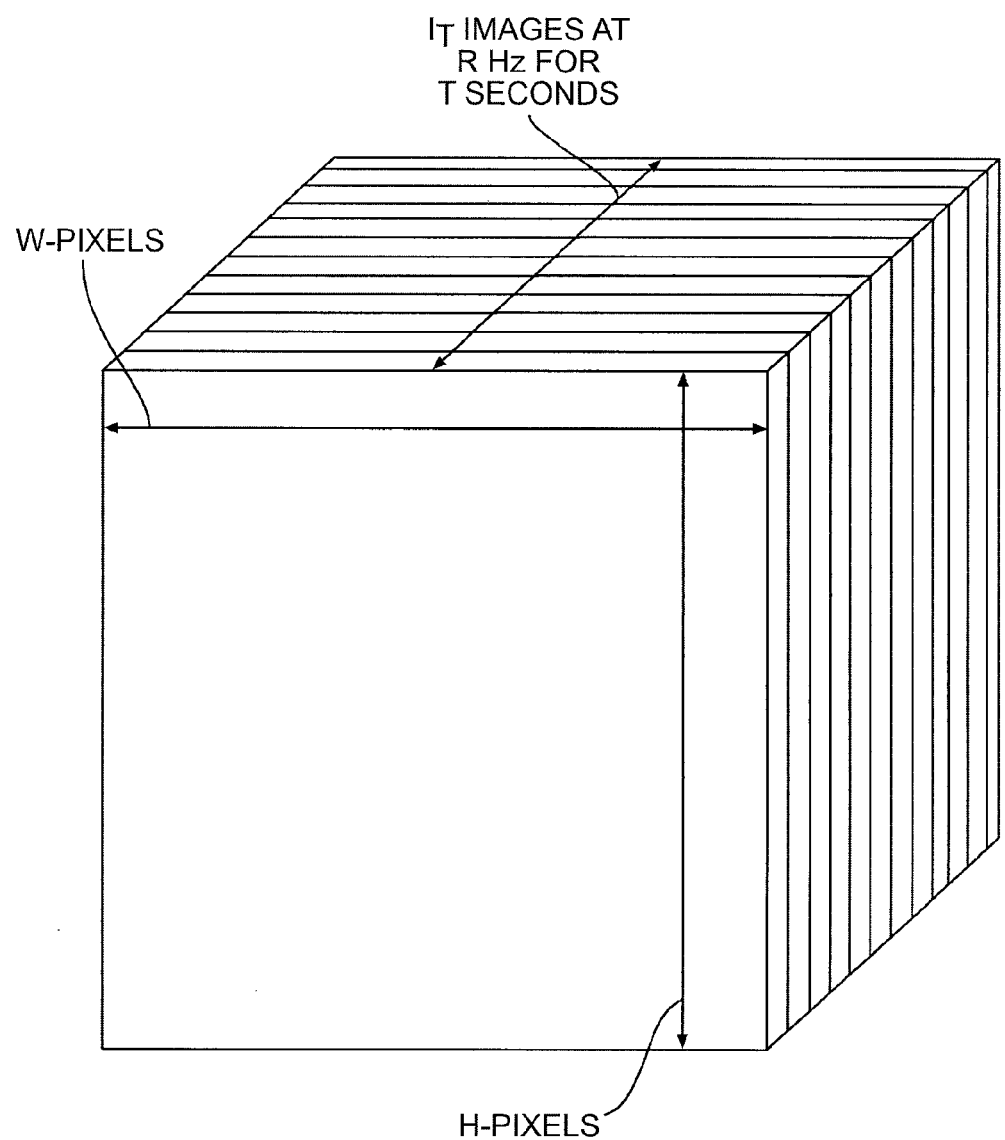
FIG. 14A is a schematic representation of a series or sequence of images captured at a rate of R Hz for a period of time of T seconds, according to an embodiment of the present invention.

FIG. 14A is a schematic representation of a series or sequence of $I_T$ images captured at a rate of R Hz for a period of time of T seconds, according to an embodiment of the present invention. FIG. 14B is a schematic representation of the series of images stored in a storage device as a plurality or sequence of image files in a folder tree, according to an embodiment of the present invention. A "container" is herein defined as a single large file that contains a plurality or sequence of homogenous image files. Once the image files are stored within the container, they are deemed "containerized."

Figure 15:
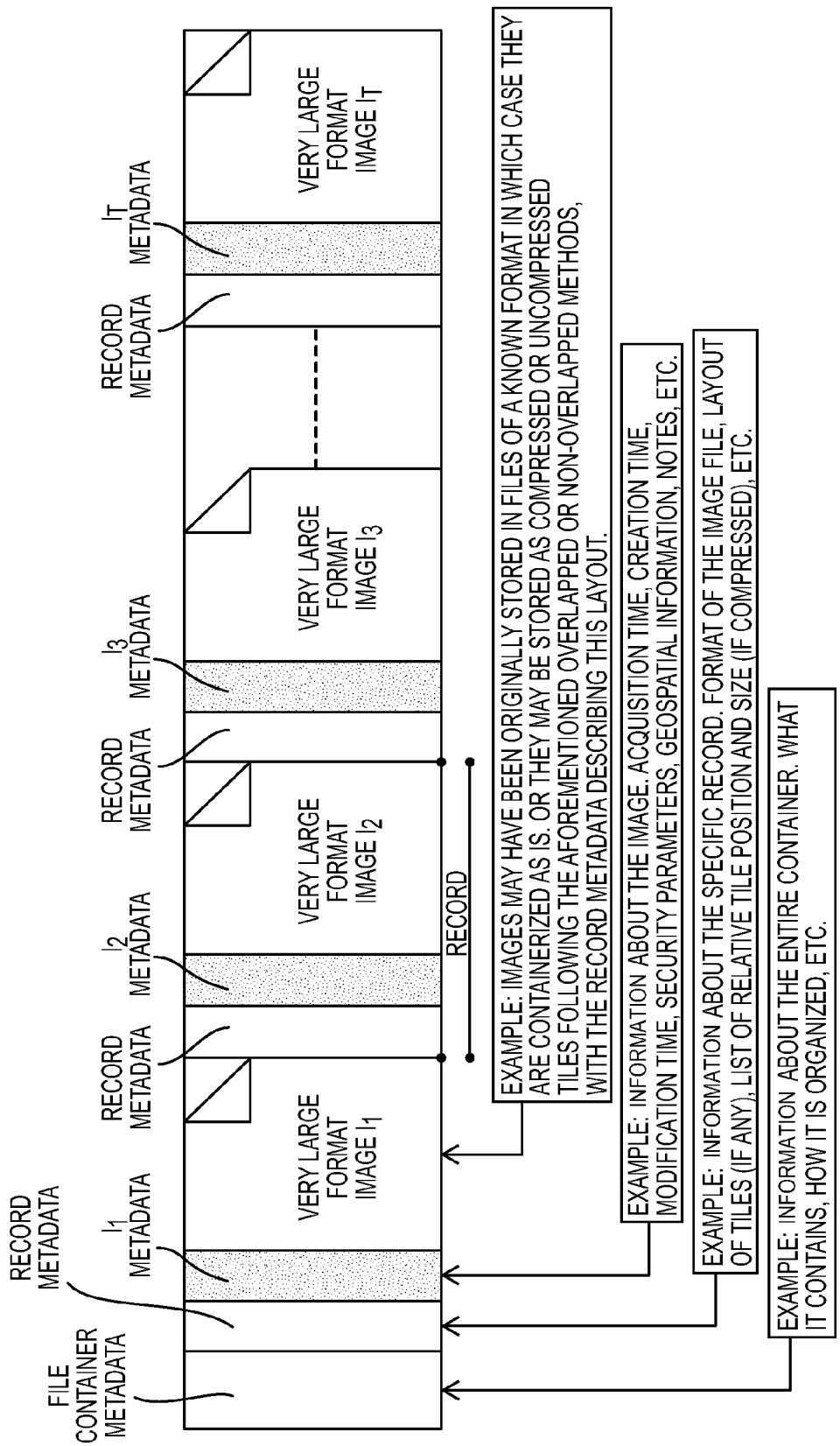
FIG. 15 depicts a logical layout of a container containing a plurality of image files, according to an embodiment of the present invention.

FIG. 15 depicts a logical layout of the container, according to an embodiment of the present invention. The container contains one file container metadata section per container which includes information about the container such as what the container contains, how the information is organized, etc. The file container further contains a plurality of records. For each image file in the sequence of image files, there is one corresponding record in the container. Each record comprises record metadata, image metadata, and the image file. The record metadata includes information about a specific record within the container such as the format of the image file, layout of tiles (if any), list of relative tile position and size, compression state (i.e., compressed or not compressed), etc. The image metadata includes information about the image such as acquisition time, creation time, modification time, security parameters, geospatial information, notes, etc. The image file comprises the actual image data that is being containerized (i.e., images $I_1, I_2, \ldots, I_T$). The container is stored on a known file system. In one embodiment, the container may be a file having a plurality of "fixed length records." A record includes record metadata, image metadata, and the image file itself. The term "fixed length record" file means the sizes of the space reserved for the "record metadata," the "image metadata," and the "image file" is the same for all records. If the image data is compressed in the image file, the size reserved in a record to hold its corresponding image file equals the size of the largest file in the collection of input files. If the size of the largest file in the collection of image files is not known, a value can be computed by taking the uncompressed image size and dividing it by the compression ratio ($C_r$ where $C_r>1$) that is common to all images. If $C_r$ is not common to all images, then the minimum value of $C_r$ for all images is used in the computation.

FIG. 15 depicts a logical layout of a container that holds compressed image files, according to an embodiment of the present invention. The container contains one file container metadata, and a plurality of records. Each record comprises record metadata, image metadata and the very large format image file data. The file container metadata, the record metadata, the image metadata and each image file are stored on a storage device starting from an absolute file offset that is aligned to SDBS. The amount of bytes reserved to hold the file container metadata, the record metadata, the image metadata and each image file is an integer multiple of the SDBS.

A storage device block size (SDBS) is an integer multiple of the minimum number of bytes that a storage device is setup to read or write in a single I/O operation. In one embodiment, this number can be $512 \times 2^n$ where n is an integer $\geq 0$. Aligning a value to SDBS means increasing or decreasing the value by an amount such that the resulting value is an integer multiple of SDBS. For example, if $B_{sz}$ denotes SDBS, "A % B" represents the "A modulo B" operation which is the remainder of division of A by B, and O' aligns an absolute file offset O to SDBS, then O' can either be $\leq$ or $\geq$ O. If O'$\leq$O then O'=O−(O % $B_{sz}$). If O'$\geq$O then O'=O+($B_{sz}$−(O % $B_{sz}$)) % $B_{sz}$).

The file container metadata section is of a known fixed size. The size is preset by a user of the system and depends on the nature of over-all metadata to be stored in the file. The file container metadata is stored in the file from the start of the file. It is stored such that the file container metadata section is contained within an integer multiple of SDBS. A software application for accessing the container can be configured to interpret the file metadata section. In one embodiment, the size of the file container metadata section is stored as part of the information of the file container metadata section. The first SDBS bytes of the section contain, amongst other values, the status flags for the entire container file as well as the value of SDBS itself. The first SDBS bytes of the section also contain additional data that specify relative starting point and the size of the "record metadata" section, the "image metadata" section, and the amount of bytes reserved for the image file itself. The file container metadata section also holds information regarding the common format of the files. The information regarding common format may include information such as all files may be uncompressed, compressed using the JPEG2000 codec, or the JPEG codec, or tiled with each tile compressed using run-length encoding (RLE) technique, etc. The file container metadata section also holds dates, owner information, and security features for the file container and any additional metadata elements that individuals that processed the file container may have generated. The file container metadata section may further hold the total record count. For example, a predefined data structure is employed to hold this metadata. The industry wide general model of storing metadata as key-length-value sets may be followed for information custom to the type of data stored in the file. The pre-reserved space for the file container metadata section may also include extra space just in case a user of the file container anticipates additional metadata to be generated at a later date.

A sequence of records is stored following the file container metadata section. Each record holds a single very large format image file. A record is divided into three primary sections: the record metadata section, the image metadata section and the image file section. The record metadata section is the first section within the record. The image metadata section may precede or follow the image file section. Relative offsets of the image metadata section and the image file section are stored within the record metadata section.

The record metadata section stores information specific to the corresponding record. The record metadata has a fixed size in bytes for all records. The size of the record metadata may be known from the file container metadata section. In one embodiment, the record metadata is stored in the file container such that each record metadata section starts from a location that is aligned to an integer multiple of the storage device block size (SDBS). The number of bytes in the record metadata section is also contained within an integer multiple of SDBS. The record metadata section contains record-specific metadata. In one embodiment, the first SDBS bytes of the record hold, amongst other values, status flags. In one embodiment, the record metadata holds status flags of associated record (i.e., valid, empty, invalid, or being updated and how the record is being updated). If a corresponding image file of the record is tiled and compressed, the record metadata section further holds data about the compression codec, relative offsets and sizes of each tile in the associated image file. In one embodiment, the record metadata section can also hold record creation and modification times, user, computer and application names of who modified the record, etc. In one embodiment, additional housekeeping data may also be stored in the record metadata section.

The image metadata section holds information specific to the associated image. For instance, the image metadata section may include the UTC time of acquisition (e.g., in microseconds), geospatial information about the image, sensor parameters, parameters from the capturing platform or device, parameters on the environment in which the image was captured by the device (e.g. airborne capture device elevation, pitch, yaw and roll), original creating and modification times of the image file, the original file name, the folder in which the file existed, etc. In one embodiment, additional housekeeping data may also be stored in the image metadata section. In addition, in one embodiment, storage space can be reserved per image to allow a user to add notes, etc. In one embodiment, if the image file stored in the image file section does not contain R-sets, then R-sets may be computed and stored in the image metadata section. An R-set is also known as a reduced resolution dataset or RRD. An R-set is a single scaled-down version of the original image. Multiple R-sets can be stored per record, each being subsequently smaller than the previous. Each R-set is an image and follows the same rules for storage as the large format image stored in the image file section.

The image file section contains the very large format image file itself. If the image is stored as an uncompressed raster, the image is tiled in a form described above. If the image is stored as a compressed raster, each tile is compressed and the image as a whole is compressed in a form described above. If the image is stored as a file of a known format, the image file is analyzed and information about the image file may be stored in the appropriate metadata sections, as discussed in the above paragraphs. By the time a record is created from the source data of a very large format image, all information needed to efficiently extract or decode a viewport from the very large format image is extracted or generated and stored in the record or image metadata sections. The image file section begins at an SDBS aligned offset and is stored in a size that is SDBS aligned.

Figure 16:
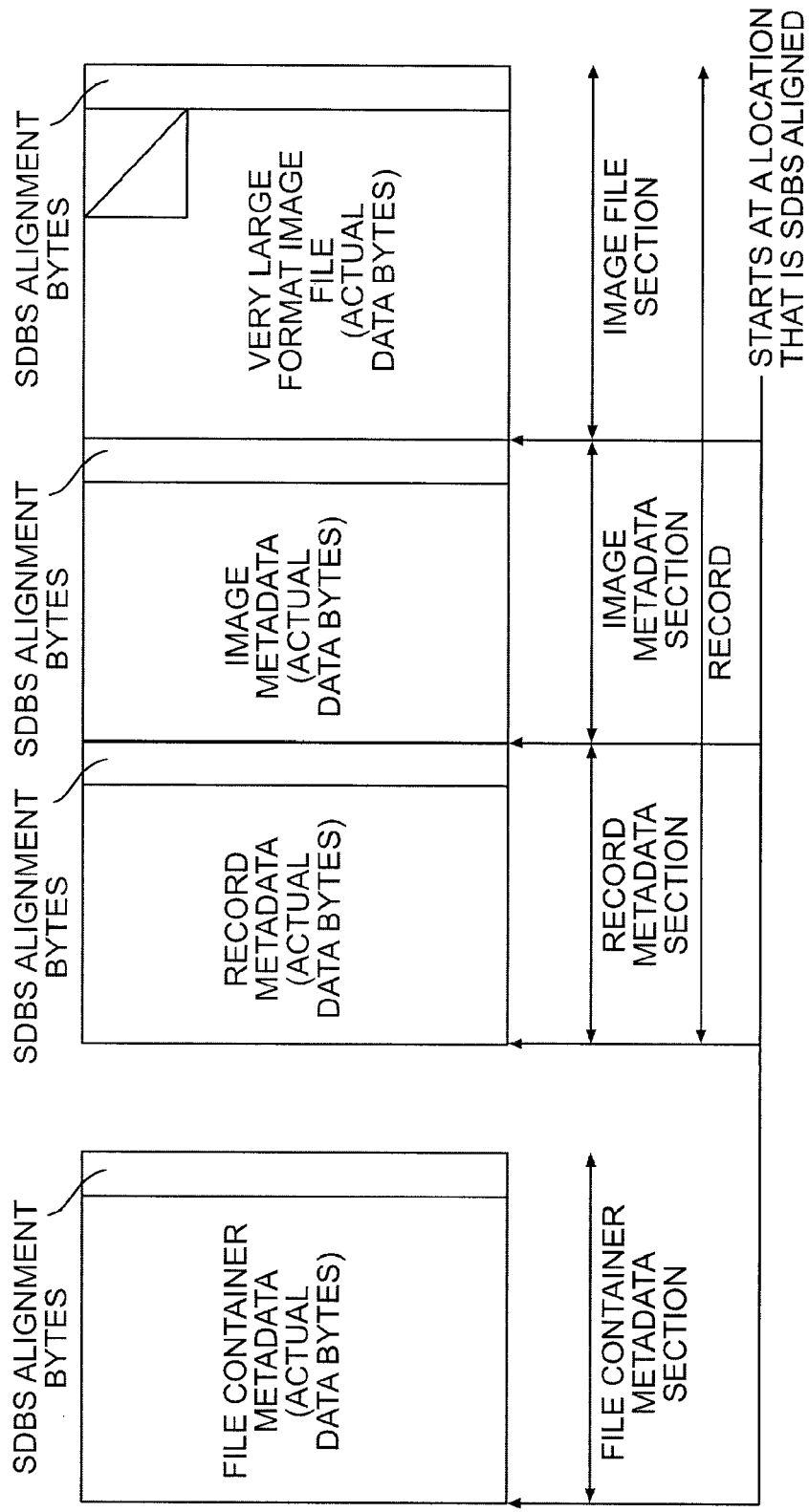
FIG. 16 depicts a logical layout of the container that holds image files showing the positioning of the metadata sections, according to an embodiment of the present invention.

FIG. 16 depicts a logical layout of a container file that holds image files showing the positioning of the metadata sections, according to an embodiment of the present invention. As depicted in FIG. 16, the file container metadata section is stored at the header of the file container and is SDBS aligned. The record metadata sections is stored adjacent to the file container metadata is also SDBS aligned. In one embodiment, the image metadata section is stored adjacent the record metadata section and is SDBS aligned. Following the image metadata section is stored the image file itself. The image file itself is also SDBS aligned. However, the image metadata section can also be stored following the image file.

Figure 17A:
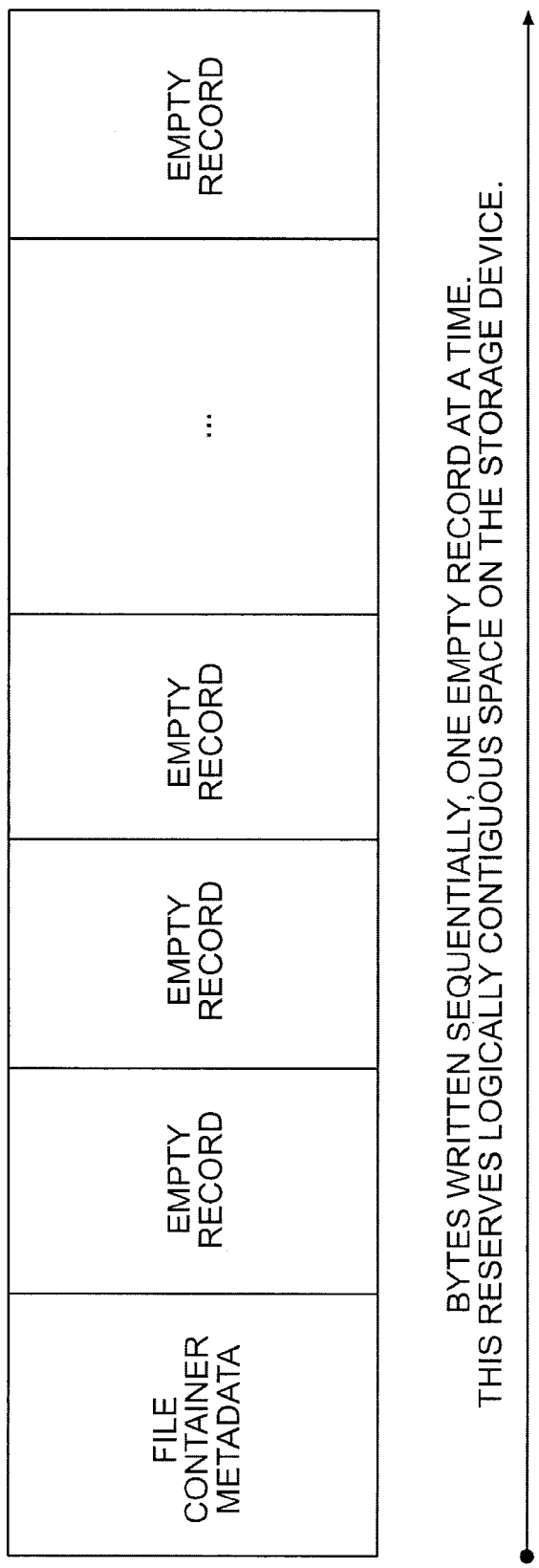
FIG. 17A depicts a layout of a container file having empty records reserved within the container file, according to an embodiment of the present invention.

FIG. 17A depicts a layout of a container file having empty records reserved within the container file, according to an embodiment of the present invention. As depicted in FIG.

17A, the file container metadata section is written at the header of the file container followed by the reserved space for the empty records.

Figure 17B:
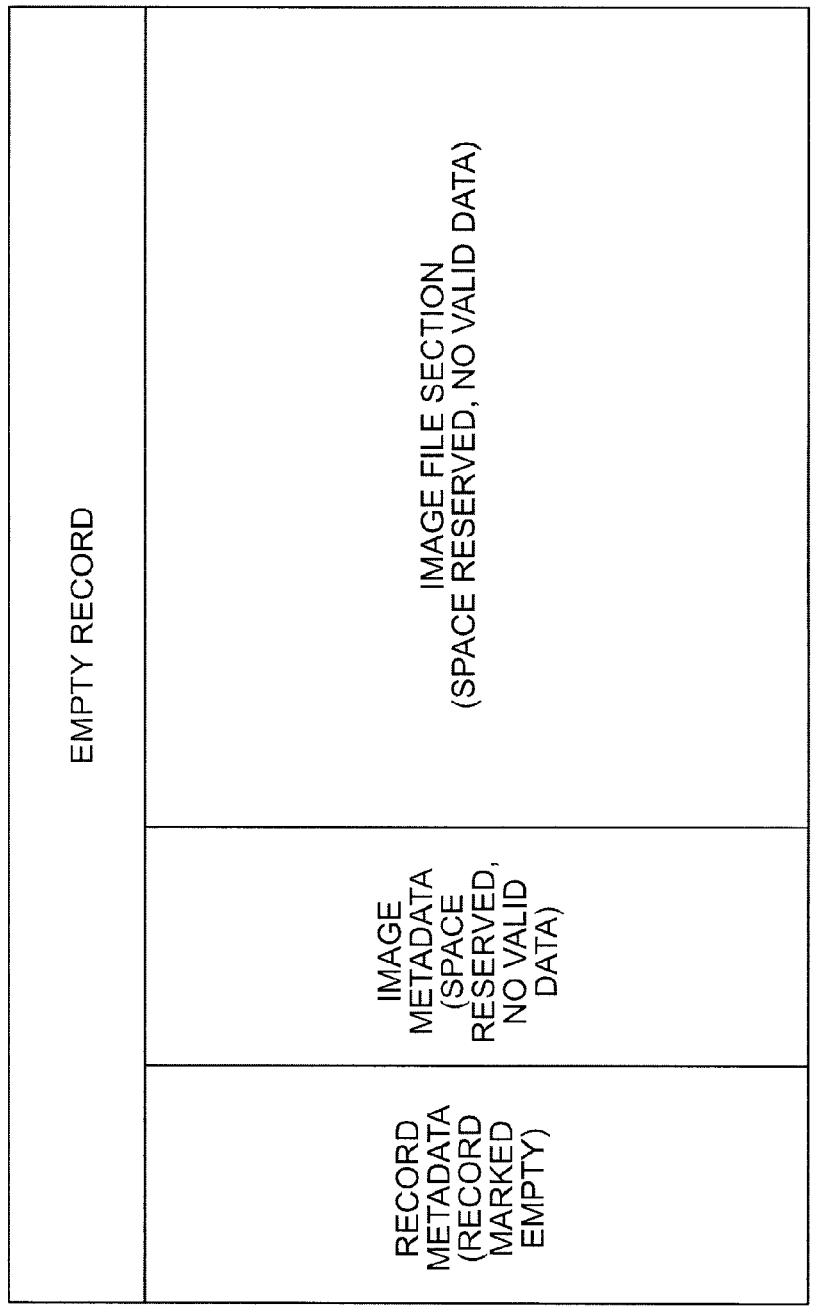
FIG. 17B depicts a logical layout of an empty record, according to an embodiment of the present invention.

FIG. 17B depicts a layout of an empty record, according to an embodiment of the present invention. As shown in FIG. 17B, the empty record includes a record metadata section where the record metadata can be stored. The record metadata section is marked empty when there is no metadata stored therein. The empty record further includes image metadata section reserved for storing image metadata. As shown in FIG. 17B, the image metadata section is marked space reserved no valid data indicating that there are no image metadata stored in the image metadata section. The empty record also includes an image file section. The image file section is configured to store the image file itself. As shown in FIG. 17B, the image file section is marked "space reserved with no valid data" as there are no image yet stored in the image file section of the record, thus the record labeled as empty.

Figure 17C:
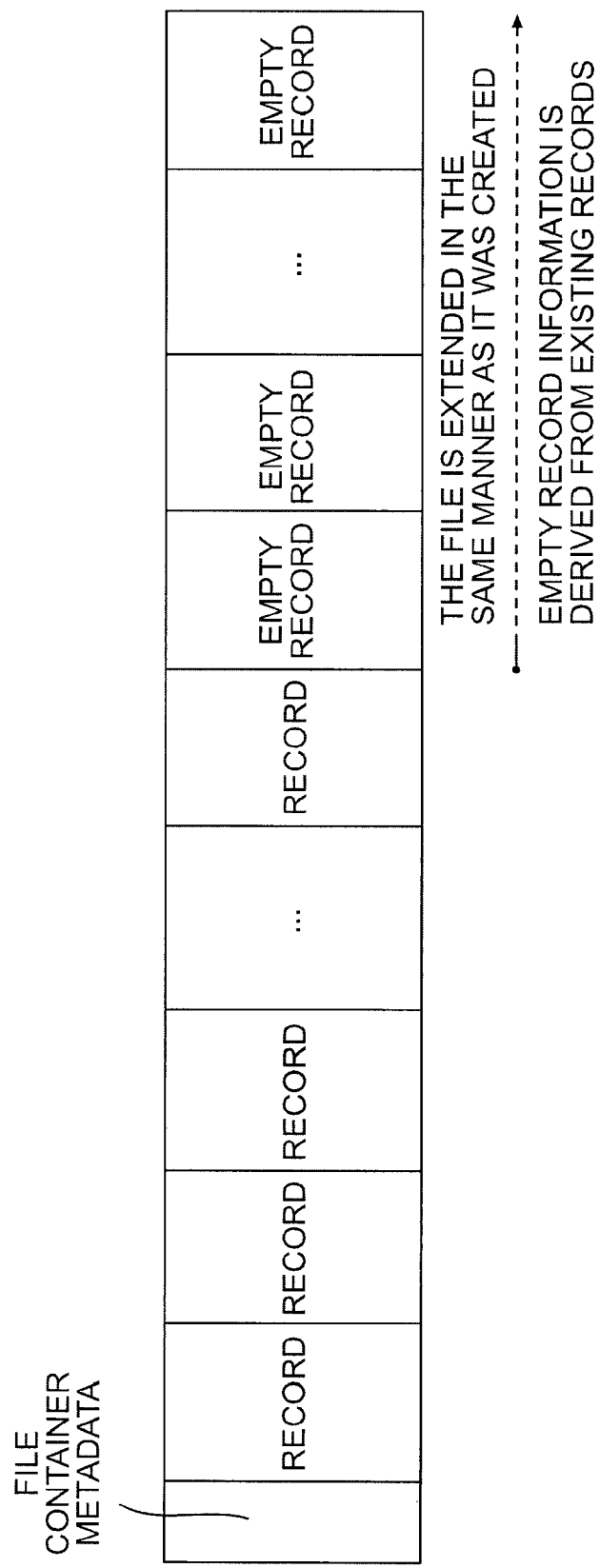
FIG. 17C depicts a layout of a container file having a series of file records extended to contain a series of empty records, according to an embodiment of the present invention.

FIG. 17C depicts a layout of a container file having a series of file records and extended to contain a series of empty records, according to an embodiment of the present invention. In order to extend records in a file container, i.e., to add record spaces within the file container, the number of records by which to extend the dataset can be specified. For example, a user can instruct the system using an extension procedure to add records from the end of the container file to create an extension of the container file. At the end of the extension procedure, the file container metadata section is updated to reflect the new count of records. In this case, while the container is being extended, the file container marks the status of the file as being extended. When a container is being created or extended, it can be opened by any other process for read-only operations.

A new container file can be created or an already created container file can be extended as desired using a method referred to herein as container creator or extender (CCE), according to an embodiment of the present invention. In one embodiment, at any point in time, only one CCE can update a container file. In one embodiment, the CCE method can be implemented programmatically as will be described in detail in the following paragraphs.

In one embodiment, when creating a new container file, the CCE method performs three steps. The first step to creating such a large container file is identifying the data being laid into the container file. This can be performed with inputs from the user. Some of these inputs may be the pixel width, height, band-count, and band data type of each image, the source data organization, the number of images that the user anticipates to be stored into the container file, the maximum size per record of custom user-defined metadata that the user wishes to store in the image metadata section, additional image metadata (if already available) and other parameters. Source data organization refers to the way in which source data is going to be stored in the container file. A single image can be stored as a sequence of compressed or uncompressed image tiles that combine to form the very large format image. The image can also be stored as a source image file of a known file format such that most of the source image files are nearly the same size in bytes on a storage device. Using this information, one can compute the size of all three sections within a record.

The second step is to create an empty record, where the information that the user entered in the first step is the only valid information stored within the record. The size of the image metadata and image file sections is computed and set to align itself to the SDBS.

The final and third step creates the container file, and writes the file container metadata. The status of the file container metadata is marked as being "updated." The third step then writes empty records into the file, sequentially from the first to the last anticipated record.

An empty record is written to the container by taking an empty record created in the second step, marking the status of the record as being "updated" and writing the entire record into the container file. After completing writing the record, the status of the record is marked as "empty" and the first SDBS bytes of the record are rewritten.

After the container is created, the CCE method resets the status of the file container metadata as "available," and writes the first SDBS bytes of the file container metadata to the file and closes the file container.

In one embodiment, when extending an existing container file, the CCE method also performs three steps. The size of a record and its sub-sections is determined from the file container metadata section. The number of records to add is known from user input. The empty record can then be created from having identified the data. The container is opened. The status of the file container metadata is marked as "being updated." The desired number of empty records is appended to the container file, one record at a time, following the same rules as described in the above paragraphs. In one embodiment, the container metadata section is updated to reflect a new count of records. After the container has been created, the CCE method resets the status of the file container metadata as "available," writes the first SDBS bytes of the file container metadata to the file and closes the container.

While an empty container is being created or an existing container is being extended, it can be opened by any process other than a CCE, for read or write operations.

In one embodiment, the CCE method can be implemented as a web service, i.e. a CCE service (CCES). As an example, a client or user can use an HTTP URL string as an interface to the CCES. Information exchange between the service and a client of the service can be implemented as an industry standard interface, such as XML. Since a CCES may take time to perform its tasks, a CCES reports its progress during the time it is running, and do so regularly, for example, at least once every few seconds, to the requesting client.

Figure 18:
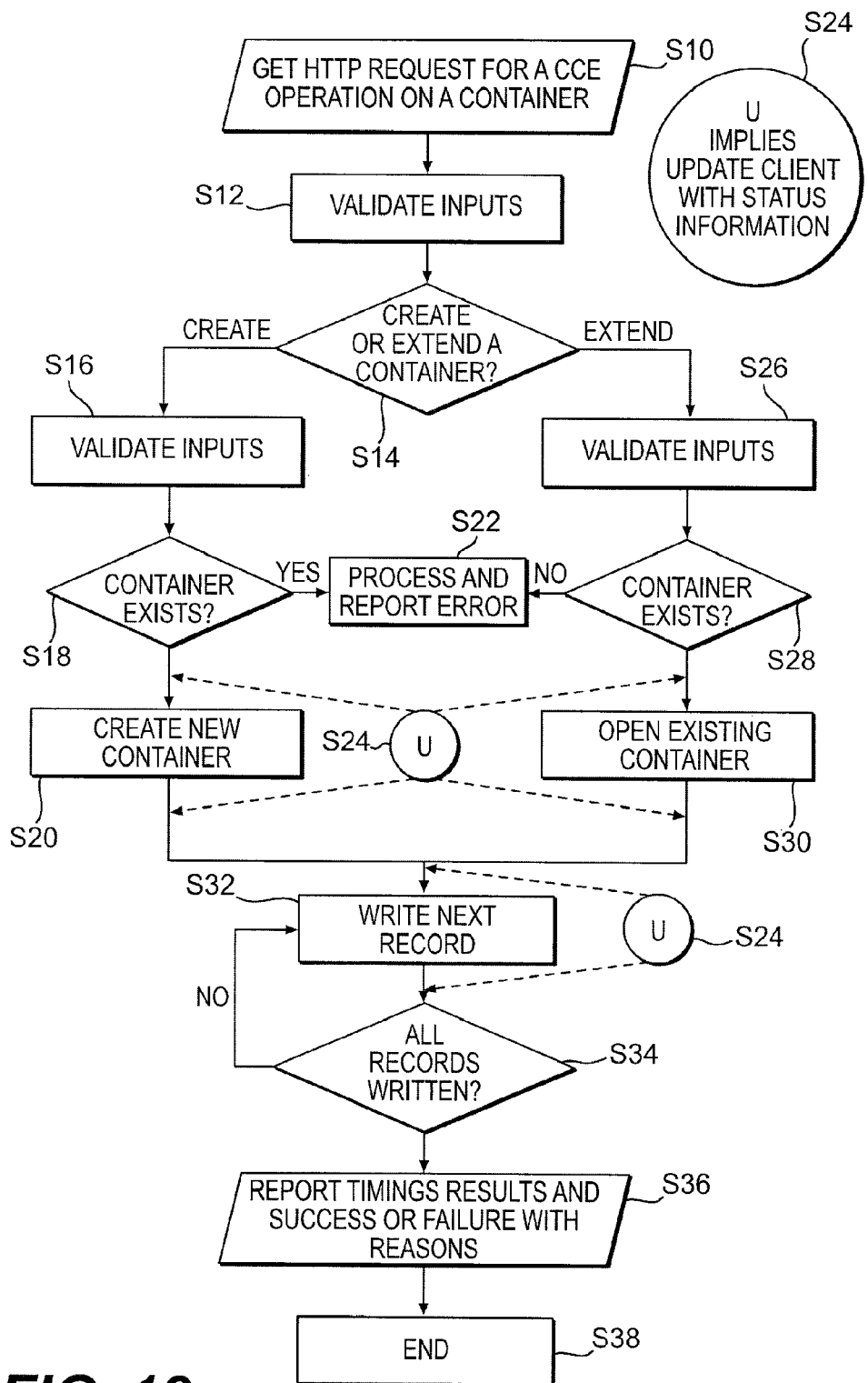
FIG. 18 is a flow chart of a method for creating a new container or extending an existing container, according to an embodiment of the present invention.

FIG. 18 is a flow chart of a method for creating a new container or extending an existing container, according to an embodiment of the present invention. For example, the method can be implemented as a web service (a CCE service or CCES). The CCE method can be initiated by a user requesting for a CCE operation on a container, at S10. The CCE method includes validating inputs from a user, at S12. The inputs from the user include various parameters of the container including the number of records, size of each record, etc., as described in the above paragraphs. The CCE method further includes inquiring whether the desired operation is for creating a container or extending a container, at S14. If the desired operation is for creating a container, the method validates user inputs, at S16. The method then inquires whether a container already exists, at S18. If the container does not exist, the method creates a new container, at S20. If the container already exits, the method reports the error to the user, at S22. At any phase before or after creating a new container, the method can update the user with status information, at S24. If the desired operation is for extending a container, the method validates user inputs (e.g., various parameters such as number of records, size of each record, etc.), at S26. The method then inquires whether a container already exists, at S28. If the container already exits, the method opens the existing container, at S30. If the container does not exist, the method reports an error, at S22. Similarly, at any phase before or after opening an existing container, the method can update the user with status information, at S24. In both cases of creating a new container or opening an existing container to extend the existing container, the method writes or stores a record into the container, at S32. The method repeats this operation until all desired number of records are written into the container by inquiring whether desired records are written into the container, at S34. The method then reports timing results and success or failure in writing the records into the container to the user, at S36 and ends at S38.

Figure 19:
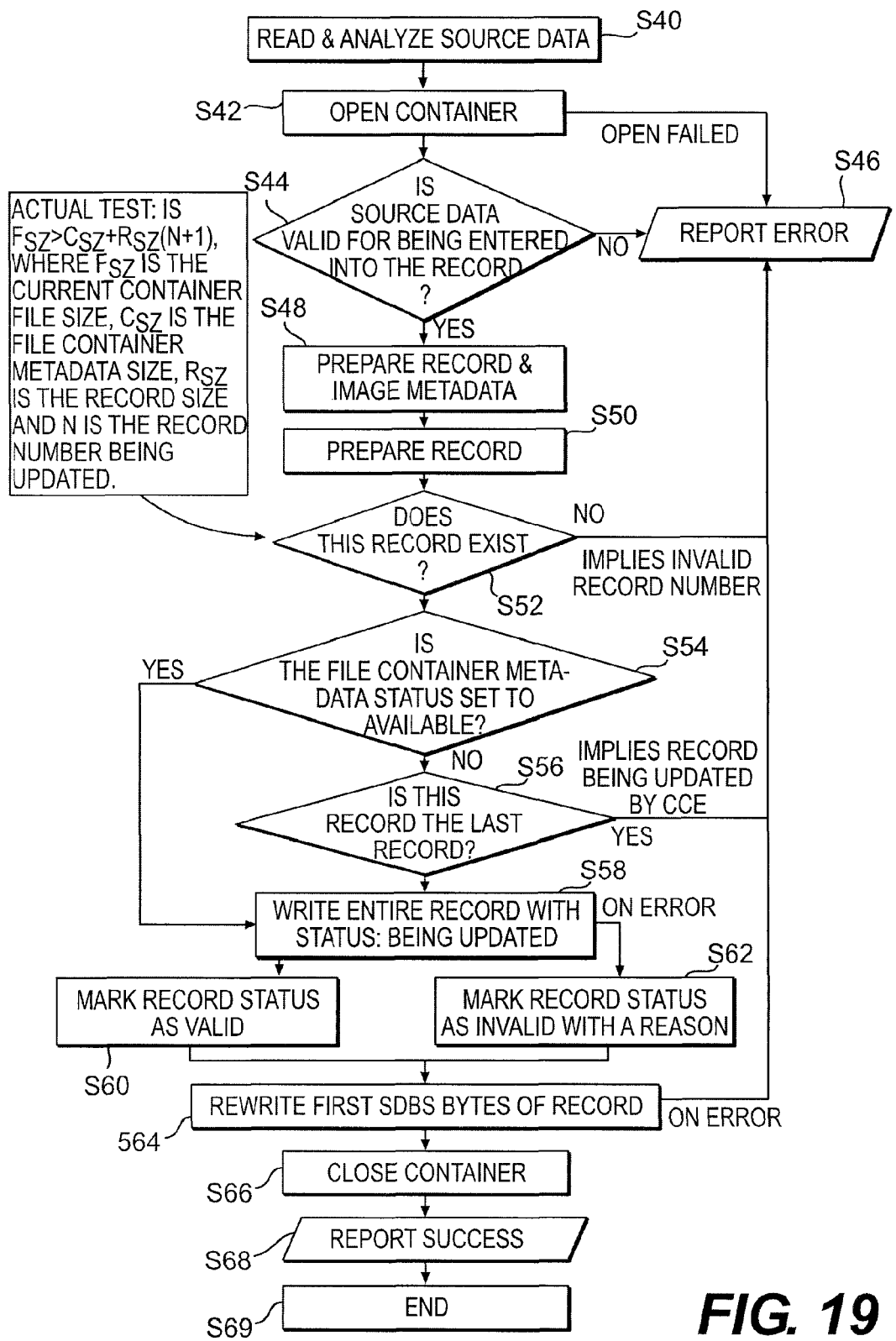
FIG. 19 is a flow chart of a method for inserting a very large format image within the container, according to an embodiment of the present invention.

FIG. 19 is a flow chart of a method for inserting a very large format image within the container, according to an embodiment of the present invention. The method for inserting a single record includes inputting a name of the container file and record number to insert into, inputting a very large format image as a raw image or in a known file format, and any additional parameters. The method for inserting or writing a single record includes reading and analyzing source data, at S40. The method includes opening a container where the image will be stored, at S42. The method further includes inquiring whether the source data is valid for being entered into the record, at S44. If there are any problems with the source data (i.e., data source is not valid), the method proceeds to reporting an error, at S46. Otherwise, if the data source is valid, the method proceeds by preparing the record and image metadata, at S48. After preparing the record and image metadata, the method further proceeds by preparing the record itself, at S50. The method then inquires whether the record exists, at S52. In one embodiment, the inquiry includes determining whether $F_{sz} > C_{sz} + R_{sz}(N+1)$, where $F_{sz}$ is the current container file size, $C_{sz}$ is the file container metadata size, and $R_{sz}$ is the record size, and N is the record number being updated. If the record does not exit, the method reports an error at S46. If the record exits, the method further inquires whether the file container metadata status is set to "available", at S54. If the file container metadata status is set to "available" at S54, the method further inquires whether the record is the last record, at S56. If the method returns that the record is the last record, the method reports an error at S46. Otherwise, if the record is not the last record, the method writes the entire record with the status "being updated", at S58. Similarly, if the file container metadata status is set to available, at S54, the method writes the entire record with the status "being updated" at S58. After writing the entire record with status "being updated" at S58, the method marks the record as either being "valid" at S60 or invalid (if there are any problems while writing the record) at S62. After writing the entire record, the method proceed to rewriting SDBS bytes of record, at S64. If the writing of the record and the rewriting of the storage device block size (SDBS) is successful, the method proceeds to close the container, at S66 and report that the writing of the record and the SDBS bytes of the record are successful, at S68 which ends the method, at S69.

Figure 20:
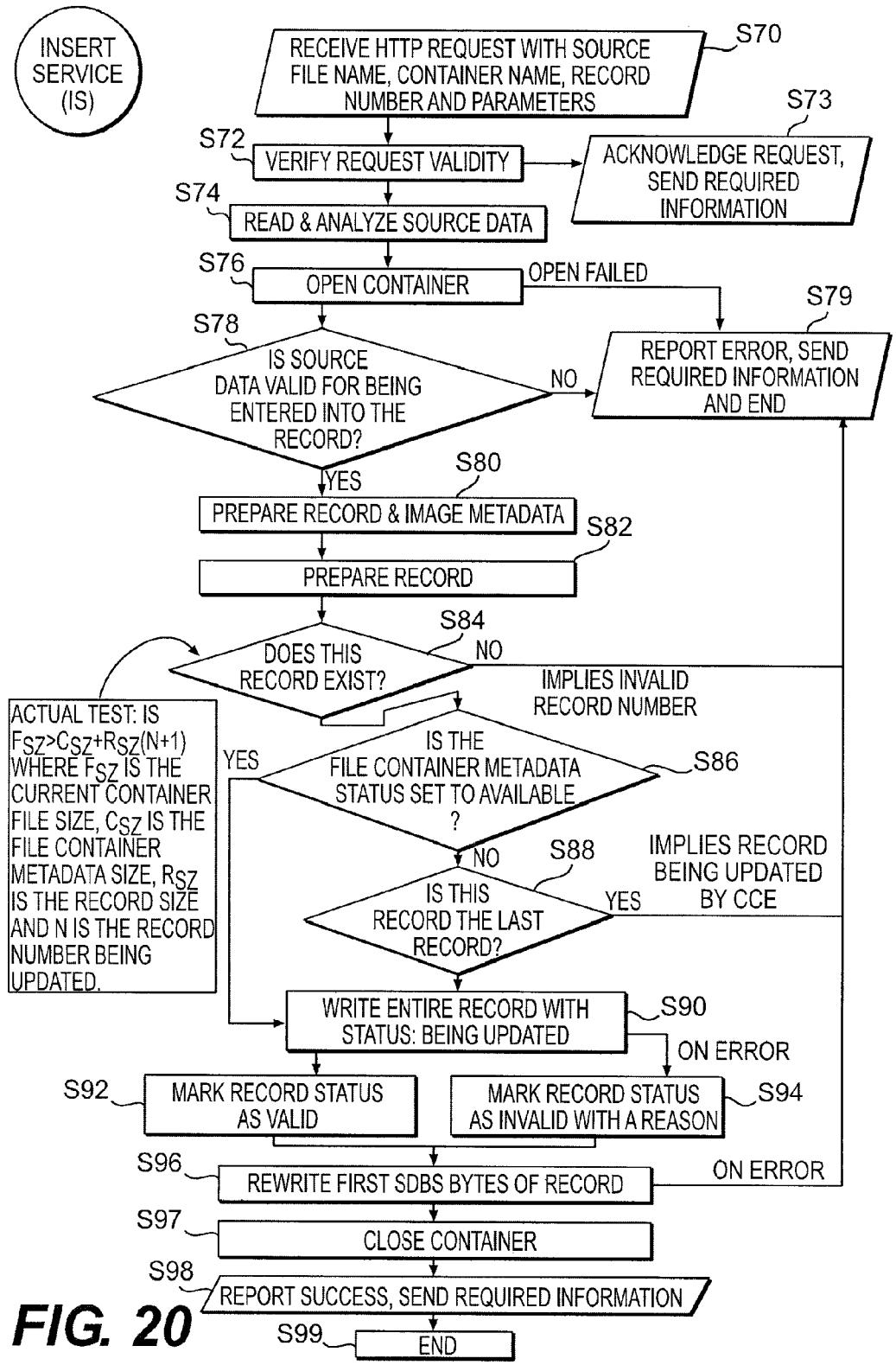
FIG. 20 is a flow chart depicting a web service for writing or inserting a record into a container file, according to an embodiment of the present invention.

In one embodiment, this method can be implemented as an insert service (IS). For example, a HTTP URL string can be used as an interface to implement the insert service (IS). FIG. 20 is a flow chart depicting an insert service (IS) for writing or inserting a record into a container file, according to an embodiment of the present invention. In one embodiment, the service can be implemented using a computer system, for example a networked computer system having a world wide web connection. Information exchange between the service and a user of the service is an industry standard interface, such as XML. The service or method is initiated by a user requesting to write a record into a container by inputting a source file name, container name, record number and other parameters, for example using HTTP. The insert service receives a HTTP request with source file name, container name, record number and other parameters, at S70. Upon entry of the various parameters including source file name, container name, etc., the service verifies the validity of the request, at S72 and acknowledges the request and sends update information to the user, at S73. The service or method then proceeds to read and analyze the source data provided by the user, at S74. The service or method then proceeds to open the container where the record or source data will be stored, at S76. The method further includes determining whether the source data is valid to be entered into a record within the opened container, at S78. If the data source is not valid, the method proceeds to reporting an error at S79. If the data source is valid, the method proceeds by preparing the record and image metadata, at S80. After preparing the record and image metadata, the method further proceeds by preparing the record, at S82. The method then inquires whether the record exists, at S84. In one embodiment, the inquiry includes determining whether $F_{sz} > C_{sz} + R_{sz}(N+1)$, where $F_{sz}$ is the current container file size, $C_{sz}$ is the file container metadata size, and $R_{sz}$ is the record size, and N is the record number being updated. If the record does not exist, the method reports an error at S79. If the record does exit, the method further inquires whether the file container metadata status is set to "available" at S86. If the file container metadata status is set to "available" at S86, the method further inquires whether the record is the last record, at S88. If the method returns that the record is the last record, the method reports an error at S79. Otherwise, if the record is not the last record, the method writes the entire record with the status "being updated", at S90. Similarly, if the file container metadata status is set to available, at S86, the method writes the entire record with the status "being updated" at S90. After writing the entire record with status "being updated" at S90, the method marks the record as either being "valid" at S92 or invalid (if there are any problems while writing the record) at S94. After writing the entire record, the method proceeds to rewriting SDBS bytes of record with a valid status, at S96. If the writing of the record and the rewriting of the storage device block size (SDBS) is successful, the method proceeds to close the container, at S97 and report that the writing of the record and the SDBS bytes of the record are successful, at S98 which ends the method, at S99.

A method for inserting a sequence of very large format images within a container is described in the following paragraphs. In one embodiment, the method for inserting a sequence of images into a container includes using multiple computing platforms running a multi-threaded "insert sequence" tool such that each thread inserts one very large format image into one record and no two threads for a process and no two processes across multiple computing platforms update the same record in the same container simultaneously. In the context of this application, multi-threaded means a process that launches and executes one or more threads.

The method for inserting a single image within a container, as described above, is a fairly independent and isolated process. Hence, it would not matter if at any given point in time, several very large format images were being inserted into multiple records simultaneously, as long as no two very large format images are assigned to a same record number. In one embodiment, each insert can be executed as a service. Therefore, parallel processing across multiple computers can be implemented to insert multiple image files into record spaces of a container substantially simultaneously. In one embodiment, the parallel processing of inserting images can be monitored and controlled with higher-level tools.

Figure 21:
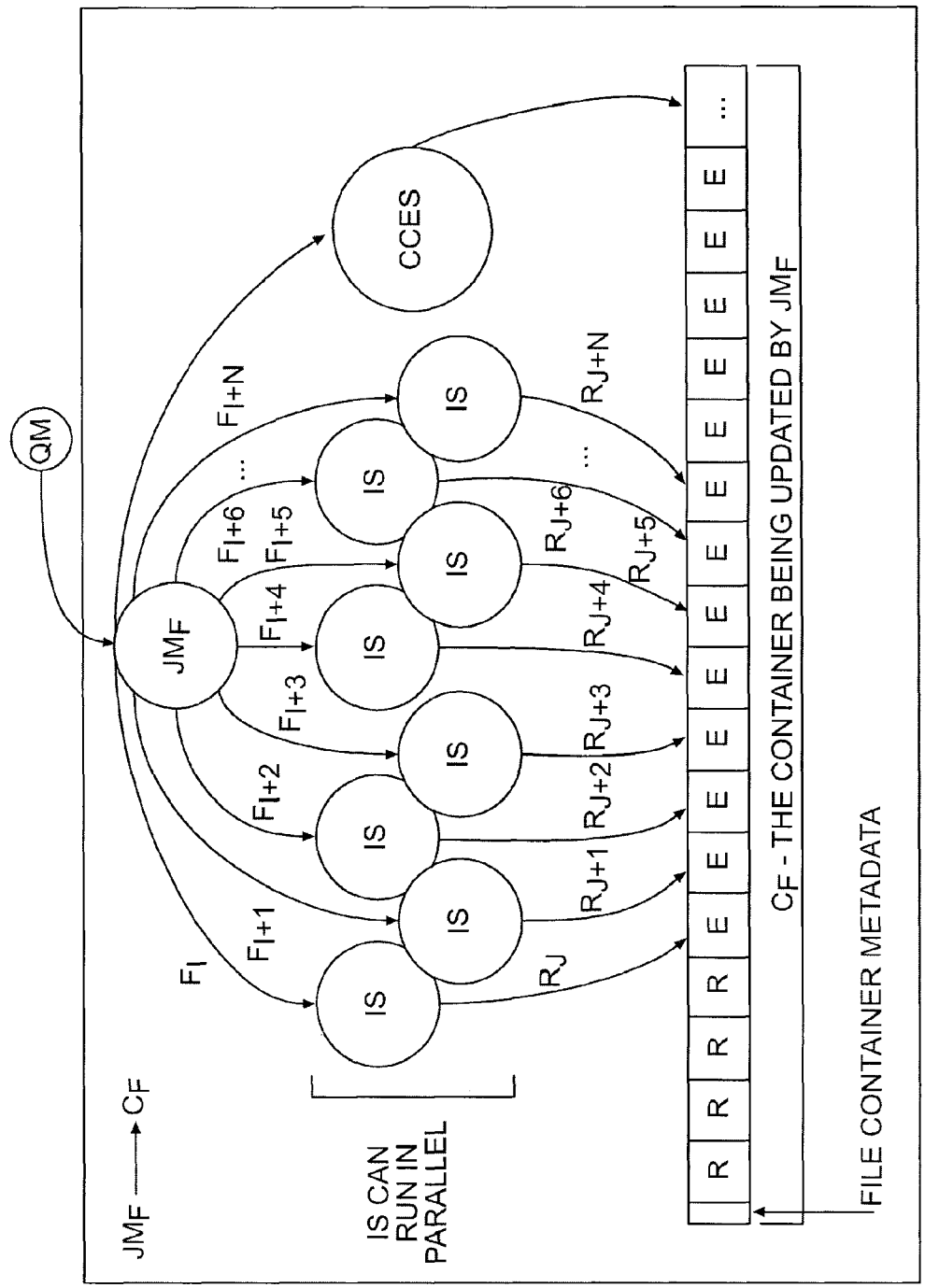
FIG. 21 is a logic diagram depicting a system for monitoring and controlling insertion of image files into a container, according to an embodiment of the present invention.

FIG. 21 is a logic diagram depicting a system for monitoring and controlling insertion of image files into a container, according to an embodiment of the present invention. As shown in FIG. 21, the higher-level system for monitoring and controlling the insertion of image files into a container may be provided with a three level hierarchy. In one embodiment, a first level consists of a single operational instance of a Queue Manager (QM) that oversees the submission of very large format images to specific containers on a storage device. The first level is a common location where all jobs are managed. A "job" consists of the task of inserting one or more very large format images into a container at known record locations or spaces. In one embodiment, there may be multiple QMs running across multiple interconnected computing platforms. One QM is the main manager while the remaining other QMs are failovers.

In one embodiment, a second level in the monitoring system consists of a single operational instance of a container Job Manager ($JM_f$). A single operational instance of a container $JM_f$ is assigned to a single container file $C_f$. In one embodiment, the container $JM_f$ retrieves the next job of inserting one or more images into a container from QM for the $C_f$ that is associated with the container $JM_f$. In one embodiment, the container $JM_f$ launches multiple, simultaneous HTTP requests to a pool of available insert services IS with each IS getting a unique record to update within the $C_f$. By monitoring the response from an insert service IS, the container $JM_f$ can monitor the status of each request and therefore perform any error management or recovery. $JM_f$ cannot launch simultaneous IS requests to the same record number. $JM_f$ cannot launch simultaneous CCES requests. At the end of each job, a container $JM_f$ updates the file container metadata section for its associated container file $C_f$ if needed. In one embodiment, at any instance, the $JM_f$ does not launch parallel requests to the same record space (i.e., a record with a same ID number).

In one embodiment, a third level consists of several independent Insert Services (IS). Each IS performs the method or procedure depicted in FIGS. 19 and 20 and described in detail in the above paragraphs and reports incremental progress to its parent $JM_f$ via a service interface of the insert service. In one embodiment, IS parameters may also be setup such that if a request comes in to update only the image metadata or part of the metadata, it follows the same logic as shown in FIGS. 19 and 20. However, instead of updating the entire record, the request updates only the record metadata and image metadata portion of the record. As described in the above paragraphs, a CCES either extends an existing $C_f$ or creates a new $C_f$ if so requested by the user. The CCES reports incremental progress to its parent $JM_f$ via its service interface.

Figure 22:
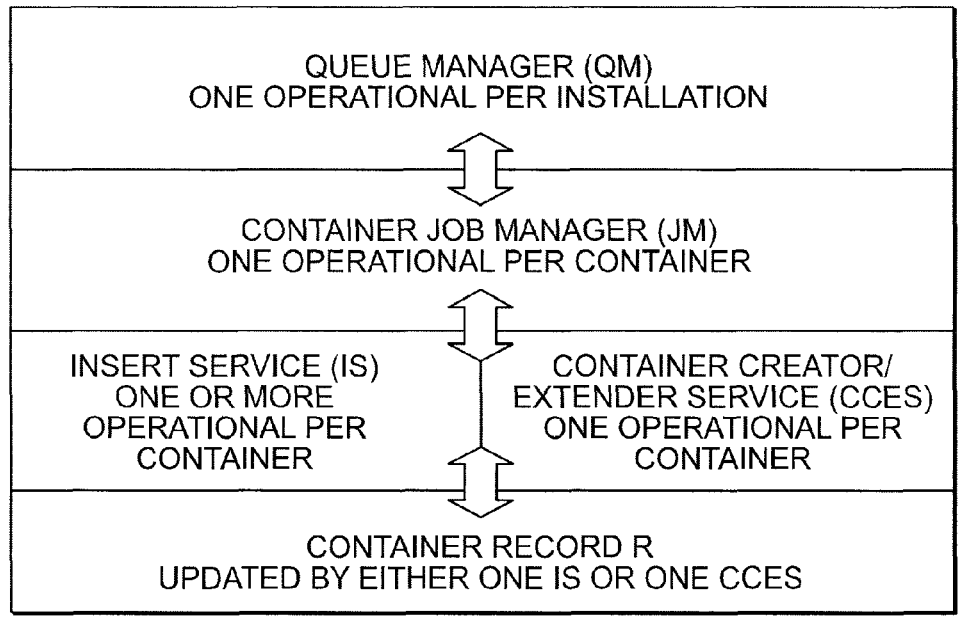
FIG. 22 is a diagram showing the hierarchical relationship between a Queue Manager (QM), a container Job Manager (JM), a Insert Service (IS), a Container Creator/Extender Service (CCES) and a Container Record (R); according to an embodiment of the present invention.

FIG. 22 is a diagram showing the hierarchical relationship between the Queue Manager (QM), the container Job Manager (JM), the Insert Service (IS) or Container Creator/Extender Service (CCES) and the Container Record (R). As shown, since the JM for a container manages implicit synchronization for each job and the IS manages updating each record, the actual process of updating records can be made to go in parallel spread across one or more instances on one or more computing platforms. The hierarchy of individual modules QM, JM, IS/CCES and R also allows for a single integrated tool such that all three levels or tiers can be in the same application. For example, in one embodiment, an insert service (IS), instead of being distributed as multiple instances across multiple computers, would be one or more threads within a single application.

Figure 23:
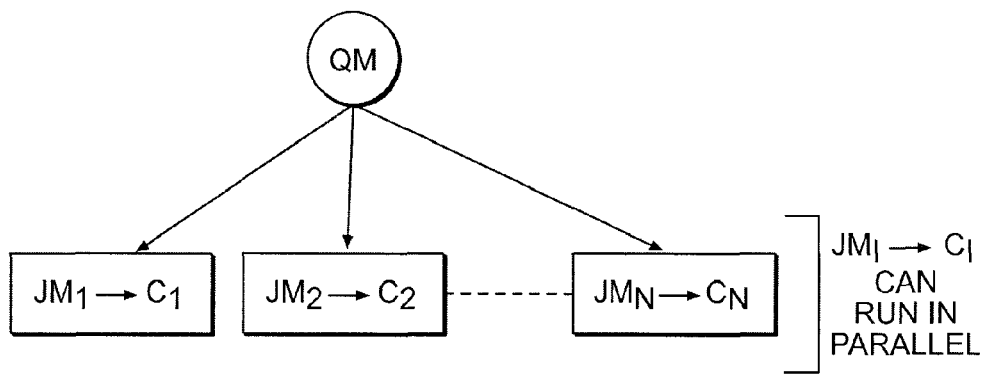
FIG. 23 is a diagram showing a single QM running multiple JMs, with each JM running a job to update a single container C, according to an embodiment of the present invention.

FIG. 23 is a diagram showing a single Queue Manager QM running multiple job managers JMs, with each JM running a job to update a single distinct container C, according to an embodiment of the present invention. As shown in FIG. 23, a JM is associated to a specific container $C_1, C_2, \ldots,$ or $C_N$. The JMs running jobs on the containers can be run in parallel. In one embodiment, no two JMs running in parallel can update the same container at the same time. Each job Manager $JM_i$ gets its own container $C_i$.

The QM launches a JM associated with a container, monitors the JM and processes messages supplied by the JM. The JM validates the job, prepares a list of CCES or IS requests that need to be processed to complete this job, launches processor threads waits for the processor threads to end while periodically reporting the status of the JM to the user.

Figure 24A:
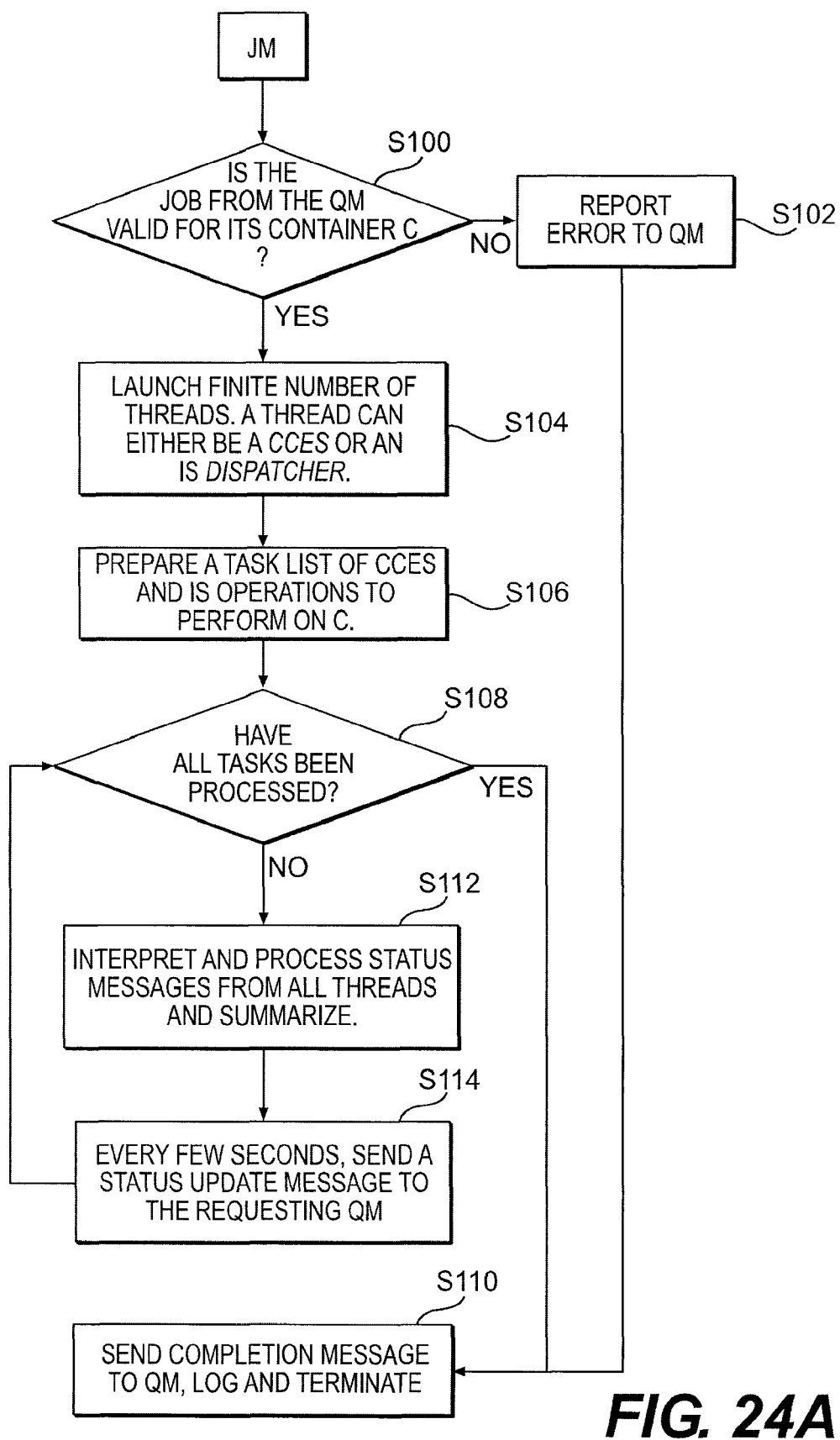
FIG. 24A is a flowchart depicting various operations performed by a JM, according to an embodiment of the present invention.

FIG. 24A is a flowchart depicting various operations performed by a JM, according to an embodiment of the present invention. As shown in FIG. 24A, the JM inquires whether a job from the QM is valid for its associated container C, at S100. If the job from the QM is not valid for the container C associated with the JM, the JM reports an error to the QM, at S102. If the job from the QM is valid for the container C associated with the JM, the JM launches a finite number of threads, at S104. A thread can either be a CCES or an IS dispatcher which creates, extends a container or inserts a record into a container, as is described further in detail in the following paragraphs. The JM then prepares a task list of CCES and IS operations to perform on container C, at S106. The JM then inquires whether all tasks have been processed, at S108. If all tasks have been processed, the JM sends a completion message to the QM, logs and terminates, at S110. If the tasks have not all been processed, the JM interprets and processes status messages from all threads and summarize, at S112. The JM sends a status update message to the requesting QM periodically (e.g., every few seconds), at S114.

Figure 24B:
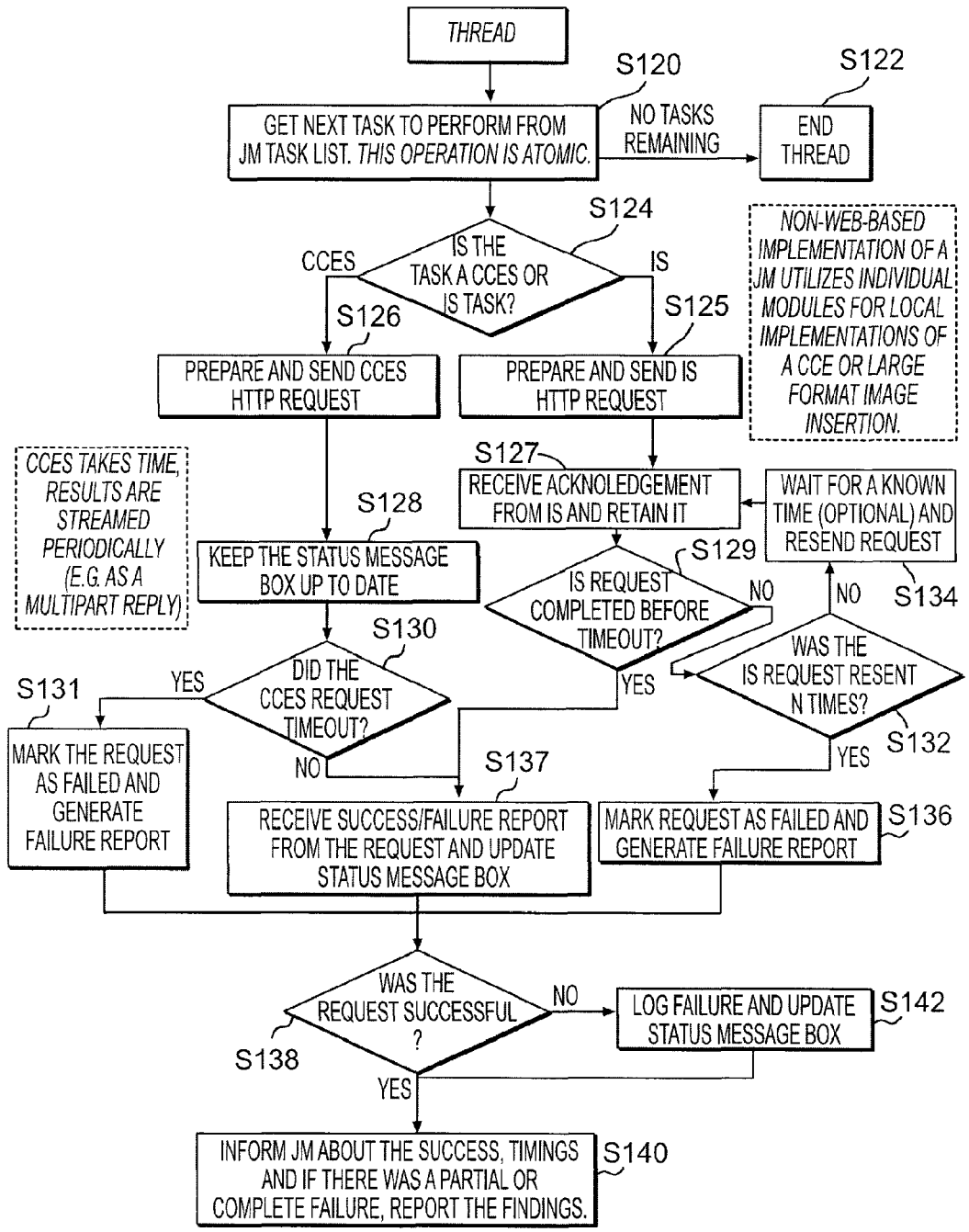
FIG. 24B is a flow chart depicting various operations performed by each thread launched by a JM, according to an embodiment of the present invention.

FIG. 24B is a flow chart depicting various operations performed by each thread launched by a JM, according to an embodiment of the present invention. Each thread includes getting a next task to perform from the JM task list, at S120. If no tasks are remaining from the task list, the thread is ended, at S122. If, on the other hand, a task is present, the thread inquires whether the task is a CCES task or an IS task, at S124. If the task is a CCES task, the thread prepares and sends a CCES HTTP request, at S126. The CCES procedure takes time to run, therefore the results are streamed periodically (e.g., as a multipart reply). The thread also includes keeping a status message box up-to-date. The thread further includes inquiring whether the CCES request completed before timeout, at S130. If the CCES request did not result in a valid response but timed out instead, this request is marked as failed and a failure report is generated at S131. A report is send to S138. If the CCES request is completed before timeout, the thread receives success/failure report from the request and update status box, at S137. The thread then inquires whether the request is successful, at S138. If the request is successful, the thread informs the JM about the success of the request, informs the JM about timing and report if there is a partial failure and other findings, at S140. If the request is not successful, the thread logs the failure and updates status message box; at S142.

If the task is an IS task, the thread prepares and sends an IS HTTP request, at S125. The thread then receives acknowledgement from the IS and retain the IS request, at S127. The thread further includes inquiring whether the IS request completed before timeout, at S129. If the IS request did not complete before timeout, the thread inquires whether the IS request was resent N times, at S132. The number N is an integer greater than or equal to 1 and is a user configured value. In one embodiment, if the IS request was not sent N times, the thread optionally waits a known time and resends the request, at S134. If the IS request was sent N times and still each request timed out, the thread marks the request as failed and generates a failure report at S136. If the IS request is completed before timeout, the thread receives success/failure report from the request and updates status box, at S137. The thread then inquires whether the request is successful, at S138. If the request is successful, the thread informs the JM about the success of the request, informs the JM about timing and report if there is a partial failure and other findings, at S140. If the request is not successful, the thread logs the failure and updates status message box, at S142.

Figure 25:
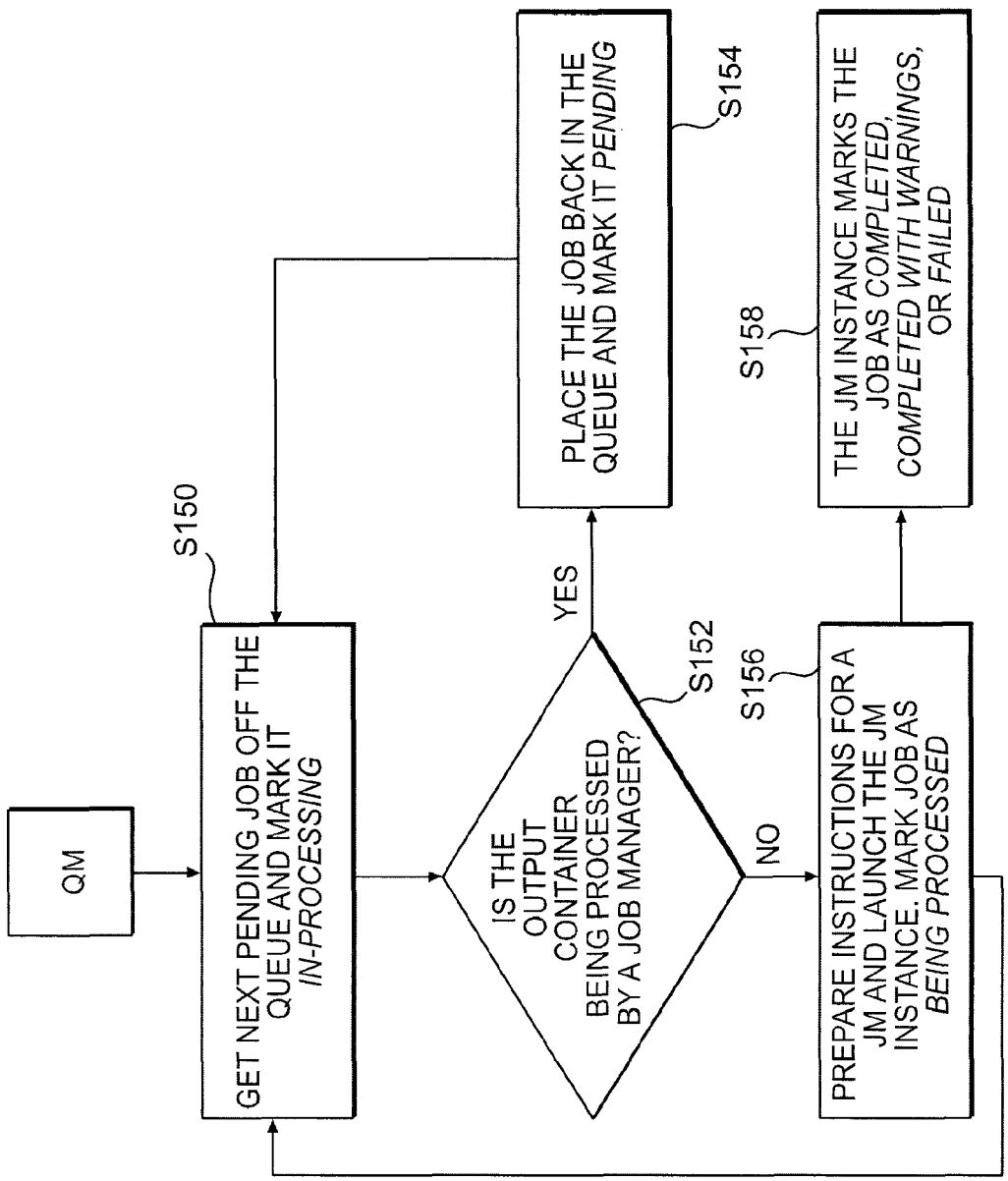
FIG. 25 is a flowchart depicting a basic task of a Queue Manager (QM), according to an embodiment of the present invention.

FIG. 25 is a flowchart depicting the basic task of a Queue Manager (QM), according to an embodiment of the present invention. A user posts jobs on a queue and monitors the jobs. A QM initiates or starts JMs for containers that the QM is assigned. The QM retrieves a pending job from its job queue and marks the job as being "in-processing", at S150. The QM inquires whether the container (output container) is being processed by the associated JM, at S152. If the output container is already being processed by its associated or assigned JM, the job is placed back in the queue and the job is marked by the QM as "pending", at S154. If, on the other hand, the output container is not being processed by its associated JM, the QM prepares instructions for a JM and launches the JM instance and marks the job as "being processed", at S156. The JM instance then marks the job as completed, completed with warning or failed, at S158. The QM can then initiate or start JMs for any new containers that may appear in a list of containers assigned to the QM. The QM can repeat the process starting at S150 by retrieving a next pending job of the queue and marking the Job as "in-processing", etc.

Figure 26:
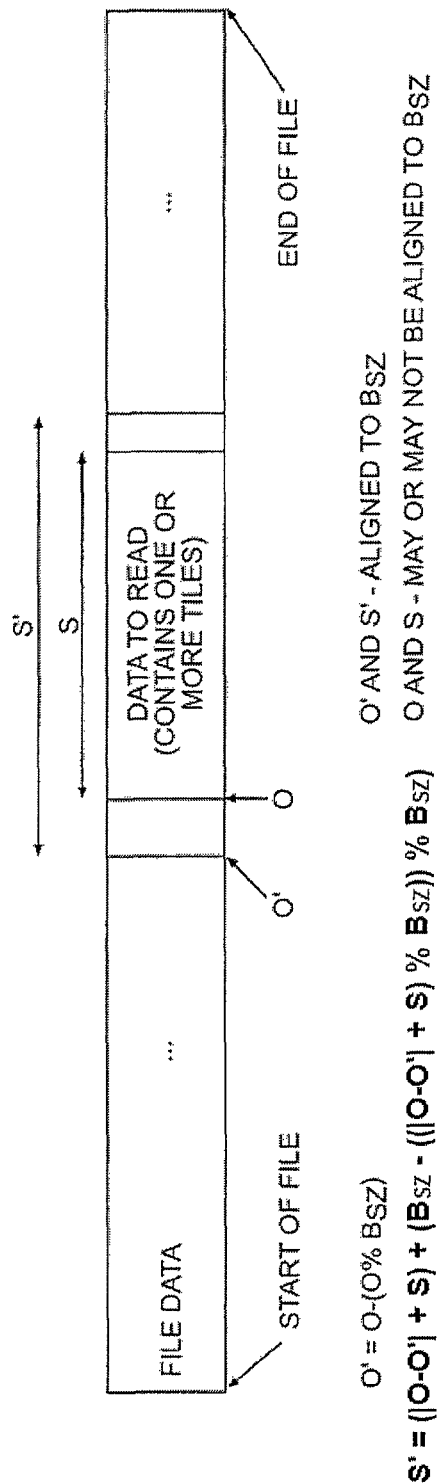
FIG. 26 is a diagram depicting a mathematical procedure used in read operations to ensure that all read operations always begin at a storage device block size (SDBS) aligned offset and are of a size that is also SDBS aligned, according to an embodiment of the present invention.

FIG. 26 is a diagram depicting a mathematical procedure used in read operations to ensure that all read operations always begin at an SDBS aligned offset and are of a size that is also SDBS aligned, according to an embodiment of the present invention. When a container is created, every attempt is made to store headers and records such that every component of each record and its headers are stored at SDBS aligned offsets. However, there may be scenarios where a read operation may not occur at SDBS offsets and the read request may not be of a size that is SDBS aligned. For example, one scenario may occur when the container is copied from a storage device to another, and the SDBS of the source storage device is smaller than the SDBS of the destination storage device. As a result, read operations may not occur at SDBS offsets. Another scenario occurs when the container record is in a $3^{rd}$ party format, and a viewport read or partial record read requires access to smaller chunks of data spread across the record, the $3^{rd}$ party format may not have exercised the diligence of storing the data at offsets that are SDBS aligned. For example, a JPEG2000 JP2 formatted image may stores tiles which may not start at SDBS aligned offsets.

If the read operations begin at SDBS aligned offsets within a container file and if the size of a read operation is also SDBS aligned, the read operation is much more efficient. To ensure SDBS aligned reads, the read operation may be further optimized by reading a little bit extra number of bytes.

For example, as depicted in FIG. 26, a read request may start from offset O of size S which may or may not be aligned to SDBS. If SDBS is denoted by $B_{sz}$, a new aligned read operation would start at offset O' and be of size S' such that, $O'=O-(O \% B_{sz})$ and $S'=(|O-O'|+(Bsz-((|O-O'|+S) \% Bsz)) \% Bsz)$. These equations provide values to align a read operation to SDBS, if not already aligned.

As described in the above paragraphs, multiple large format images can be stored in a single container. Information about the layout of the image can be stored in the record metadata section. The image can be stored within the container (i) uncompressed, tiled, with the tiles arranged in column-major order, with optional overlapping, (ii) compressed, tiled, with the tiles arranged in row-major order, with optional overlapping, (iii) compressed, tiled, with the tiles arranged in column-major order, with optional overlapping, or (iv) stored in a known $3^{rd}$ party file format that is tiled. Tile dimensions, start offsets and sizes of each tile are stored in the record metadata section at the time the image is inserted or stored in the container.

In one embodiment, the image can be stored with overlapping in one of the three forms (i), (ii) and (iii). The fourth form (iv) involving $3^{rd}$ party file formats is outside the scope of the concept of overlapped storage. In one embodiment, for overlapped tiles, the system is configured to read only one tile of the overlapped tiles, and the read operation reads starting from a SDBS aligned location prior or equal to the start of that tile and ends at a SDBS aligned location after or equal to the end of the same tile. By reading from the SDBS aligned location prior or equal to the start of a desired tile to the SDBS aligned location after or equal to the end of the same tile, the system ensures that a tile as a whole is read.

Figure 27A:
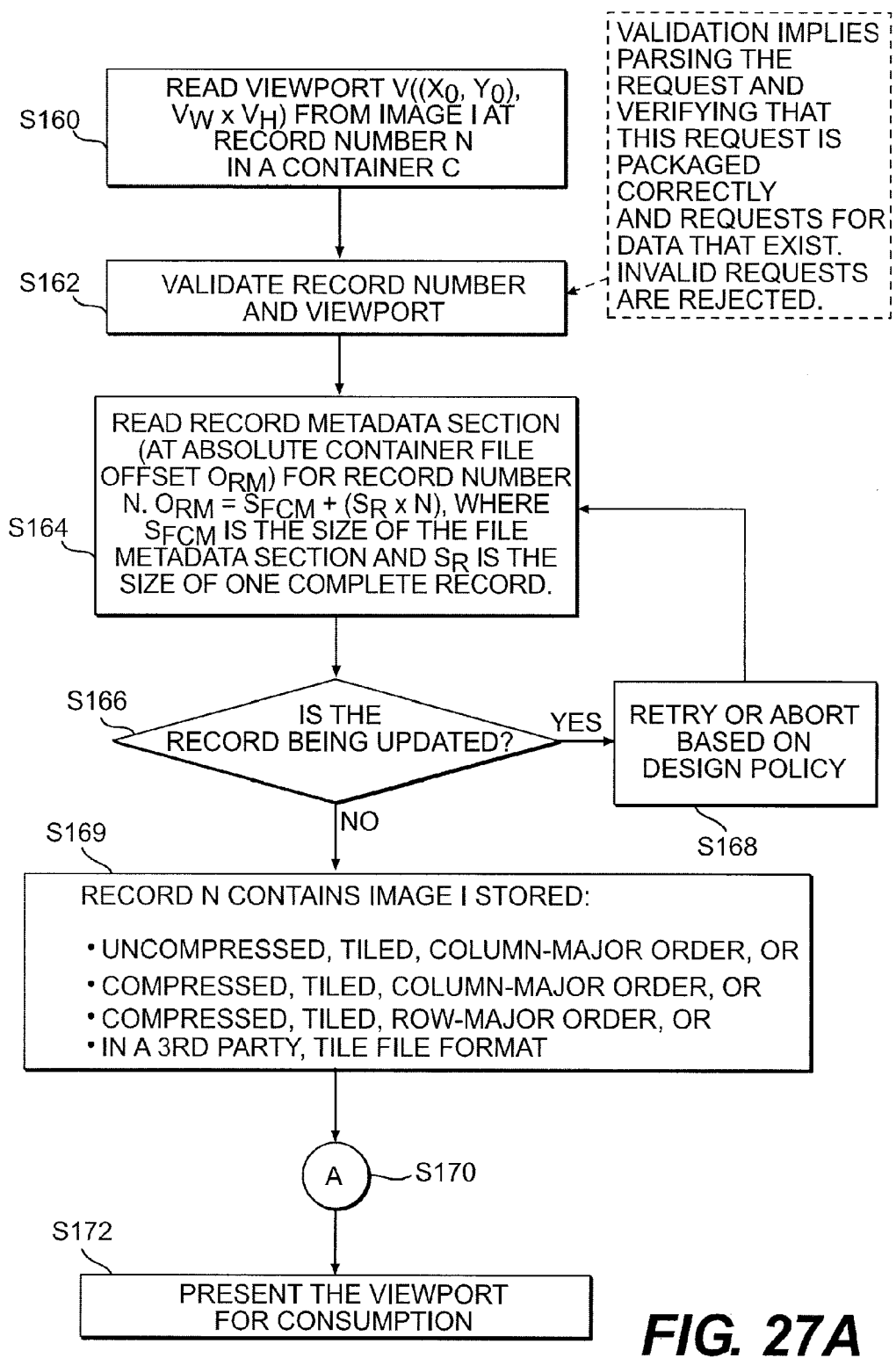
FIG. 27A is a flow chart of a method for retrieval of an image viewport from a container, according to an embodiment of the present invention.

FIG. 27A is a flow chart of a method for retrieval of an image viewport from a container, according to an embodiment of the present invention. The method for retrieving of viewport V $((X_0,Y_0), V_w \times V_h)$ includes reading viewport V from an image I at record number N in container C, at S160. The method further includes validating the record number and viewport, at S162. In one embodiment, validating includes parsing the request and verifying that the request is packaged correctly and verifying that the request is made for data that exists. If the request is not packaged correctly or the request is not made for data that exist the request is invalidated and rejected. The method further includes reading record metadata section (e.g., at absolute container file offset $O_{rm}$ for record number N, where $O_{rm}=S_{fcm}+(S_r \times N)$, at S164, where $S_{fcm}$ corresponds to the size of the file metadata section and $S_r$ corresponds to the size of one complete record. The method then inquires whether the record is being updated, at S166. If the record is being updated, the method can retry or abort based on design policy (i.e., as implemented by the designer), at S168. If, on the other hand, the record is not being updated, the method determines if record N contains image I stored (i) uncompressed, tiled, column-major order, (ii) compressed, tiled, column-major order, (iii) compressed, tiled, row-major order, or (iv) in a third party file format. The method then implements procedure "A" depending on the above listed forms of storage, at S170 and presents the viewport for consumption (e.g., display on a display device), at S172.

FIG. 27B is a flow chart of part (procedure "A") of the method for retrieval of an image viewport from a container, according to an embodiment of the present invention. The procedure "A" is in fact divided into four sub-procedures "$A_1$", "$A_2$", "$A_3$" and $A_4$" which are implemented depending of the form of storage (i), (ii), (iii) or (iv). For example, procedure "$A_1$" is implemented for an image I which is stored uncompressed, tiled, with the tiles arranged in column-major order, with optional overlapping, in record N. The sub-procedure "$A_1$" includes computing a top left and bottom right column numbers of the tiles containing the viewport, at S180. For example, $T(C_0)$ is the left tile column, $T(C_1)$ is the right tile column and there are a total of $C_i$ columns. The sub-procedure $A_1$ further includes, for each column $C_k$ from $C_0$ to $C_1$, computing the absolute aligned offset from the start of the container file, and the aligned size of the strip starting from line $Y_0$ to and including line $Y_0+V_h-1$ as described in the above paragraphs (see, for example, FIGS. 10A and 10B and related description), and dispatching parallel or asynchronous read requests of computed sizes, at S182. The sub-procedure $A_1$ further includes as each parallel or asynchronous read request completes, collecting and processing only pixels that reside within the viewport bounds to generate the output viewport in a single raster, at S184.

Sub-procedure "$A_2$" is implemented for an image I which is stored compressed, tiled, with the tiles arranged in row-major order, with optional overlapping, in record N. The sub-procedure "$A_2$" includes computing a top left and bottom right column and row numbers of the tiles containing the viewport, at S190. For example, $T(C_0,R_0)$ is the top-left tile, $T(C_1,R_1)$ is the bottom-right tile and there are a total of $C_i$ columns and $R_j$ rows. The sub-procedure "$A_2$" further includes, for each row $R_k$ from $R_0$ to $R_1$, launching parallel or asynchronous operations to read tiles for each row, at S192. Each row $R_k$ contains $C_i$ tiles from tile $C_0$ to $C_1$. These tiles are stored in sequence within the container and can be regarded as a tile strip. The sub-procedure "$A_2$" includes reading the entire tile strip for the row in a single read operation or reading one or more individual tiles in parallel or in asynchronous operation, at S194. If a tile strip is read, the read starts from a SDBS aligned location prior to or equal to the start of tile $C_0$, $R_k$ and ends at a SDBS aligned location after or equal to the end of the tile $C_1, R_k$. If the sub-procedure "$A_2$" reads multiple individual tiles in parallel or asynchronously, each tile read starts from a SDBS aligned location prior to or equal to the start of that tile $C_m, R_k$ and ends at a SDBS aligned location after or equal to the end of the same tile $C_m, R_k$, where $C_m$ ranges from $C_0$ to $C_1$. As each parallel or asynchronous read request completes, the sub-procedure "$A_2$" decodes, collects and processes only pixels that reside within the viewport bounds to generate the output viewport in a single raster, at S196.

Sub-procedure "$A_3$" is implemented for an image I which is stored compressed, tiled, with the tiles arranged in column-major order, with optional overlapping, in record N. The sub-procedure "$A_3$" includes computing a top left and bottom right column and row numbers of the tiles containing the viewport, at S200. For example, $T(C_0,R_0)$ is the top-left tile, $T(C_1,R_1)$ is the bottom-right tile and there are a total of $C_i$ columns and $R_j$ rows. The sub-procedure "$A_3$" further includes, for each column $C_k$ from $C_0$ to $C_1$, launching parallel or asynchronous operations to read tiles for each column, at S202. Each column $C_k$ contains $R_j$ tiles from tile $R_0$ to $R_1$. These tiles are stored in sequence within the container and can be regarded as a tile strip. The sub-procedure "$A_3$" includes reading the entire tile strip for the column in a single read operation or reading one or more individual tiles in parallel or in asynchronous operation, at S204. If a tile strip is read, the read starts from a SDBS aligned location prior to or equal to the start of tile $C_k, R_0$ and ends at a SDBS aligned location after or equal to the end of the tile $C_k, R_1$. If the sub-procedure "$A_3$" reads multiple individual tiles in parallel or asynchronously, each tile read starts from a SDBS aligned location prior to or equal to the start of that tile $C_k, R_m$ and ends at a SDBS aligned location after or equal to the end of the same tile $C_k, R_m$, where $R_m$ ranges from $R_0$ to $R_1$. As each parallel or asynchronous read request completes, the sub-procedure "$A_3$" decodes, collects and processes only pixels that reside within the viewport bounds to generate the output viewport in a single raster, at S206.

Sub-procedure "$A_4$" is implemented for an image I which is stored in a third party tiled file format. The sub-procedure "$A_4$" includes computing a top left and bottom right column and row numbers of the tiles containing the viewport, at S210. For example, $T(C_0,R_0)$ is the top-left tile, $T(C_1,R_1)$ is the bottom-right tile and there are a total of $C_i$ columns and $R_j$ rows. The sub-procedure "$A_4$" includes determining whether the record metadata section holds a table of offsets and sizes of each tile in the image that exists in a known third-party file format (e.g., JPEG2000 or TIFF). The sub-procedure "$A_4$" further includes inquiring whether the image data is stored in row-major order or column major order, at S214. If the image data is stored in column-major order, sub-procedure "$A_3$" is used instead and instead of computing tile offsets, the tile offsets are determined from the record metadata section, at S216.

If the image data is stored in row-major order, sub-procedure "$A_2$" is used instead, and instead of computing tile offsets, the tile offsets are determined from the record metadata section, at S218. If the order is not known, either sub-procedure "$A_2$" or sub-procedure "$A_3$" can be employed to read multiple individual tiles and instead of computing offsets the offsets can be retrieved from the record metadata section, at S220. As each parallel or asynchronous read request completes, the sub-procedure "$A_4$" decodes, collects and processes only pixels that reside within the viewport bounds to generate the output viewport in a single raster, at S222.

FIG. 28 is a schematic representation of a viewport within an image stored within a container file, according to an embodiment of the present invention. For example, a viewport V starting from pixel $X_0,Y_0$ and having a size $V_w \times V_h$ pixels within a given image I that is at a record numbered N in a given container is retrieved using a method for retrieving a viewport, according to an embodiment of the present invention. A number M of such viewports may be read from the same container storing a plurality of images using the same method, applied either in sequence or in parallel using a local or distributed computing system. In one embodiment, the origin $X_0,Y_0$ of each of the plurality of viewports within the plurality of images is fixed from one viewport to a next viewport. In another embodiment, the origin $X_0,Y_0$ of each of the plurality of viewports is movable from one viewport to a next viewport.

In one embodiment, a viewport V can be requested for display on a display device. Alternatively or in addition, a viewport may also be requested for further processing by a processing device to analyze data in the viewport or extract data from the viewport. For example, the processor may perform image-processing operations on the content of many such viewports (e.g., perform processing on a sequence of viewports obtained during a certain time period) in order to detect differences between image content or data in the viewports that would indicate, for example, activity-based information. For example, by processing viewports from large format images that were captured by placing sensors on an aircraft pointing towards the ground, and persistently hovering over a fixed location on the ground, processing operations on viewports can generate tracks for moving objects. Efficient retrieval and dissemination of viewports for processing by processors may thus provide an efficient means for retrieval of desired information. The retrieved desired information may be communicated to a user in various forms such as text, graphics, audio signal, etc. The retrieved desired information may even be further displayed on a display device in a form of an image or a series of images (e.g., a movie). Therefore, as it can be appreciated from the above paragraphs, the method and system described herein can be used in dissemination of viewports for further processing by a processing device and/or further display by a display device depending on the application sought.

Figure 29:
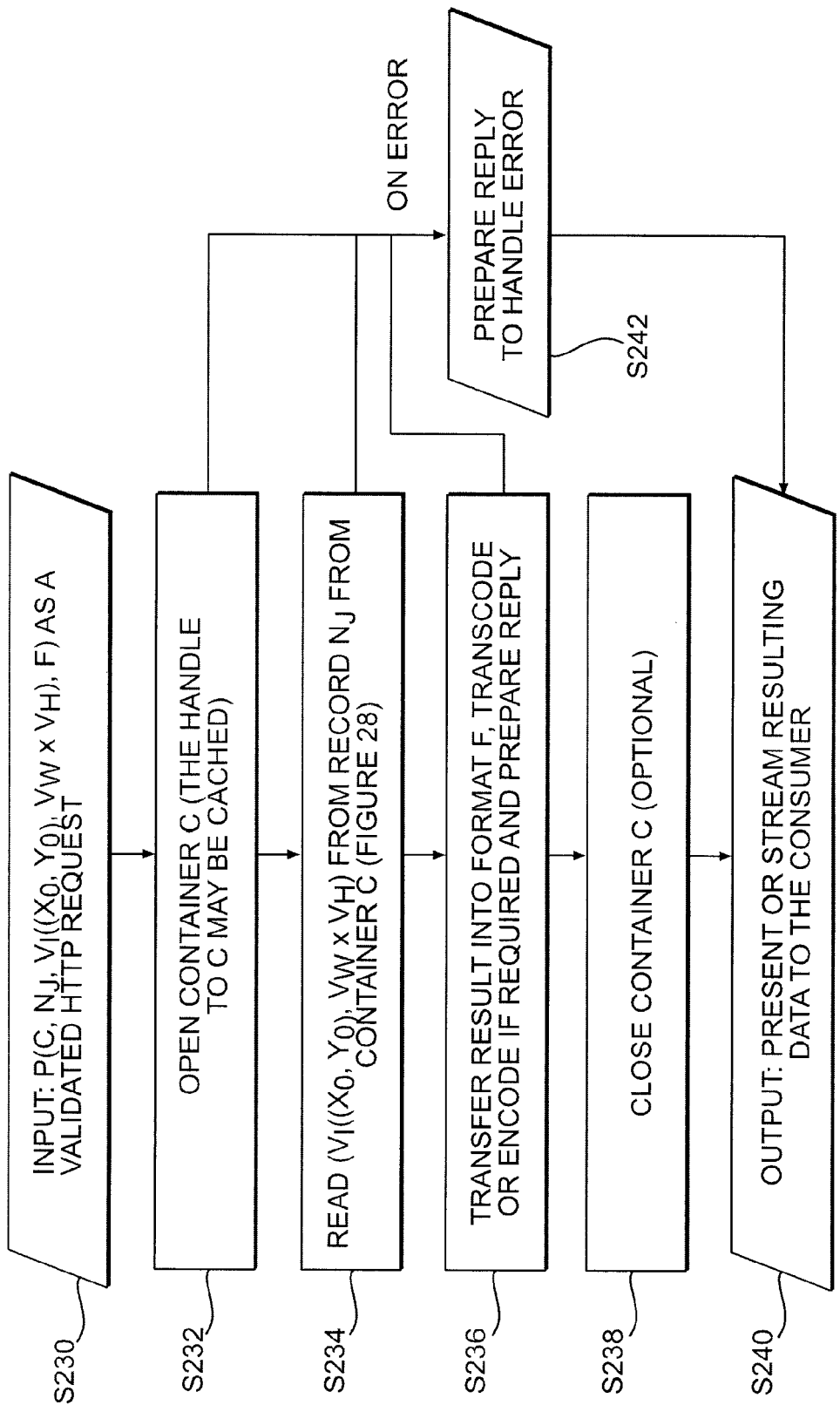
FIG. 29 is a flow chart depicting a method for retrieval of one image viewport from a container, the method being implemented as a web service, according to an embodiment of the present invention.

FIG. 29 is a flow chart of a method for retrieval of an image viewport from a container, according to an embodiment of the present invention. In one embodiment, the method can be implemented as a web service that uses the HTTP protocol. However, the method can also be implemented using other protocols. In one embodiment, a basic request will perform one of two tasks. The request may ask for a viewport from a single record within a container. This is referred to herein as a "single-record" request. Alternatively, the request may ask for a viewport from a sequence of multiple records within a container, where the viewport may remain static or may follow a preset temporal and spatial path. This is referred to herein as a "multi-record" request.

A single-record request is efficient for reading different viewports for non-sequential records or when displaying data in the form of a flip-book. Such a request is also efficient when the nature of the next request is random and cannot be anticipated. A multi-record request is efficient for reading a viewport from a group of sequential records. One example of application of a multi-record request is when requesting a sequence of viewports from a container for eventual encoding into an MPEG codestream. In another example, if the network latency is high, many single-record requests translate into many individual requests, and will take longer to execute because of network latency overhead per request. However, a multi-record request is a single web request, and it retrieves several viewports within that one request, thus minimizing the network latency overhead.

A single-record request is denoted by P. A single record request involves reading a viewport $V_i$ from a record $N_j$ from a container C. Viewport $V_i$ starts from top left pixel $(X_0,Y_0)$ and is $V_w \times V_h$ pixels in dimensions. The result is delivered to the client in a known format F, where F can be raw pixel data or may be converted into an image of known format, for example JPEG, JPEG2000, TIFF, or PNG. Optionally, metadata regarding the viewport may also be packaged into the result using a standard HTTP reply format, for example a multi-part message that follows IETF RFC2045.

The request P is denoted by $P(C, N_j, v_i((X_0,Y_0), v_w \times V_h), F)$. Additional input parameters may be packaged as part of the request as needed for the service implementation.

The method of retrieving or reading the viewport includes inputting the request and reading the parameters of the request P including identifying the position and size of the viewport $V_i(X_0,Y_0,V_w \times V_h)$, the record containing the viewport $V_i$ and the container containing the record $N_j$, is at S230. The method further includes opening the container C, at S232. The opening may be an explicit opening or a retrieving from a cached container. The method further includes reading the viewport $V_i(X_0,Y_0,V_w \times V_h)$ from record $N_j$ from container C (see, for example, FIG. 28), at S234. The method includes transferring the result into format F and transcode or encode the result if needed, at S236. The method further includes optionally closing the container, at S238, and outputting or presenting or streaming the resulting data to the user, at S240. At any point during opening of the container, reading of the viewport, and/or transferring the result into format F, the method may generate an error message and prepare a reply to handle error, at S242.

A multi-record request is denoted by L. L has more than one P. L is denoted by $L(P_1 \ldots P_n)$ and is read as "L is a multi-record request containing multiple single record requests from $P_1$ to $P_n$," where each $P_i$ is a single-record request. From the user's perspective L is treated as a single operation. From the service (e.g., web service) implementation's perspective, L performs multiple P operations. Each P is independent of another P. Therefore, each single record requests $P_i$ can be executed in parallel. The result of any $P_i$ is delivered in the format $F_i$ chosen for that $P_i$.

The user makes one L request. The service processing an L request, on the other hand, makes multiple $P_i$ requests in parallel. Each request $P_i$ may be completed out of order by the service implementation. Each request $P_i$ can be distributed across other systems or launched to run local to a computer system.

The user may either want to receive the result of each P request in the same order as it was sent, from $P_1$ to $P_n$, or the client may want to receive the results of all P requests as soon as they complete, which may be out of order. In the latter case, the user may further order the results if desired.

Figures 30A, 30B:
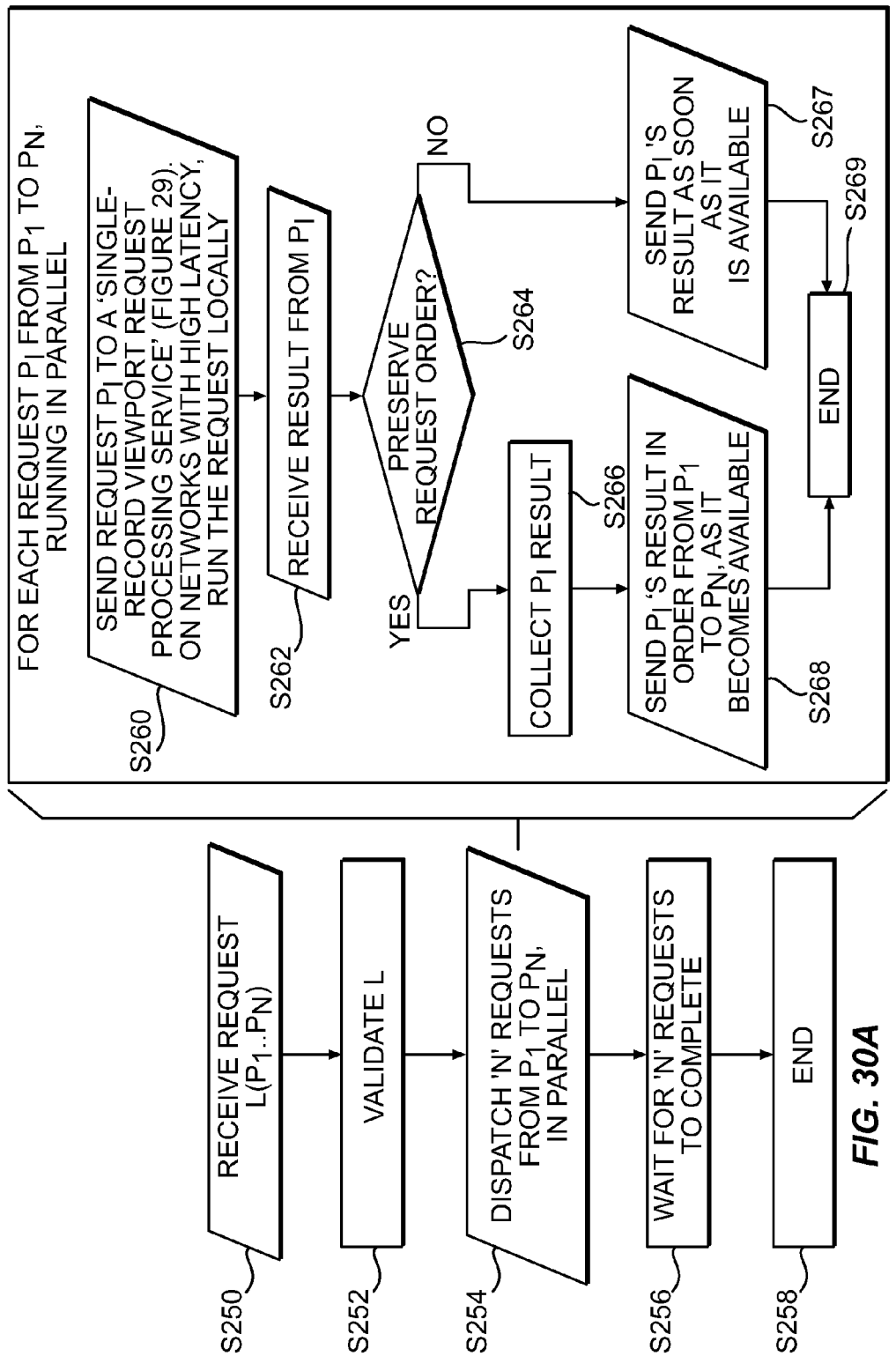
FIG. 30A is a flow chart depicting a method for retrieval of multiple image viewports from a container, the method being implemented as a web service, according to another embodiment of the present invention.
FIG. 30B is a flow chart depicting a sub-procedure within the method shown in FIG. 30A.

FIG. 30A is a flow chart depicting a method for retrieval of multiple image viewports from a container, the method being implemented as a web service, according to an embodiment of the present invention. The method includes receiving a request L ($P_1 \ldots P_n$) from a user, at S250, where $P_1 \ldots P_n$ are single record requests. The method further includes validating parameters of the request L, at S252. In one embodiment, validating parameters of the request includes validating each request $P_1 \ldots P_n$ and thus validating parameters of each request P (i.e., validating parameters such as container, record location, etc of each request P). In one embodiment, the method further includes dispatching n requests from $P_1 \ldots P_n$ in parallel, at S254 and wait for n requests to complete, at S256 and ending, at S258.

FIG. 30B is a flow chart depicting a sub-procedure within the method shown in FIG. 30A. In one embodiment, as shown in FIG. 30B, the dispatching of 'n' requests from $P_1 \ldots P_n$ in parallel ("dispatching procedure") includes, for each request $P_i$ from $P_1 \ldots P_n$ running in parallel, sending request $P_i$ to a single record viewport request processing service (see, FIG. 29 and related description), at S260. The parallel requests $P_1 \ldots P_n$ can run over a distributed network of computer or locally within one computer. On a network with high latency, it may be beneficial to run the parallel requests $P_1 \ldots P_n$ locally. The dispatching further includes receiving results of each request $P_i$, at S262. The dispatching further includes inquiring whether preserving request order is desired, at S264. In one embodiment, if preserving the order of the request is desired, the dispatching collects the result of each $P_i$ request, at S266, and send the result of each $P_i$ in order from $P_1$ to $P_n$ as the result becomes available, at S268. In one embodiment, if preserving the order of the request is not desired, the dispatching sends the result of each $P_i$ as soon as the result is available, at S267. The dispatching procedure then ends, at S269.

A very large format motion imagery container C contains very large individual frames or images. One such large image or frame generally does not fit on a typical high-resolution display. Generally, a user requests only a part of the image which is a viewport image. If a user desires to flip through a plurality of viewports in sequence, this can be achieved by making multiple requests to a single-record or a multi-record viewport request processing service. However, this may not be the most efficient way in terms of utilizing a network bandwidth between a server computer or computers and a client computer.

An alternative way to provide the sequence of viewports (SOV) for a client that desires to play the sequence of viewports is to encode the sequence of viewports into a single video codestream of a known format, such as, but not limited to, MPEG, AVI, MPEG-2, MKV, or WMV. It is assumed that such a video codestream comprises several sub-components, such that each sub-component of a specific type can be encoded independently from other sub-components of that type. For example, in video coding, a group of pictures (GOP) specifies the order in which individual frames are arranged. For example, a GOP can contain one or more of an intra-frame (I-frame), a predicted-frame (P-frame), a bidirectional-frame (B-frame), or a DC-picture (D-frame). A GOP may contain additional frame types as well. One or more sequential GOPs in a video codestream can be regarded as a sub-component.

A video codestream comprises multiple independent sub-component codestreams. Each sub-component codestream includes one or more very large format motion imagery viewports as input. An example is MPEG-2 that wraps an H.264 video codestream where one or more H.264 encoded GOPs comprise a video sub-component. FIG. 31A is a diagram depicting the internal breakdown of a video sub-component comprising a video codestream of one or more group of pictures (GOP), according to an embodiment of the present invention.

A video sub-component requires a sequence of viewports as source data from a container. A service implementation requests the viewports and encodes the viewports into a codestream for the video sub-component.

In one embodiment, a method of retrieving a sequence of viewports from a container as a web service for the purpose of encoding the viewports into a video sub-component is provided. FIG. 31B is a diagram depicting a data path of a method for providing a streaming video sub-component as a web service derived from multiple image viewports from a container, according to an embodiment of the present invention. In one embodiment, a user issues a request for streaming video of a sequence of viewports, denoted by G. The request G comprises a single request L with the same format for each viewport request P within the request L. Thus, request G can be denoted by G(L, F), where F is the format of the output picture. The service implementation may choose to send an L request to another service or implement L as part of the implementation of G. Viewport requests $P_1 \ldots P_n$ corresponding to sequence of viewports V can be streamed sequentially, each in a format F. The video sub-component encoding service then encodes the retrieved viewports into a video sub-component codestream and send the codestream to the client or user (see FIG. 31B).

FIG. 32 is a flow chart depicting a method for providing a streaming video service of a group of pictures (GOP) from a container, according to an embodiment of the present invention. The method includes receiving a request for streaming video of a sequence of viewports, denoted by G (L,F), at S270. The request G comprises a single request L with the same format for each viewport request $P_i$ within the request L. Each viewport request $P_i$ corresponds to requested viewport $V_i$. The method further includes validating the request G, at S272. In one embodiment, the validating includes checking parameters of the request G including checking if the viewports requested exist within specified records within a specified container. The method further includes sending the request L of the request G, at S274. In one embodiment, the request is made with the state of the "preserve request order" flag set to "true". The method further includes encoding each received viewport request $P_i$ into a video codestream subcomponent, at S276, and stream encoded codestream in expected sequence, at S278 and end the method at S280. During the validation of the request, the sending of the request L the encoding of picture $P_i$, an error may occur. In which case, the method may further include processing the error into a reply and send to the user, at S279.

A request for streaming video is denoted by D. The request for streaming video D contains one or more parts. Each part originates from a specified container. Each part contains video frames. Each video frame is a viewport from a large format motion imagery frame. In one embodiment, a method of retrieving a video codestream of a collection of a sequence of viewports from one or more containers is provided. Each sequence of viewports is retrieved and encoded by a video streaming service that provides a partial video codestream as described in the above paragraphs and each such partial video codestream is processed and streamed by a video streaming service. Such a video streaming service is denoted herein by M. The video streaming service M processes a request D which is a collection of requests for a sequence of viewports from one or more containers. M is a video streaming service. D is the request that M serves. Consider that the video streaming request D comprises of a total of Q requests from $G_1$ to $G_Q$ where each $G_i$ is a request for a sequence of viewports from a container. D can be denoted by $D(G_1 \ldots G_Q, F_D)$ where $F_D$ is the format in which the final video codestream is streamed to the client. Each request G(L, F) is provided with a format F selected by D such that the transformation from F to $F_D$ can be further optimized.

When the implementation of the web service receives such a request D, it can execute each request $G_i$ in parallel. As video streaming service M receives the video sub-component codestream from each $G_i$, M packages it for transmission. This can also be performed in parallel, which means that $G_1, G_2, \ldots, G_Q$ can be launched in parallel. The results may arrive into M (i.e., into the video server) out of order. They are assembled by M to be in the correct order. The resulting final video codestream is streamed to the client for consumption. Thus, a streaming service M serves a video request D.

Figure 33:
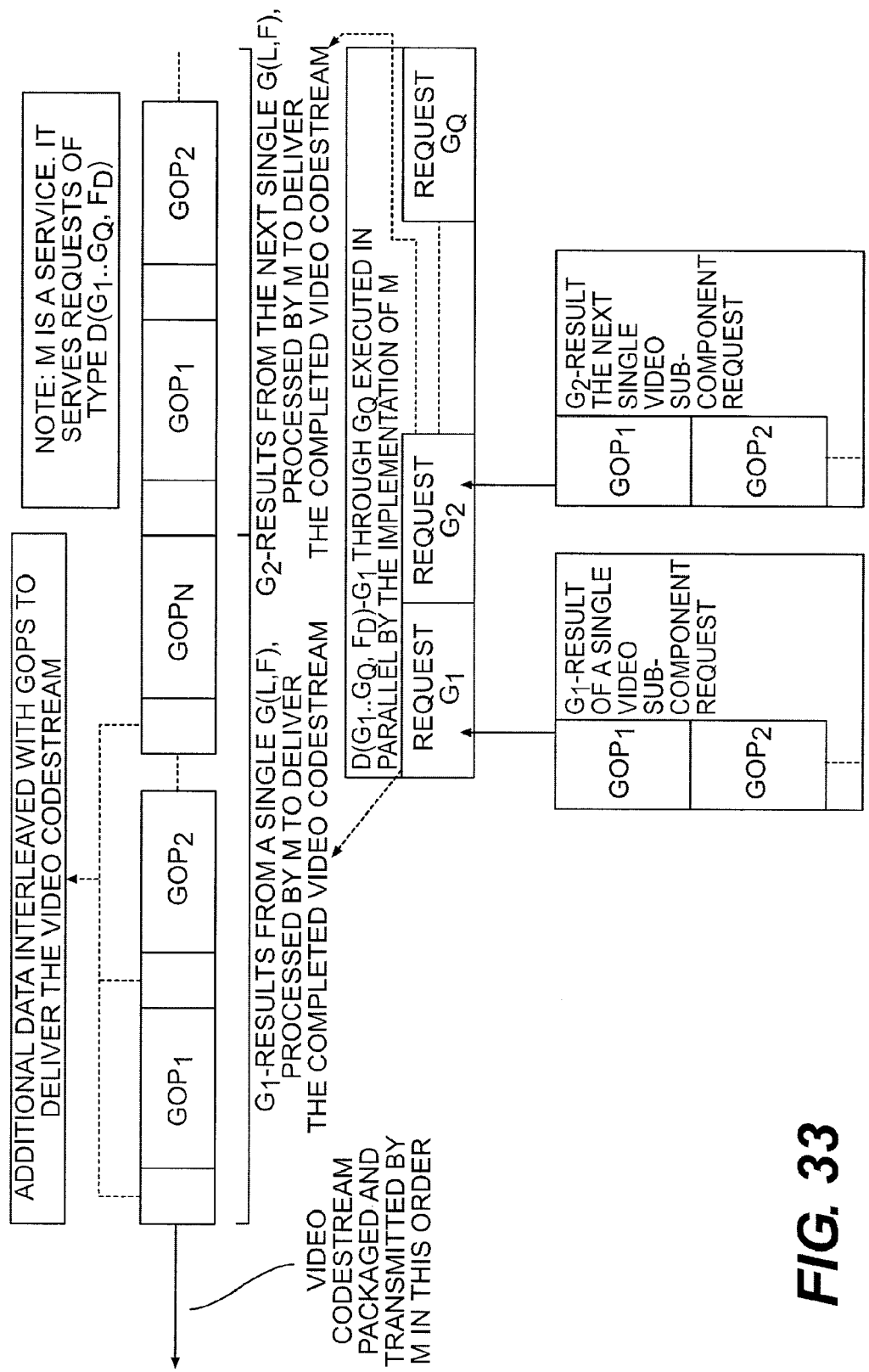
FIG. 33 is a diagram depicting a method for combining multiple parallel video sub-component requests to generate a sequential video codestream, according to an embodiment of the present invention.

As shown in FIG. 33, the video codestream comprises a first series of group of pictures $GOP_1, GOP_2, \ldots, GOP_N$. Between each $GOP_i$ (i ranging from 1 to N) may be interleaved with additional data such as, for example, sound or other reference data. For example, $GOP_1, GOP_2, \ldots, GOP_N$ may correspond to a result of request $G_1(L,F)$ processed by streaming service M to deliver the completed video codestream. For example, the video codestream may further include a second series of group of pictures $GOP_1, GOP_2, \ldots, GOP_N$ which may correspond to a result of a next request $G_2(L,F)$ processed by M to deliver the complete video codestream, etc. As shown in FIG. 33, the requests $G_1, G_2, \ldots, G_Q$ may be processed in parallel by the implementation of M.

FIG. 34A is a flow chart depicting a method of generating a complete video codestream using multiple parallel video sub-component requests, according to an embodiment of the present invention. The method includes receiving a request D ($G_1 \ldots G_Q, F_D$) from a user, at S290, where $G_1 \ldots G_Q$ are requests for series of group of pictures (GOPs). The method further includes validating parameters of the request D, at S292. In one embodiment, validating parameters of the request includes validating each request $G_1 \ldots G_Q$. In one embodiment, the method further includes dispatching Q requests from $G_1 \ldots G_Q$ in parallel, at S294 and wait for Q requests to complete, at S296 and ending, at S298.

FIG. 34B is a flow chart depicting a sub-procedure within the method shown in FIG. 34A. In one embodiment, as shown in FIG. 34B, the dispatching of Q requests from $G_1 \ldots G_Q$ in parallel includes, for each request $G_i$ from $G_1 \ldots G_Q$ running in parallel, sending request $G_i$ to a video sub-component request processing service (see, FIG. 33 and related description), at S300. The parallel requests $G_1 \ldots G_Q$ can run over a distributed network of computer or locally within one computer. On a network with high latency, it may be beneficial to run the parallel requests $G_1 \ldots G_Q$ locally. The dispatching further includes receiving results of each request $G_i$, at S302.

The dispatching further includes collecting and processing the result from the request G_i, at S304. In one embodiment, the dispatching may include performing any interleaving of data between GOPs if desired. The dispatching further includes streaming $G_i$'s result in order from $G_1$ to $G_Q$ as it becomes available, at S306. The dispatching sub-procedure then ends, at S308.

The result is a streaming video service M that effectively encodes video from viewports that were extracted from large format motion imagery stored in containers. The system is independent of the codec in which the video clip is desired, so long as there is a logical ability for the codec and the video format to encode data as a sequence of video sub-components as described above.

In some embodiments, programs for performing methods in accordance with embodiments of the invention can be embodied as program products in a computer such as a personal computer or server or in a distributed computing environment comprising a plurality of computers. The computer may include, for example, a desktop computer, a laptop computer, a handheld computing device such as a PDA, a tablet, etc. The computer program products may include a computer readable medium or storage medium or media having instructions stored thereon used to program a computer to perform the methods described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card (e.g., a USB flash card), PCMCIA memory card, smart card, or other media. Alternatively, a portion or the whole computer program product can be downloaded from a remote computer or server via a network such as the internet, an ATM network, a wide area network (WAN) or a local area network.

Stored on one or more of the computer readable media, the program may include software for controlling both the hardware of a general purpose or specialized computer or processor. The software also enables the computer or processor to interact with a user via output devices such as a graphical user interface, head mounted display (HMD), etc. The software may also include, but is not limited to, device drivers, operating systems and user applications.

Alternatively, instead or in addition to implementing the methods described above as computer program product(s) (e.g., as software products) embodied in a computer, the method described above can be implemented as hardware in which for example an application specific integrated circuit (ASIC) or graphics processing unit or units (GPU) can be designed to implement the method or methods of the present invention.

Although the various steps of the above method(s) are described in the above paragraphs as occurring in a certain order, the present application is not bound by the order in which the various steps occur. In fact, in alternative embodiments, the various steps can be executed in an order different from the order described above.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed:

1. A method of retrieving a plurality of viewports within a plurality of temporally sequential images from a file container, each image being arranged as a matrix of tiles, the method being implemented by a computer system that includes one or more processors configured to execute computer program modules, the method comprising:
    reading, by the one or more processors, data parameters including i) an identification of a plurality of records where the plurality of temporally sequential images containing the plurality of viewports are stored, ii) an origin of each of the plurality of viewports, and iii) a pixel width and a pixel height of each of the plurality of viewports, each of the plurality of viewports being located within a corresponding one of plurality of temporally sequential images;
    requesting, by the one or more processors, the plurality of viewports from the file container using the parameters; and
    reading, by the one or more processors, data of each of the plurality of viewports starting from the origin of each of the plurality of viewports.

2. The method according to claim 1, wherein the plurality of images have substantially equal width and equal height.

3. The method according to claim 1, wherein the plurality of viewports have substantially equal width and equal height.

4. The method according to claim 1, wherein a position of the origin of each of the plurality viewports within the corresponding each of the plurality of images is substantially fixed from one viewport in one image of the plurality of images to a next viewport in a next image of the plurality of images.

5. The method according to claim 1, wherein a position of the origin of each of the plurality of viewports within the corresponding each of the plurality of images is moved from one viewport in one image of the plurality of images to a next viewport in a next image of the plurality of images.

6. The method according to claim 1, wherein the requesting comprises requesting using hypertext transfer protocol (HTTP).

7. The method according to claim 1, wherein the parameters further include specifying a desired output format of the plurality of viewports.

8. The method according to claim 1, further comprising displaying the plurality of viewports on a display device or processing the plurality of viewports by a processing device to analyze data in the plurality of viewports, or both.

9. The method according to claim 8, further comprising organizing the plurality of viewports as a video stream of a group of pictures in a desired video format.

10. The method according to claim 9, wherein the video format includes at least one of an MPEG format, MJPEG format, MPEG-2 format, MPEG-4 format, AVI format, MKV format, or WMV format, for display on a display device or for processing by a processing device, or both.

11. The method according to claim 1, wherein the method is implemented as a web-based service.

12. The method according to claim 1, further comprising arranging the plurality of viewports as a video codestream of a group of pictures (GOP).

13. The method according to claim 12, further comprises delivering the video codestream as a service upon request by a user.

14. The method according to claim 1, wherein reading data of each of the plurality of viewports comprises reading the data of each of plurality of the viewports in parallel.

15. The method according to claim 14, further comprising ordering the plurality of viewports that are read in parallel to obtain a video codestream.

16. A computer program product comprising a computer readable medium having instructions stared thereon when executed by the computer system performs the method recited in claim 1.

17. A method for providing a video streaming service of a group of pictures from a container, the method being implemented by a computer system that includes one or more processors configured to execute computer program modules, the method comprising:

receiving, by the one or more processors, a request for streaming video of a sequence of viewports, each viewport in the sequence of viewports being associated with one image in a plurality of images located within a plurality of records stored in the container, each image in the plurality of images being located in one record in the plurality of records;

validating, by the one or more processors, the request by checking whether the sequence of viewports requested exist within the plurality of records within the container;

encoding, by the one or more processors, the sequence of viewports into a video codestream; and streaming, by the one or more processors, the video codestream of the sequence of viewports in a desired temporal sequence.

18. The method according to claim 17, wherein if an error occurs during the validating of the request or the encoding of the sequence of viewports into the video codestream, processing the error into a reply message and sending the reply message to a user.

19. The method according to claim 17, wherein receiving the request for streaming video comprises receiving a request containing one or more parts, each part of the request originating from a specified container, and each part of the request containing video frames, wherein each video frame is a viewport from a large format motion imagery frame.

20. The method according to claim 17, further comprising:

retrieving and encoding a plurality of partial video codestreams from one or more containers, each partial video codestream is generated from a sequence of viewports from one container in the one or more containers.

21. The method according to claim 20, wherein each partial video codestream comprises a series of group of pictures $GOP_1, GOP_2, \ldots GOP_N$.

22. The method according to claim 21, further comprising interleaving data between adjacent group of pictures in the series of group of pictures.

23. The method according to claim 22, wherein interleaving the data includes interleaving audio information, close captioned data, or Key Length Value (KLV) metadata, or any combination thereof.

24. The method according to claim 20, further comprising packaging the plurality of partial video codestreams, each partial video codestream comprising a series of group of pictures, into a video codestream; and delivering the video codestream to a user.

25. The method according to claim 20, wherein retrieving and encoding the plurality of partial video codestreams comprises retrieving and encoding each of the plurality of partial video codestreams in parallel.

26. The method according to claim 1, wherein reading data of each of the plurality of viewports comprises reading the data starting from a location aligned to an integer multiple of a block size of a storage device where the data is stored.

* * * * *